(12) United States Patent
Wu et al.

(10) Patent No.: US 10,735,080 B2
(45) Date of Patent: Aug. 4, 2020

(54) TRANSMISSION SCHEME INDICATION METHOD, AND DATA TRANSMISSION METHOD, APPARATUS, AND SYSTEM

(71) Applicant: HUAWEI TECHNOLOGIES CO., LTD., Shenzhen, Guangdong (CN)

(72) Inventors: Ye Wu, Shanghai (CN); Yong Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/271,367

(22) Filed: Feb. 8, 2019

(65) Prior Publication Data
US 2019/0173559 A1 Jun. 6, 2019

Related U.S. Application Data

(63) Continuation of application No. PCT/CN2017/089022, filed on Jun. 19, 2017.

(30) Foreign Application Priority Data

Aug. 10, 2016 (CN) .......................... 2016 1 0652382

(51) Int. Cl.
*H04B 7/06* (2006.01)
*H04L 5/00* (2006.01)
(Continued)

(52) U.S. Cl.
CPC ......... *H04B 7/0697* (2013.01); *H04B 7/0452* (2013.01); *H04B 7/0617* (2013.01);
(Continued)

(58) Field of Classification Search
CPC .. H04B 7/0697; H04B 7/0689; H04B 7/0626; H04B 7/0452; H04B 7/0617;
(Continued)

(56) References Cited

U.S. PATENT DOCUMENTS

| 6,862,271 B2 | 3/2005 | Medvedev et al. |
| 7,042,956 B2 | 5/2006 | El-Gamal et al. |

(Continued)

FOREIGN PATENT DOCUMENTS

| CN | 1653721 A | 8/2005 |
| CN | 1710825 A | 12/2005 |

(Continued)

OTHER PUBLICATIONS

Nokia et al, DL control signalling for dual-layer beamforming in Rel 9. 3GPP TSG-RAN WG1 Meeting #58, Shenzhen, China, Aug. 24-28, 2009, R1-093300, 4 pages.

(Continued)

*Primary Examiner* — Jean B Corrielus
(74) *Attorney, Agent, or Firm* — Slater Matsil, LLP

(57) ABSTRACT

This disclosure includes a transmission scheme indication method, and a data transmission method, apparatus, and system, pertaining to the field of communications technologies. The transmission scheme indication method includes: generating transmission scheme indication information, where the transmission scheme indication information is used to indicate one of at least two transmission schemes included in a current transmission mode, and the at least two transmission schemes include a beamforming transmit diversity transmission scheme; and sending the transmission scheme indication information. This application resolves a problem of relatively low flexibility in UE data transmission, and improves flexibility in UE data transmission. This application is used for data transmission.

16 Claims, 17 Drawing Sheets

(51) Int. Cl.
  *H04B 7/0452* (2017.01)
  *H04B 7/0456* (2017.01)
  *H04W 72/12* (2009.01)

(52) U.S. Cl.
  CPC ......... *H04B 7/0626* (2013.01); *H04B 7/0689* (2013.01); *H04L 5/00* (2013.01); *H04L 5/0053* (2013.01); *H04B 7/0456* (2013.01); *H04W 72/1289* (2013.01)

(58) Field of Classification Search
  CPC ... H04B 7/0456; H04B 7/0602; H04L 5/0053; H04L 5/00; H04L 5/0092; H04L 5/0051; H04L 5/0023; H04L 5/0094; H04L 1/0026; H04W 72/1289
  See application file for complete search history.

(56) References Cited

U.S. PATENT DOCUMENTS

| | | | |
|---|---|---|---|
| 7,664,194 B2 | 2/2010 | Horng et al. | |
| 7,672,366 B2 * | 3/2010 | Shinoi | H04L 1/0026 375/224 |
| 7,944,985 B2 | 5/2011 | Elgamal et al. | |
| 7,953,169 B2 | 5/2011 | Lee et al. | |
| 8,144,797 B2 | 3/2012 | Mujtaba et al. | |
| 8,160,177 B2 | 4/2012 | Zhang et al. | |
| 8,213,873 B2 | 7/2012 | Bergljung et al. | |
| 8,311,150 B2 | 11/2012 | Lee et al. | |
| 8,325,844 B2 | 12/2012 | Walton et al. | |
| 8,345,732 B2 | 1/2013 | Fischer et al. | |
| 8,411,784 B2 | 4/2013 | Salim et al. | |
| 8,451,932 B2 | 5/2013 | Onggosanusi et al. | |
| 8,520,601 B2 | 8/2013 | Ko et al. | |
| 8,553,624 B2 | 10/2013 | Khan et al. | |
| 8,675,558 B2 | 3/2014 | Zhu et al. | |
| 8,675,794 B1 | 3/2014 | Perets et al. | |
| 8,787,485 B2 | 7/2014 | Liu et al. | |
| 8,792,932 B2 | 7/2014 | Wang et al. | |
| 8,811,518 B2 | 8/2014 | Li et al. | |
| 8,917,796 B1 | 12/2014 | Mayrench et al. | |
| 8,923,143 B2 | 12/2014 | Gorokhov et al. | |
| 8,948,104 B2 | 2/2015 | Clerckx et al. | |
| 9,042,480 B2 | 5/2015 | Onggosanusi et al. | |
| 9,107,087 B2 | 8/2015 | Li et al. | |
| 9,225,409 B2 | 12/2015 | Liu et al. | |
| 9,232,529 B2 | 1/2016 | Song et al. | |
| 9,271,221 B2 | 2/2016 | Tong et al. | |
| 9,369,955 B2 | 6/2016 | Wang et al. | |
| 9,497,750 B2 | 11/2016 | Li et al. | |
| 9,596,017 B1 | 3/2017 | Mayrench et al. | |
| 9,648,631 B1 * | 5/2017 | Sevindik | H04W 72/085 |
| 9,655,086 B2 | 5/2017 | Chen et al. | |
| 9,699,724 B2 | 7/2017 | Wang et al. | |
| 9,723,496 B2 | 8/2017 | Yoo et al. | |
| 9,941,947 B2 | 4/2018 | Liu et al. | |
| 10,027,392 B2 | 7/2018 | Lee et al. | |
| 10,200,999 B2 | 2/2019 | Rahmati et al. | |
| 10,390,246 B2 | 8/2019 | Liu | |
| 2003/0161282 A1 | 8/2003 | Medvedev et al. | |
| 2003/0190897 A1 | 10/2003 | Lei et al. | |
| 2004/0242156 A1 * | 12/2004 | Tiirola | H04B 7/005 455/25 |
| 2005/0276317 A1 | 12/2005 | Jeong et al. | |
| 2005/0281350 A1 | 12/2005 | Byoung et al. | |
| 2006/0093062 A1 | 5/2006 | Yun et al. | |
| 2006/0098568 A1 | 5/2006 | Oh et al. | |
| 2006/0098760 A1 | 5/2006 | Shen et al. | |
| 2006/0114858 A1 | 6/2006 | Walton et al. | |
| 2006/0176993 A1 | 8/2006 | Kwun et al. | |
| 2006/0198460 A1 | 9/2006 | Airy et al. | |
| 2007/0183529 A1 | 8/2007 | Tujkovic et al. | |
| 2007/0286105 A1 | 12/2007 | Kim et al. | |
| 2008/0008264 A1 | 1/2008 | Zheng | |
| 2008/0089432 A1 * | 4/2008 | Park | H04B 7/0413 375/260 |
| 2008/0132282 A1 | 6/2008 | Liu et al. | |
| 2008/0137762 A1 | 6/2008 | Waters et al. | |
| 2008/0144733 A1 | 6/2008 | El Gamal et al. | |
| 2008/0232502 A1 | 9/2008 | Wild et al. | |
| 2008/0317146 A1 | 12/2008 | Kwon et al. | |
| 2009/0028264 A1 | 1/2009 | Jianzhong et al. | |
| 2010/0002575 A1 | 1/2010 | Eichinger et al. | |
| 2010/0177810 A1 * | 7/2010 | Luo | H04B 7/0689 375/219 |
| 2010/0232535 A1 | 9/2010 | Yue et al. | |
| 2010/0296603 A1 | 11/2010 | Lee et al. | |
| 2010/0303032 A1 * | 12/2010 | Seo | H04B 7/026 370/329 |
| 2010/0323709 A1 * | 12/2010 | Nam | H04L 5/0094 455/450 |
| 2011/0043475 A1 | 2/2011 | Luca et al. | |
| 2011/0129029 A1 | 6/2011 | Liu et al. | |
| 2011/0134850 A1 | 6/2011 | Kishigami et al. | |
| 2011/0149765 A1 | 6/2011 | Gorokhov et al. | |
| 2011/0161774 A1 * | 6/2011 | Shin | G06F 11/1012 714/755 |
| 2011/0194504 A1 * | 8/2011 | Gorokhov | H04B 7/0417 370/329 |
| 2011/0200132 A1 | 8/2011 | Kim et al. | |
| 2011/0249762 A1 | 10/2011 | Sun et al. | |
| 2011/0280201 A1 | 11/2011 | Luo et al. | |
| 2011/0286347 A1 * | 11/2011 | Mohanty | H04B 7/0689 370/252 |
| 2012/0002596 A1 | 1/2012 | Kim et al. | |
| 2012/0034948 A1 | 2/2012 | Wang et al. | |
| 2012/0064846 A1 | 3/2012 | Yokomakura et al. | |
| 2012/0076023 A1 | 3/2012 | Ko et al. | |
| 2012/0076102 A1 | 3/2012 | Ko et al. | |
| 2012/0106388 A1 | 5/2012 | Shimezawa et al. | |
| 2012/0188881 A1 | 7/2012 | Ma et al. | |
| 2012/0202545 A1 | 8/2012 | Taku et al. | |
| 2012/0213169 A1 | 8/2012 | Wang et al. | |
| 2012/0269183 A1 | 10/2012 | Sohn et al. | |
| 2012/0275530 A1 | 11/2012 | Nazar et al. | |
| 2012/0300863 A1 | 11/2012 | Nogami et al. | |
| 2012/0314793 A1 | 12/2012 | Kang et al. | |
| 2012/0327875 A1 | 12/2012 | Han et al. | |
| 2013/0058279 A1 | 3/2013 | Yuichi et al. | |
| 2013/0064150 A1 | 3/2013 | Hirata et al. | |
| 2013/0064196 A1 | 3/2013 | Gao et al. | |
| 2013/0064216 A1 | 3/2013 | Gao et al. | |
| 2013/0077703 A1 | 3/2013 | Kotecha | |
| 2013/0083681 A1 * | 4/2013 | Ebrahimi Tazeh Mahalleh | H04L 5/0057 370/252 |
| 2013/0094349 A1 | 4/2013 | Hoshino et al. | |
| 2013/0094543 A1 | 4/2013 | Zhang et al. | |
| 2013/0100914 A1 | 4/2013 | Nakamura et al. | |
| 2013/0102305 A1 | 4/2013 | Liu et al. | |
| 2013/0121276 A1 | 5/2013 | Kim et al. | |
| 2013/0128807 A1 | 5/2013 | Vermani et al. | |
| 2013/0128832 A1 | 5/2013 | Kang et al. | |
| 2013/0145239 A1 | 6/2013 | Pi et al. | |
| 2013/0177115 A1 | 7/2013 | Yang et al. | |
| 2013/0230118 A1 | 9/2013 | Onggosanusi et al. | |
| 2013/0294397 A1 * | 11/2013 | Lee | H04B 7/063 370/329 |
| 2014/0031046 A1 * | 1/2014 | Wong | H04W 36/18 455/442 |
| 2014/0086351 A1 | 3/2014 | Nammi et al. | |
| 2014/0105162 A1 | 4/2014 | Li et al. | |
| 2014/0161110 A1 * | 6/2014 | Kim | H04L 5/001 370/336 |
| 2014/0205038 A1 | 7/2014 | Nakamura et al. | |
| 2014/0247838 A1 | 9/2014 | Seok et al. | |
| 2014/0302891 A1 | 10/2014 | Wang et al. | |
| 2014/0313994 A1 | 10/2014 | Su et al. | |
| 2014/0328422 A1 | 11/2014 | Chen et al. | |
| 2014/0376424 A1 | 12/2014 | Seo et al. | |
| 2015/0049736 A1 | 2/2015 | Liu et al. | |
| 2015/0117350 A1 | 4/2015 | Seo et al. | |
| 2015/0124688 A1 | 5/2015 | Xu et al. | |
| 2015/0289147 A1 | 10/2015 | Lou et al. | |

(56) References Cited

U.S. PATENT DOCUMENTS

| | | |
|---|---|---|
| 2016/0020836 A1 | 1/2016 | Wu |
| 2016/0149680 A1 | 5/2016 | Kang et al. |
| 2016/0192229 A1 | 6/2016 | Liu |
| 2016/0255582 A1 | 9/2016 | Wang et al. |
| 2016/0278052 A1* | 9/2016 | Kim ............ H04L 1/0041 |
| 2016/0295426 A1 | 10/2016 | Gormley et al. |
| 2017/0041811 A1 | 2/2017 | Qiao et al. |
| 2017/0141829 A1 | 5/2017 | Qiao et al. |
| 2017/0195019 A1 | 7/2017 | Shang |
| 2018/0070351 A1 | 3/2018 | Ko et al. |
| 2019/0020389 A1 | 1/2019 | Liu et al. |
| 2019/0158160 A1 | 5/2019 | Wu et al. |
| 2019/0173607 A1 | 6/2019 | Liu |

FOREIGN PATENT DOCUMENTS

| | | |
|---|---|---|
| CN | 1773885 A | 5/2006 |
| CN | 1969522 A | 5/2007 |
| CN | 1996785 A | 7/2007 |
| CN | 101047399 A | 10/2007 |
| CN | 101057417 A | 10/2007 |
| CN | 101115045 A | 1/2008 |
| CN | 101232478 A | 7/2008 |
| CN | 101272169 A | 9/2008 |
| CN | 101291164 A | 10/2008 |
| CN | 101378299 A | 3/2009 |
| CN | 101505205 A | 8/2009 |
| CN | 101563861 A | 10/2009 |
| CN | 101584141 A | 11/2009 |
| CN | 101689898 A | 3/2010 |
| CN | 101771648 A | 7/2010 |
| CN | 101895990 A | 11/2010 |
| CN | 101997649 A | 3/2011 |
| CN | 102064870 A | 5/2011 |
| CN | 102195697 A | 9/2011 |
| CN | 102291726 A | 12/2011 |
| CN | 102412885 A | 4/2012 |
| CN | 102696182 A | 9/2012 |
| CN | 102714527 A | 10/2012 |
| CN | 102857458 A | 1/2013 |
| CN | 102939786 A | 2/2013 |
| CN | 102957491 A | 3/2013 |
| CN | 103095350 A | 5/2013 |
| CN | 103166688 A | 6/2013 |
| CN | 103384161 A | 11/2013 |
| CN | 103427885 A | 12/2013 |
| CN | 103891226 A | 6/2014 |
| CN | 103973409 A | 8/2014 |
| CN | 104079384 A | 10/2014 |
| CN | 104185960 A | 12/2014 |
| CN | 107733492 A | 2/2018 |
| EP | 1973238 B1 | 9/2008 |
| EP | 2528244 A2 | 11/2012 |
| EP | 2802087 A1 | 11/2014 |
| EP | 2892169 A2 | 7/2015 |
| KR | 20110096256 A | 8/2011 |
| WO | 2008115508 A1 | 9/2008 |
| WO | 2009091307 A1 | 7/2009 |
| WO | 2011011566 A2 | 1/2011 |
| WO | 2011015098 A1 | 2/2011 |
| WO | 2011043475 A1 | 4/2011 |
| WO | 2011136113 A1 | 11/2011 |
| WO | 2013007616 A1 | 1/2013 |
| WO | 2013040741 A1 | 3/2013 |
| WO | 2013153276 A1 | 10/2013 |
| WO | 2013163859 A1 | 11/2013 |
| WO | 2016015282 A1 | 2/2016 |
| WO | 2016041196 A1 | 3/2016 |
| WO | 2016044076 A1 | 3/2016 |
| WO | 2016054389 A1 | 4/2016 |
| WO | 2018028331 A1 | 2/2018 |

OTHER PUBLICATIONS

3GPP TS 36.213 V12.0.0 (Dec. 2013), "3rd Generation Partnership Project; Technical Specification Group Radio Access Network; Evolved Universal Terrestrial Radio Access (E-UTRA); Physical layer procedures" (Release 12), total 186 pages.

International Search Report dated Sep. 21, 2017 in corresponding International Patent Application No. PCT/CN2017/089022 (8 pages).

Written Opinion of the International Searching Authority dated Sep. 21, 2017 in corresponding International Patent Application No. PCT/CN2017/089022 (7 pages).

"3rd Generation Partnership Project; Technical Specification Group Radio Access Network; Evolved Universal Terrestrial Radio Access; Physical Layer Procedures." 3GPPTS36.213. Dec. 2013.

Alcatel-Lucent Shanghai Bell, Alcatel-Lucent, "Considerations on CSI feedback enhancements for high-priority antenna configurations", 3GPP TSG RAN WG1, R1-112420, Aug. 22-26, 2011, Athens, Greece.

CATT, "Discussion on DMRS-base open-loop MIMO," 3GPP TSG RAN WG1Meeting #85, R1-164224, May 23-27, 2016, 6 pages.

Dammann, A. et al, "Beamforming in Combination with Space-Time Diversity for Broadband OFDM Systems," German Aerospace Center, Institute Communications and Navigation Research Group for Mobile Radio Transmission, XP010589479, Apr. 28, 2002, 8 pages, Oberpfaffenhofen, Germany.

Adhikary, A. et al., "Joint Spatial Division and Multiplexing," Sep. 6, 2012, pp. 1-44.

Xu, D., et al., "A Two-Step Precoding Scheme for Multi-User Joint Transmission in Coordinated Multi-Point System," IEEE Vehicular Technology Conference (VTC Fall), Sep. 2012, pp. 1-5, Quebec City, QC.

Yu, Z. et al., "Frequency Domain Pre-Equalization With Transmit Precoding for MIMO Broadcast Wireless Channels," IEEE Journal on Selected Areas in Communications, Feb. 2008, pp. 389-400, vol. 26, No. 2.

Philips, "Reuse of Release 8 Codebook Design for Release 10 DL Mimo UE Feedback," 3GPP TSG RAN WG1 Meeting #60, R1-101289, Feb. 2-26, 2010, 6 pages, San Francisco, USA.

Zhou, S., et al. "Optimal Transmitter Eigen-Beamforming and Space-Time Block Coding," IEEE Transactions on Information Theory, XP011074823, Jul. 2003, 18 pages, vol. 49, No. 7, Jul. 2003.

Zhou, S. et al., "Optimal Transmitter Eigen Beamforming and Space-Time Block Coding Based on Channel Mean Feedback," IEEE Transactions on Signal Processing, vol. 50, No. 10, Oct. 2002, 16 pages.

Samsung, "DMRS-based spatial multiplexing for UL NR MIMO", 3GPP TSG RAN WG1 NR Ad-Hoc, R1-1700897, Jan. 16-20, 2017, 3 pages, Spokane, USA.

Samsung, "Discussion on DL MIMO transmission schemes and modes in NR", 3GPP TSG RAN WG1 #86, R1-166788, Aug. 22-26, 2016, 2 pages, Gothenburg, Sweden.

Samsung,"Precoding for MIMO spatial multiplexing and transmit diversity",3GPP TSG RAN WG1 Meeting #46bis R1-062529,Oct. 9-13, 2006,12 pages, Seoul, South Korea.

* cited by examiner

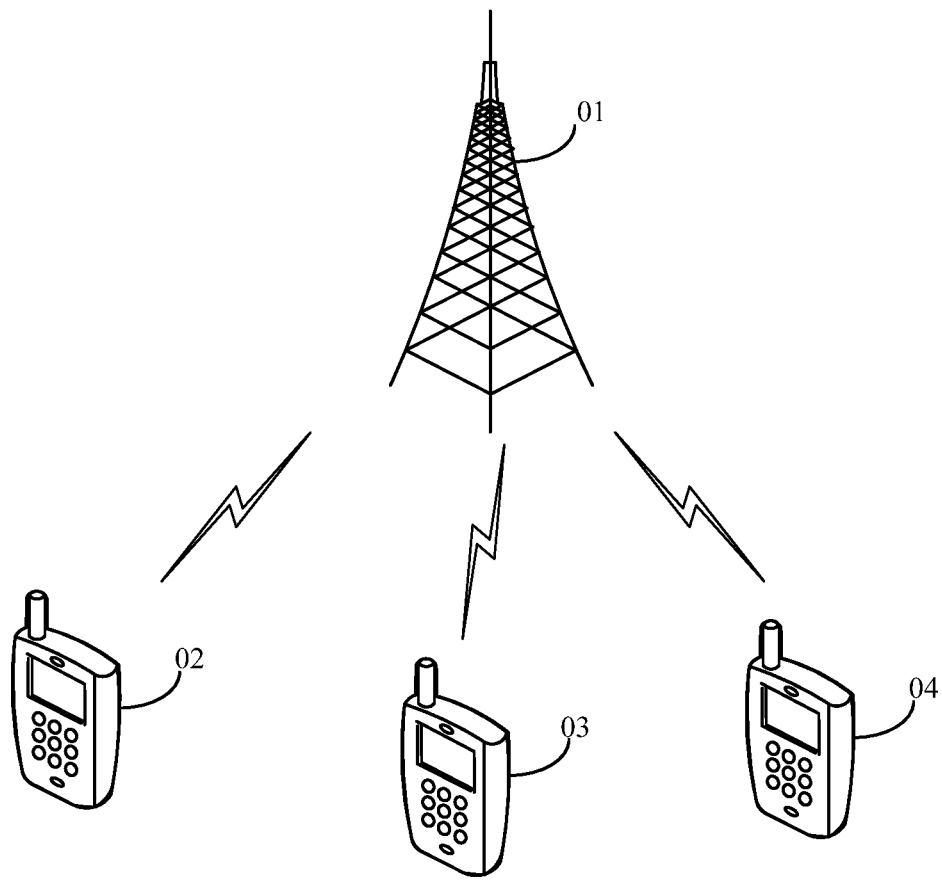

FIG. 1

Generate transmission scheme indication information, where the transmission scheme indication information is used to indicate one of at least two transmission schemes included in a current transmission mode, and the at least two transmission schemes include a beamforming transmit diversity transmission scheme      201

Send the transmission scheme indication information      202

FIG. 2

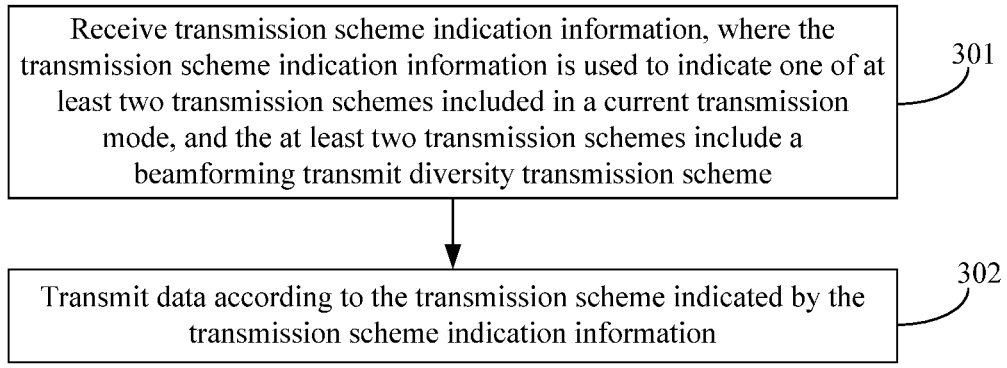

| Precode a plurality of initial spatial flows, to obtain a plurality of precoded data flows, where at least two of the plurality of initial spatial flows are obtained by performing transmit diversity processing on an original spatial flow | 501 |

↓

| Transmit the plurality of precoded data flows | 502 |

TRANSMISSION SCHEME INDICATION METHOD, AND DATA TRANSMISSION METHOD, APPARATUS, AND SYSTEM

CROSS-REFERENCE TO RELATED APPLICATIONS

This application is a continuation of International Application No. PCT/CN2017/089022, filed on Jun. 19, 2017, which claims priority to Chinese Patent Application No. 201610652382.5, filed on Aug. 10, 2016. The disclosures of the aforementioned applications are hereby incorporated by reference in their entireties.

TECHNICAL FIELD

This application relates to the field of communications technologies, and in particular, to a transmission scheme indication method, and a data transmission method, apparatus, and system.

BACKGROUND

In a Long Term Evolution (English: Long Term Evolution, LTE for short) or Long Term Evolution-Advanced (English: Long term evolution-advanced, LTE-A for short) system, there are a plurality of transmission modes (English: Transmission mode, TM for short), for example, TM1 to TM10. A base station may use radio resource control (Radio Resource Control, RRC for short) signaling to instruct UE to transmit data in a corresponding TM. Each of the plurality of TMs includes two transmission schemes. The base station may deliver transmission scheme indication information to the user equipment (English: User equipment, UE for short) based on channel quality. The transmission scheme indication information may indicate one transmission scheme in the TM currently used by the UE. The UE may use the corresponding transmission scheme based on the transmission scheme indication information, to transmit data. The channel quality may be represented by channel state information (English: Channel state information, CSI for short).

In the related art, each of TM3 to TM10 includes two transmission schemes: a non-transmit diversity multiple-input and multiple-output (English: Multiple-input and multiple-output, MIMO for short) transmission scheme and a non-beamforming transmit diversity (English: Non-beamforming transmit diversity, NBTD for short) transmission scheme. For example, TM5 includes a multi-user MIMO transmission scheme and a transmit diversity transmission scheme. In the non-transmit diversity MIMO transmission scheme, different UEs can perform spatial multiplexing of a time-frequency resource, or same UE can simultaneously transmit a plurality of spatial flows (in other words, symbol layers or spatial layers), to improve spectral efficiency. The non-transmit diversity MIMO transmission scheme is applicable to a scenario with relatively good channel quality. The NBTD transmission scheme can effectively resist channel fading, increase a signal-to-noise ratio at a receive end, and ensure reliability of UE data transmission, and is applicable to a scenario with relatively poor channel quality. UE may report CSI to a base station. Based on the CSI reported by the UE, the base station uses downlink control information (English: Downlink control information, DCI for short) to instruct the UE to transmit data by using a corresponding transmission scheme.

In a process of implementing this application, the inventor finds that the related art has at least the following problem:

A TM in the related art includes a non-transmit diversity MIMO transmission scheme and an NBTD transmission scheme, and UE can use only the non-transmit diversity MIMO transmission scheme or the NBTD transmission scheme according to indication of a base station, to transmit data, resulting in relatively low flexibility in UE data transmission.

SUMMARY

To resolve a problem of relatively low flexibility in UE data transmission, embodiments of the present invention provide a transmission scheme indication method, and a data transmission method, apparatus, and system. The technical solutions are as follows:

According to a first aspect, a transmission scheme indication method is provided, where the method includes:

generating transmission scheme indication information, where the transmission scheme indication information is used to indicate one of at least two transmission schemes included in a current transmission mode, and the at least two transmission schemes include a beamforming transmit diversity transmission scheme; and sending the transmission scheme indication information.

This embodiment of the present invention is applied to a system that includes a base station and UE. The UE may have a plurality of transmission modes. Each transmission mode may include at least two transmission schemes. The UE may transmit data by using any transmission scheme in any transmission mode. The current transmission mode is a transmission mode currently used by the UE for data transmission. The current transmission mode includes the at least two transmission schemes, and the at least two transmission schemes include the beamforming transmit diversity transmission scheme.

The base station may generate the transmission scheme indication information, and send the transmission scheme indication information to the UE. The transmission scheme indication information is used to indicate one of the at least two transmission schemes included in the current transmission mode. For example, the transmission scheme indication information is used to indicate the beamforming transmit diversity transmission scheme in the current transmission mode. In this embodiment of the present invention, the UE may report CSI to the base station, and the base station may generate the transmission scheme indication information based on the CSI reported by the UE. Specifically, the base station may determine channel quality based on the CSI reported by the UE, and then generate the transmission scheme indication information based on the channel quality. The UE may report the CSI to the base station when the CSI changes, or may regularly report the CSI to the base station, or may report the CSI to the base station at preset time intervals. For a specific implementation of CSI reporting by the UE to the base station, refer to LTE. Details are not described in this embodiment of the present invention.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

The beamforming transmit diversity transmission scheme and the open-loop transmit diversity transmission scheme may be two mutually independent transmission schemes, or may be one unified transmission scheme. The unified transmission scheme may be a unified transmit diversity (English: Unified transmit diversity, UTD for short) transmission scheme. The UTD transmission scheme includes two sub-schemes: the beamforming transmit diversity transmission scheme and the open-loop transmit diversity transmission scheme. This is not limited in this embodiment of the present invention.

Optionally, the generating transmission scheme indication information includes: generating downlink control information, where a format of the downlink control information corresponds to the transmission scheme that is indicated by the transmission scheme indication information and that is in the at least two transmission schemes included in the current transmission mode; and the sending the transmission scheme indication information includes: sending the downlink control information.

In this embodiment of the present invention, the transmission scheme indication information may be the format of the downlink control information sent by the base station to the UE, and each of the at least two transmission schemes in the current transmission mode may correspond to one downlink control information format. Therefore, that the base station generates the transmission scheme indication information may be specifically: generating, by the base station, the downlink control information. For example, the downlink control information may be DCI in LTE. The base station may generate downlink control information whose format is a format 1A. The format 1A may indicate the beamforming transmit diversity transmission scheme in the current transmission mode.

After generating the downlink control information whose format is the format 1A, the base station may send the downlink control information to the UE. Because the transmission scheme indication information may be the format of the downlink control information, sending, by the base station, the transmission scheme indication information to the UE may be specifically: sending, by the base station, the downlink control information to the UE. The downlink control information may be DCI in LTE. The base station may send the downlink control information to the UE by using a first time-frequency resource on a physical downlink control channel (English: Physical downlink control channel, PDCCH for short). The first time-frequency resource may be a time-frequency resource in UE-specific search space. The downlink control information sent to the UE by using the time-frequency resource in the UE-specific search space is usually scrambled by using a radio network temporary identifier (English: Radio Network Temporary Identity, RNTI for short). For example, the base station sends the downlink control information whose format is the format 1A to the UE by using the first time-frequency resource, where the downlink control information whose format is the format 1A is scrambled by using the RNTI of the UE.

According to a second aspect, a data transmission method is provided, where the method includes:

receiving transmission scheme indication information, where the transmission scheme indication information is used to indicate one of at least two transmission schemes included in a current transmission mode, and the at least two transmission schemes include a beamforming transmit diversity transmission scheme; and transmitting data according to the transmission scheme indicated by the transmission scheme indication information.

UE may receive the transmission scheme indication information sent by a base station, and then transmit the data according to the transmission scheme indicated by the transmission scheme indication information. For example, the transmission scheme indicated by the transmission scheme indication information may be the beamforming transmit diversity transmission scheme in the current transmission mode. Therefore, the UE may transmit the data according to the beamforming transmit diversity transmission scheme.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

The beamforming transmit diversity transmission scheme and the open-loop transmit diversity transmission scheme may be two mutually independent transmission schemes, or may be one unified transmission scheme. The unified transmission scheme may be a UTD transmission scheme. The UTD transmission scheme includes two sub-schemes: the beamforming transmit diversity transmission scheme and the open-loop transmit diversity transmission scheme. This is not limited in this embodiment of the present invention.

Optionally, the receiving transmission scheme indication information includes: receiving downlink control information, where a format of the downlink control information corresponds to the transmission scheme that is indicated by the transmission scheme indication information and that is in the at least two transmission schemes included in the current transmission mode; and before the transmitting data according to the transmission scheme indicated by the transmission scheme indication information, the method further includes:

determining, from the at least two transmission schemes included in the current transmission mode, the transmission scheme corresponding to the format of the downlink control information; and determining, as the transmission scheme indicated by the transmission scheme indication information, the transmission scheme corresponding to the format of the downlink control information.

In this embodiment of the present invention, the transmission scheme indication information may be the format of the downlink control information. Therefore, the UE may receive the downlink control information sent by the base station. The downlink control information may be DCI in LTE. For example, the UE receives downlink control information whose format is a format 1A and that is sent by the base station. The UE may perform blind detection on UE-specific search space in a PDCCH based on an RNTI of the UE, to receive the transmission scheme indication information. Specifically, the UE attempts to successively use a plurality of downlink control information formats to parse the UE-specific search space based on the RNTI of the UE and then perform a check; and if the check succeeds, the blind detection succeeds, and the UE may determine the format of the downlink control information. A specific implementation process of the blind detection by the UE to determine the downlink control information related to the UE and the format of the downlink control information has been clearly described in the related art. Therefore, for the specific implementation process thereof, refer to the related art. Details are not described in this embodiment of the present invention.

After receiving the downlink control information sent by the base station, the UE may transmit the data according to the transmission scheme indicated by the transmission scheme indication information sent by the base station. In this embodiment of the present invention, the transmission scheme indication information may be the format of the downlink control information, and the UE receives the downlink control information through the blind detection. Therefore, after receiving the downlink control information, the UE may obtain the format of the downlink control information; and then determine, from the at least two transmission schemes included in the current transmission mode, the transmission scheme corresponding to the format of the downlink control information, and determine, as the transmission scheme indicated by the transmission scheme indication information, the transmission scheme corresponding to the format of the downlink control information. Subsequently, the UE may transmit the data according to the transmission scheme indicated by the transmission scheme indication information.

For example, after obtaining, through the blind detection in the UE-specific search space, the downlink control information whose format is the format 1A, the UE may obtain the format of the downlink control information, where the format of the downlink control information is the format 1A. Then the UE determines, from the at least two transmission schemes included in the current transmission mode, a transmission scheme corresponding to the format 1A, where the transmission scheme corresponding to the format 1A may be the beamforming transmit diversity transmission scheme. Therefore, the UE determines the beamforming transmit diversity transmission scheme as the transmission scheme indicated by the transmission scheme indication information, and transmits the data according to the beamforming transmit diversity transmission scheme.

According to a third aspect, a base station is provided, where the base station includes:

a generation module, configured to generate transmission scheme indication information, where the transmission scheme indication information is used to indicate one of at least two transmission schemes included in a current transmission mode, and the at least two transmission schemes include a beamforming transmit diversity transmission scheme; and a sending module, configured to send the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the generation module is configured to generate downlink control information, where a format of the downlink control information corresponds to the transmission scheme that is indicated by the transmission scheme indication information and that is in the at least two transmission schemes included in the current transmission mode; and the sending module is configured to send the downlink control information.

According to a fourth aspect, user equipment UE is provided, where the UE includes:

a receiving module, configured to receive transmission scheme indication information, where the transmission scheme indication information is used to indicate one of at least two transmission schemes included in a current transmission mode, and the at least two transmission schemes include a beamforming transmit diversity transmission scheme; and a transmission module, configured to transmit data according to the transmission scheme indicated by the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the receiving module is configured to receive downlink control information, where a format of the downlink control information corresponds to the transmission scheme that is indicated by the transmission scheme indication information and that is in the at least two transmission schemes included in the current transmission mode; and the UE further includes: a first determining module, configured to determine, from the at least two transmission schemes included in the current transmission mode, the transmission scheme corresponding to the format of the downlink control information; and a second determining module, configured to determine, as the transmission scheme indicated by the transmission scheme indication information, the transmission scheme corresponding to the format of the downlink control information.

According to a fifth aspect, a base station is provided, where the base station includes a processor and a transmitter, and the processor is coupled to the transmitter;

the processor is configured to generate transmission scheme indication information, where the transmission scheme indication information is used to indicate one of at least two transmission schemes included in a current transmission mode, and the at least two transmission schemes include a beamforming transmit diversity transmission scheme; and the transmitter is configured to send the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the processor is configured to generate downlink control information, where a format of the downlink control information corresponds to the transmission scheme that is indicated by the transmission scheme indication information and that is in the at least two transmission schemes included in the current transmission mode; and the transmitter is configured to send the downlink control information.

According to a sixth aspect, user equipment UE is provided, where the UE includes a receiver and a processor, and the receiver is coupled to the processor;

the receiver is configured to receive transmission scheme indication information, where the transmission scheme indication information is used to indicate one of at least two transmission schemes included in a current transmission mode, and the at least two transmission schemes include a beamforming transmit diversity transmission scheme; and the processor is configured to transmit data according to the transmission scheme indicated by the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the receiver is configured to receive downlink control information, where a format of the downlink control information corresponds to the transmission scheme that is indicated by the transmission scheme indication information and that is in the at least two transmission schemes included in the current transmission mode; and the processor is further configured to: determine, from the at least two transmission schemes included in the current transmission mode, the transmission scheme corresponding to the format of the downlink control information; and determine, as the transmission scheme indicated by the transmission scheme indication information, the transmission scheme corresponding to the format of the downlink control information.

According to a seventh aspect, a data transmission system is provided, where the data transmission system includes a base station and user equipment UE; and the base station may be the base station according to the third aspect or the fifth aspect, and the UE may be the UE according to the fourth aspect or the sixth aspect.

According to an eighth aspect, a data sending method is provided, where the method includes:

precoding a plurality of initial spatial flows, to obtain a plurality of precoded data flows, where at least two of the plurality of initial spatial flows are obtained by performing transmit diversity processing on an original spatial flow; and transmitting the plurality of precoded data flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes:

precoding demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow; and sending the plurality of precoded demodulation reference signals.

According to a ninth aspect, a data receiving method is provided, where the method includes:

receiving a plurality of precoded data flows, where the plurality of precoded data flows are obtained by precoding a plurality of initial spatial flows, and at least two of the plurality of initial spatial flows are obtained by performing transmit diversity processing on an original spatial flow;

restoring the at least two initial spatial flows from the plurality of precoded data flows; and restoring the original spatial flow based on the at least two initial spatial flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes: receiving a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow; and the restoring the at least two initial spatial flows from the plurality of precoded data flows includes: restoring the at least two initial spatial flows from the plurality of precoded data flows based on precoded demodulation reference signals of the at least two initial spatial flows.

According to a tenth aspect, a data sending method is provided, where the method includes:

precoding at least two initial spatial flows, to obtain a plurality of precoded data flows, where the at least two initial spatial flows are obtained by performing transmit diversity processing on an original spatial flow; and transmitting the plurality of precoded data flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes:

precoding demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow; and sending the plurality of precoded demodulation reference signals.

According to an eleventh aspect, a data receiving method is provided, where the method includes:

receiving a plurality of precoded data flows, where the plurality of precoded data flows are obtained by precoding at least two initial spatial flows, and the at least two initial spatial flows are obtained by performing transmit diversity processing on an original spatial flow;

restoring the at least two initial spatial flows from the plurality of precoded data flows; and restoring the original spatial flow based on the at least two initial spatial flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes: receiving a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow; and the restoring the at least two initial spatial flows from the plurality of precoded data flows includes: restoring the at least two initial spatial flows from the plurality of precoded data flows based on precoded demodulation reference signals of the at least two initial spatial flows.

According to a twelfth aspect, a transmit-end device is provided, where the transmit-end device includes:

a first precoding module, configured to precode a plurality of initial spatial flows, to obtain a plurality of precoded data flows, where at least two of the plurality of initial spatial flows are obtained by performing transmit diversity processing on an original spatial flow; and a transmission module, configured to transmit the plurality of precoded data flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the transmit-end device further includes:

a second precoding module, configured to precode demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow; and a sending module, configured to send the plurality of precoded demodulation reference signals.

According to a thirteenth aspect, a receive-end device is provided, where the receive-end device includes:

a first receiving module, configured to receive a plurality of precoded data flows, where the plurality of precoded data flows are obtained by precoding a plurality of initial spatial flows, and at least two of the plurality of initial spatial flows are obtained by performing transmit diversity processing on an original spatial flow;

a first restoration module, configured to restore the at least two initial spatial flows from the plurality of precoded data flows; and a second restoration module, configured to restore the original spatial flow based on the at least two initial spatial flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receive-end device further includes:

a second receiving module, configured to receive a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow; and the first restoration module is configured to restore the at least two initial spatial flows from the plurality of precoded data flows based on precoded demodulation reference signals of the at least two initial spatial flows.

According to a fourteenth aspect, a transmit-end device is provided, where the transmit-end device includes:

a first precoding module, configured to precode at least two initial spatial flows, to obtain a plurality of precoded data flows, where the at least two initial spatial flows are obtained by performing transmit diversity processing on an original spatial flow; and a transmission module, configured to transmit the plurality of precoded data flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the transmit-end device further includes:

a second precoding module, configured to precode demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow; and a sending module, configured to send the plurality of precoded demodulation reference signals.

According to a fifteenth aspect, a receive-end device is provided, where the receive-end device includes:

a first receiving module, configured to receive a plurality of precoded data flows, where the plurality of precoded data flows are obtained by precoding at least two initial spatial flows, and the at least two initial spatial flows are obtained by performing transmit diversity processing on an original spatial flow;

a first restoration module, configured to restore the at least two initial spatial flows from the plurality of precoded data flows; and a second restoration module, configured to restore the original spatial flow based on the at least two initial spatial flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receive-end device further includes:

a second receiving module, configured to receive a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow; and the first restoration module is configured to restore the at least two initial spatial flows from the plurality of precoded data flows based on precoded demodulation reference signals of the at least two initial spatial flows.

According to a sixteenth aspect, a transmit-end device is provided, where the transmit-end device includes a processor and a transmitter, and the processor is coupled to the transmitter;

the processor is configured to precode a plurality of initial spatial flows, to obtain a plurality of precoded data flows, where at least two of the plurality of initial spatial flows are obtained by performing transmit diversity processing on an original spatial flow; and the transmitter is configured to transmit the plurality of precoded data flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the processor is further configured to precode demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow; and the transmitter is further configured to send the plurality of precoded demodulation reference signals.

According to a seventeenth aspect, a receive-end device is provided, where the receive-end device includes a receiver and a processor, and the receiver is coupled to the processor;

the receiver is configured to receive a plurality of precoded data flows, where the plurality of precoded data flows are obtained by precoding a plurality of initial spatial flows, and at least two of the plurality of initial spatial flows are obtained by performing transmit diversity processing on an original spatial flow;

the processor is configured to restore the at least two initial spatial flows from the plurality of precoded data flows; and the processor is configured to restore the original spatial flow based on the at least two initial spatial flows.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receiver is further configured to receive a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow; and the processor is further configured to restore the at least two initial spatial flows from the plurality of precoded data flows based on precoded demodulation reference signals of the at least two initial spatial flows.

According to an eighteenth aspect, a transmit-end device is provided, where the transmit-end device includes a processor and a transmitter, and the processor is coupled to the transmitter;

the processor is configured to precode at least two initial spatial flows, to obtain a plurality of precoded data flows, where the at least two initial spatial flows are obtained by performing transmit diversity processing on an original spatial flow; and the transmitter is configured to transmit the plurality of precoded data flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the processor is configured to precode demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow; and the transmitter is configured to send the plurality of precoded demodulation reference signals.

According to a nineteenth aspect, a receive-end device is provided, where the receive-end device includes a receiver and a processor, and the receiver is coupled to the processor;

the receiver is configured to receive a plurality of precoded data flows, where the plurality of precoded data flows are obtained by precoding at least two initial spatial flows, and the at least two initial spatial flows are obtained by performing transmit diversity processing on an original spatial flow;

the processor is configured to restore the at least two initial spatial flows from the plurality of precoded data flows; and the processor is configured to restore the original spatial flow based on the at least two initial spatial flows.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receiver is further configured to receive a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow; and the processor is further configured to restore the at least two initial spatial flows from the plurality of precoded data flows based on precoded demodulation reference signals of the at least two initial spatial flows.

The technical solutions provided in the embodiments of the present invention bring the following beneficial effect:

According to the transmission scheme indication method and the data transmission method, apparatus, and system that are provided in the embodiments of the present invention, the base station generates the transmission scheme indication information, and sends the transmission scheme indication information to the UE, where the transmission scheme indication information is used to indicate one of the at least two transmission schemes included in the current transmission mode, and the at least two transmission schemes include the beamforming transmit diversity transmission scheme; and the UE transmits the data according to the transmission scheme indicated by the transmission scheme indication information. The current transmission mode includes the at least two transmission schemes, and the at least two transmission schemes include the beamforming transmit diversity transmission scheme. Therefore, the UE may transmit the data by using the beamforming transmit diversity transmission scheme according to indication of the base station. This resolves a problem of relatively low flexibility in UE data transmission in the related art, and improves flexibility in UE data transmission.

BRIEF DESCRIPTION OF DRAWINGS

FIG. 1 is a schematic diagram of an implementation environment to which embodiments of this application relate;

FIG. 2 is a method flowchart of a transmission scheme indication method according to an embodiment of the present invention;

FIG. 3 is a method flowchart of a data transmission method according to an embodiment of the present invention;

FIG. 4 is a method flowchart of another data transmission method according to an embodiment of the present invention;

DESCRIPTION OF EMBODIMENTS

Figure 5:
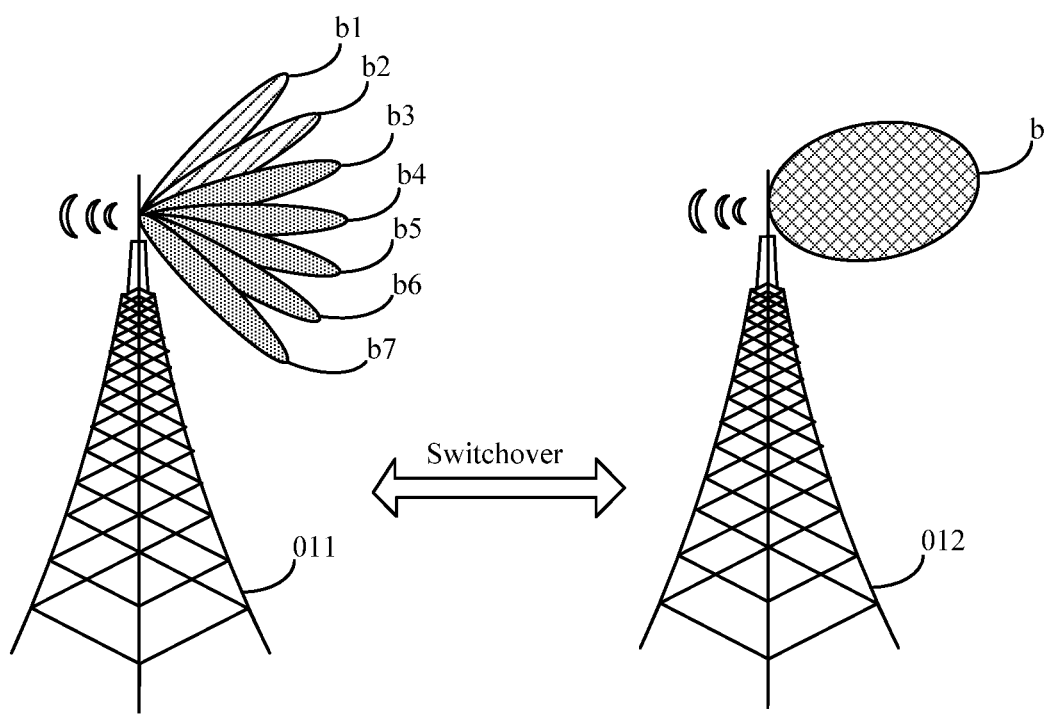
FIG. 5 is a schematic diagram of data transmission by UE according to two transmission schemes in a same transmission mode in the related art.

FIG. 1 is a schematic diagram of an implementation environment to which embodiments of this application relate. The implementation environment provides a wireless communications system, which may be specifically a MIMO system. Referring to FIG. 1, the implementation environment may include a base station 01 and a plurality of UEs. For example, as shown in FIG. 1, this implementation environment is described by using an example in which the plurality of UEs include UE-02, UE-03, and UE-04.

Each of the plurality of UEs has a plurality of TMs (for example, TM1 to TM10). Each TM may include at least two transmission schemes. Each UE may transmit data by using any transmission scheme in any TM. The UE-02 is used as an example for description. For implementation processes of other UEs, refer to an implementation process of the UE-02. Details are as follows:

The UE-02 may have a plurality of TMs (for example, TM1 to TM10). Each TM may include at least two transmission schemes. The UE-02 may transmit data by using any transmission scheme in any TM.

The UE-02 may report CSI to the base station 01. The base station 01 may generate transmission scheme indication information based on the CSI reported by the UE-02, and then send the transmission scheme indication information to the UE-02. The transmission scheme indication information may indicate one transmission scheme in a current transmission mode of the UE-02. The UE-02 may transmit data by using the transmission scheme that is indicated by the transmission scheme indication information and that is in the current transmission mode.

In this implementation environment, the transmission scheme indication information may be carried in downlink control information. Specifically, the transmission scheme indication information may be indicated by a format of the downlink control information. The format of the downlink control information may correspond to the transmission scheme that is indicated by the transmission scheme indication information and that is in the at least two transmission schemes included in the current transmission mode. Therefore, the base station 01 may generate the downlink control information, and then send the downlink control information to the UE-02. The UE-02 may determine, from the at least two transmission schemes included in the current transmission mode, the transmission scheme corresponding to the format of the downlink control information, and determine, as the transmission scheme indicated by the transmission scheme indication information, the transmission scheme corresponding to the format of the downlink control information; and then transmit the data by using the transmission scheme that is indicated by the transmission scheme indication information and that is in the current transmission mode.

In this implementation environment, the current transmission mode of the UE-02 includes the at least two transmission schemes. The at least two transmission schemes include a beamforming transmit diversity transmission scheme. In addition, the at least two transmission schemes may include an open-loop spatial multiplexing transmission scheme, or the at least two transmission schemes may include a closed-loop spatial multiplexing transmission scheme, or the at least two transmission schemes may include a multi-user multiple-input and multiple-output transmission scheme, or the at least two transmission schemes may include an open-loop transmit diversity transmission scheme. This is not limited in this implementation environment.

It should be noted that, in the related art, the current TM of the UE-02 includes only two transmission schemes: a non-transmit diversity MIMO transmission scheme and an NBTD transmission scheme (for example, when the current TM is TM4, the current TM includes a transmit diversity transmission scheme and the closed-loop spatial multiplexing transmission scheme; or when the current TM is TM5, the current TM includes a transmit diversity transmission scheme and the multi-user MIMO transmission scheme, where both the closed-loop spatial multiplexing transmission scheme and the multi-user MIMO transmission scheme may be referred to as non-transmit diversity MIMO transmission schemes, and the NBTD transmission scheme may be referred to as a transmit diversity transmission scheme, such as open-loop transmit diversity). The UE-02 can use only one of the non-transmit diversity MIMO transmission scheme and the NBTD transmission scheme according to indication of the base station 01, to transmit data. In the non-transmit diversity MIMO transmission scheme, different UEs can perform spatial multiplexing of a time-frequency resource, to improve spectral efficiency. The non-transmit diversity MIMO transmission scheme is usually applicable to a scenario with relatively good channel quality. The NBTD transmission scheme can effectively resist channel fading, increase a signal-to-noise ratio at a receive end, and ensure reliability of UE data transmission, and is usually applicable to a scenario with relatively poor channel quality. If the UE-02 currently transmits data according to the non-transmit diversity MIMO transmission scheme, when channel quality changes, the base station 01 may instruct the UE-02 to transmit data according to the NBTD transmission scheme. In this case, the following problems may occur:

First, the UE-02 can transmit data only according to one of the non-transmit diversity MIMO transmission scheme and the NBTD transmission scheme, resulting in relatively low flexibility in data transmission.

Second, when the UE-02 transmits data according to the non-transmit diversity MIMO transmission scheme, different UEs in a cell served by the base station 01 can perform spatial multiplexing of a time-frequency resource. However, when the UE-02 transmits data according to the NBTD transmission scheme, the different UEs in the cell served by the base station 01 cannot perform spatial multiplexing of a time-frequency resource. As a result, utilization of the time-frequency resource is relatively low, and spectral efficiency is relatively low.

Third, when the channel quality has a relatively slight change, the base station 01 instructs the UE-02 to transmit data according to the NBTD transmission scheme, causing indication by the base station 01 to the UE-02 to be highly inaccurate.

FIG. 2 is a method flowchart of a transmission scheme indication method according to an embodiment of the present invention. The transmission scheme indication method may be performed by the base station 01 in the implementation environment shown in FIG. 1. Referring to FIG. 2, the transmission scheme indication method may include the following steps:

Step 201: Generate transmission scheme indication information, where the transmission scheme indication information is used to indicate one of at least two transmission schemes included in a current transmission mode, and the at least two transmission schemes include a beamforming transmit diversity transmission scheme.

Step 202: Send the transmission scheme indication information.

In conclusion, according to the transmission scheme indication method provided in this embodiment of the present invention, the base station generates the transmission scheme indication information, and sends the transmission scheme indication information to UE, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit data by using the beamforming transmit diversity transmission scheme according to indication of the base station. This resolves a problem of relatively low flexibility in UE data transmission in the related art, and improves flexibility in UE data transmission.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, step 201 may include: generating downlink control information, where a format of the downlink control information corresponds to the transmission scheme that is indicated by the transmission scheme indication information and that is in the at least two transmission schemes included in the current transmission mode; and step 202 may include: sending the downlink control information.

All of the foregoing optional technical solutions may be combined in any manner to form an optional embodiment of this application. Details are not described herein.

In conclusion, according to the transmission scheme indication method provided in this embodiment of the present invention, the base station generates the transmission scheme indication information, and sends the transmission scheme indication information to UE, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit data by using the beamforming transmit diversity transmission scheme according to indication of the base station. This resolves a problem of relatively low flexibility in UE data transmission in the related art, and improves flexibility in UE data transmission.

FIG. 3 is a method flowchart of a data transmission method according to an embodiment of the present invention. The data transmission method may be performed by the UE-02 in the implementation environment shown in FIG. 1. Referring to FIG. 3, the data transmission method may include the following steps:

Step 301: Receive transmission scheme indication information, where the transmission scheme indication information is used to indicate one of at least two transmission schemes included in a current transmission mode, and the at least two transmission schemes include a beamforming transmit diversity transmission scheme.

Step 302: Transmit data according to the transmission scheme indicated by the transmission scheme indication information.

In conclusion, according to the data transmission method provided in this embodiment of the present invention, the UE receives the transmission scheme indication information, and transmits the data according to the transmission scheme indicated by the transmission scheme indication information, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme. This resolves a problem of relatively low flexibility in UE data transmission in the related art, and improves flexibility in UE data transmission.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, step 301 may include: receiving downlink control information, where a format of the downlink control information corresponds to the transmission scheme that is indicated by the transmission scheme indication information and that is in the at least two transmission schemes included in the current transmission mode; and before step 302, the data transmission method may further include:

determining, from the at least two transmission schemes included in the current transmission mode, the transmission scheme corresponding to the format of the downlink control information; and determining, as the transmission scheme indicated by the transmission scheme indication information, the transmission scheme corresponding to the format of the downlink control information.

All of the foregoing optional technical solutions may be combined in any manner to form an optional embodiment of this application. Details are not described herein.

In conclusion, according to the data transmission method provided in this embodiment of the present invention, the UE receives the transmission scheme indication information, and transmits the data according to the transmission scheme indicated by the transmission scheme indication information, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme. This resolves a problem of relatively low flexibility in UE data transmission in the related art, and improves flexibility in UE data transmission.

FIG. 4 is a method flowchart of another data transmission method according to an embodiment of the present invention. This embodiment is described by using an example in which the data transmission method is applied to the implementation environment shown in FIG. 1. Referring to FIG. 4, the data transmission method may include the following steps.

Step 401: A base station generates transmission scheme indication information, where the transmission scheme indication information is used to indicate one of at least two transmission schemes included in a current transmission mode, and the at least two transmission schemes include a beamforming transmit diversity transmission scheme.

The data transmission method provided in this embodiment of the present invention may be applied to a system that includes the base station and UE. The UE may have a plurality of transmission modes. Each transmission mode may include at least two transmission schemes. The UE may transmit data by using any transmission scheme in any transmission mode.

The current transmission mode is a transmission mode currently used by the UE for data transmission. In this embodiment of the present invention, the current transmission mode includes the at least two transmission schemes, and the at least two transmission schemes include the beamforming transmit diversity (English: Beamformed transmit diversity, BTD for short) transmission scheme. Optionally, the at least two transmission schemes may further include an open-loop spatial multiplexing transmission scheme, or the at least two transmission schemes may further include a closed-loop spatial multiplexing transmission scheme, or the at least two transmission schemes may further include a multi-user multiple-input and multiple-output transmission scheme, or the at least two transmission schemes may further include an open-loop transmit diversity transmission scheme. The beamforming transmit diversity transmission scheme and the open-loop transmit diversity transmission scheme may be two mutually independent transmission schemes, or may be one unified transmission scheme. The unified transmission scheme may be a UTD transmission scheme. The UTD transmission scheme includes two sub-schemes: the beamforming transmit diversity transmission scheme and the open-loop transmit diversity transmission scheme. Based on the foregoing descriptions, in this embodiment of the present invention, the current transmission mode and the at least two transmission schemes included in the current transmission mode may be any possible implementation shown in Table 1.

TABLE 1

| Transmission mode | Transmission scheme |
|---|---|
| TM-1 | Beamforming transmit diversity transmission scheme |
| | Open-loop transmit diversity transmission scheme |
| TM-2 | Beamforming transmit diversity transmission scheme |
| | Open-loop spatial multiplexing transmission scheme |
| TM-3 | Beamforming transmit diversity transmission scheme |
| | Closed-loop spatial multiplexing transmission scheme |
| TM-4 | Beamforming transmit diversity transmission scheme |
| | Multi-user multiple-input and multiple-output transmission scheme |
| TM-5 | Beamforming transmit diversity transmission scheme |
| | Open-loop transmit diversity transmission scheme |
| | Open-loop spatial multiplexing transmission scheme |
| TM-6 | Beamforming transmit diversity transmission scheme |
| | Open-loop transmit diversity transmission scheme |
| | Closed-loop spatial multiplexing transmission scheme |
| TM-7 | Beamforming transmit diversity transmission scheme |
| | Open-loop transmit diversity transmission scheme |
| | Multi-user multiple-input and multiple-output transmission scheme |
| TM-8 | Open-loop spatial multiplexing transmission scheme |
| | Unified transmit diversity scheme: Beamforming transmit diversity transmission scheme / Open-loop transmit diversity transmission scheme |
| TM-9 | Closed-loop spatial multiplexing transmission scheme |
| | Unified transmit diversity scheme: Beamforming transmit diversity transmission scheme / Open-loop transmit diversity transmission scheme |
| TM-10 | Multi-user multiple-input and multiple-output transmission scheme |
| | Unified transmit diversity scheme: Beamforming transmit diversity transmission scheme / Open-loop transmit diversity transmission scheme |

In Table 1, the TM-1 may correspond to TM2 in LTE, and any one of the TM-2 to the TM-10 may correspond to any one of TMs in LTE, except TM2. In addition, in Table 1, the three TMs, the TM-8, the TM-9, and the TM-10 and the three TMs, the TM-5, the TM-6, and the TM-7 are mutually exclusive. In other words, transmission schemes corresponding to the TM-5, the TM-6, and the TM-7, or transmission schemes corresponding to the TM-8, the TM-9, and the TM-10 exist in a standard. For example, when the transmission schemes corresponding to the TM-8, the TM-9, and the TM-10 exist in the standard, the transmission schemes corresponding to the TM-5, the TM-6, and the TM-7 do not exist; or when the transmission schemes corresponding to the TM-5, the TM-6, and the TM-7 exist in the standard, the transmission schemes corresponding to the TM-8, the TM-9, and the TM-10 do not exist. For example, the TM-2 corresponds to TM3 in LTE, the TM-3 corresponds to TM4 in LTE, the TM-4 corresponds to TM5 in LTE, the TM-5 corresponds to TM6 in LTE, the TM-6 corresponds to TM7 in LTE, and the TM-7 corresponds to TM8 in LTE. Alternatively, the TM-2 corresponds to TM3 in LTE, the TM-3 corresponds to TM4 in LTE, the TM-4 corresponds to TM5 in LTE, the TM-8 corresponds to TM6 in LTE, the TM-9 corresponds to TM7 in LTE, and the TM-10 corresponds to TM8 in LTE. This is not limited in this embodiment of the present invention. In Table 1, the open-loop transmit diversity transmission scheme may be an open-loop transmit diversity (English: Open loop transmit diversity, OLTD for short) transmission scheme in LTE, and the OLTD transmission scheme is transmit diversity in the LTE standard; the open-loop spatial multiplexing transmission scheme may be an open-loop spatial multiplexing (English: Open-loop spatial multiplexing, OLSM for short) transmission scheme in LTE; the closed-loop spatial multiplexing transmission scheme may be a closed-loop spatial multiplexing (Closed-loop spatial multiplexing, CLSM for short) transmission scheme in LTE; and the multi-user multiple-input and multiple-output transmission scheme may be a multi-user multiple-input and multiple-output (English: Multi-user Multiple-input and multiple-output, MU-MIMO for short) transmission scheme in LTE. In this embodiment of the present invention, the current transmission mode may be any one of the TM-1 to the TM-10. For example, the current transmission mode is the TM-2.

It should be noted that, in this embodiment of the present invention, the transmission schemes in the TM-1 to the TM-10 are merely examples. In actual application, each of the TM-1 to the TM-10 includes the beamforming transmit diversity transmission scheme. In addition to the beamforming transmit diversity transmission scheme, each TM may include a transmission scheme that is neither a beamforming transmit diversity transmission scheme nor an open-loop transmit diversity transmission scheme. The transmission scheme that is neither a beamforming transmit diversity transmission scheme nor an open-loop transmit diversity transmission scheme may include but is not limited to the foregoing open-loop spatial multiplexing transmission scheme, closed-loop spatial multiplexing transmission scheme, and multi-user multiple-input and multiple-output transmission scheme. In addition to the beamforming transmit diversity transmission scheme, at least two transmission schemes in each TM may include any combination of the foregoing other transmission schemes. The open-loop spatial multiplexing transmission scheme, the closed-loop spatial multiplexing transmission scheme, and the multi-user multiple-input and multiple-output transmission scheme in this embodiment of the present invention are merely examples. In actual application, other transmission schemes may be further included. This is not limited in this embodiment of the present invention.

The base station may generate the transmission scheme indication information, where the transmission scheme indication information is used to indicate one of the at least two transmission schemes included in the current transmission mode. For example, the transmission scheme indication information is used to indicate the beamforming transmit diversity transmission scheme in the TM-2 shown in Table 1. In this embodiment of the present invention, the UE may report CSI to the base station, and the base station may generate the transmission scheme indication information based on the CSI reported by the UE. Specifically, the base station may determine channel quality based on the CSI reported by the UE, and then generate the transmission scheme indication information based on the channel quality. The UE may report the CSI to the base station when the CSI changes, or may regularly report the CSI to the base station, or may report the CSI to the base station at preset time intervals. For a specific implementation of CSI reporting by the UE to the base station, refer to LTE. Details are not described in this embodiment of the present invention.

In this embodiment of the present invention, the transmission scheme indication information may be a format of downlink control information sent by the base station to the UE, and each of the at least two transmission schemes in the current transmission mode may correspond to one downlink control information format. Therefore, that a base station generates transmission scheme indication information may be specifically: generating, by the base station, the downlink control information. For example, the downlink control information may be DCI in LTE. The current transmission mode, the at least two transmission schemes included in the current transmission mode, and a downlink control information format corresponding to each of the at least two transmission schemes included in the current transmission mode may be shown in Table 2.

TABLE 2

| Transmission mode | Downlink control information format | Transmission scheme |
|---|---|---|
| TM-1 | Format 1A | Beamforming transmit diversity transmission scheme |
| | Format 1 | Open-loop transmit diversity transmission scheme |
| TM-2 | Format 1A | Beamforming transmit diversity transmission scheme |
| | Format 2A | Open-loop spatial multiplexing transmission scheme |
| TM-3 | Format 1A | Beamforming transmit diversity transmission scheme |
| | Format 1B | Closed-loop spatial multiplexing transmission scheme |
| TM-4 | Format 1A | Beamforming transmit diversity transmission scheme |
| | Format 1D | Multi-user multiple-input and multiple-output transmission scheme |
| TM-5 | Format 1A | Beamforming transmit diversity transmission scheme |
| | Format 1 | Open-loop transmit diversity transmission scheme |
| | Format 2A | Open-loop spatial multiplexing transmission scheme |
| TM-6 | Format 1A | Beamforming transmit diversity transmission scheme |
| | Format 1 | Open-loop transmit diversity transmission scheme |
| | Format 1B | Closed-loop spatial multiplexing transmission scheme |
| TM-7 | Format 1A | Beamforming transmit diversity transmission scheme |
| | Format 1 | Open-loop transmit diversity transmission scheme |
| | Format 1D | Multi-user multiple-input and multiple-output transmission scheme |
| TM-8 | Format 2A | Open-loop spatial multiplexing transmission scheme |
| | Format 2C | Unified transmit diversity scheme — Beamforming transmit diversity transmission scheme / Open-loop transmit diversity transmission scheme |
| TM-9 | Format 1B | Closed-loop spatial multiplexing transmission scheme |
| | Format 2C | Unified transmit diversity scheme — Beamforming transmit diversity transmission scheme / Open-loop transmit diversity transmission scheme |
| TM-10 | Format 1D | Multi-user multiple-input and multiple-output transmission scheme |
| | Format 2C | Unified transmit diversity scheme — Beamforming transmit diversity transmission scheme / Open-loop transmit diversity transmission scheme |

Referring to Table 2, the base station may generate the transmission scheme indication information. When the transmission scheme indication information indicates the beamforming transmit diversity transmission scheme in the TM-2 shown in Table 1, the transmission scheme indication information may be the format 1A. Therefore, that a base station generates transmission scheme indication information may be specifically: generating, by the base station, downlink control information whose format is the format 1A, where the downlink control information whose format is the format 1A is used to indicate the beamforming transmit diversity transmission scheme in the TM-2. This is not limited in this embodiment of the present invention.

It should be noted that this embodiment of the present invention is described by using an example in which the transmission scheme indication information is the format of the downlink control information. In actual application, the transmission scheme indication information may alternatively be content of the downlink control information. This is not limited in this embodiment of the present invention.

Step 402: The base station sends the transmission scheme indication information to UE.

After generating the transmission scheme indication information, the base station may send the transmission scheme indication information to the UE. Because the transmission scheme indication information may be the format of the downlink control information, that the base station sends the transmission scheme indication information to UE may be specifically: sending, by the base station, the downlink control information to the UE. The downlink control information may be DCI in LTE. The base station may send the downlink control information to the UE by using a first time-frequency resource on a physical downlink control channel (English: Physical downlink control channel, PDCCH for short). The first time-frequency resource may be a time-frequency resource in UE-specific search space. The downlink control information sent to the UE by using the time-frequency resource in the UE-specific search space is usually scrambled by using a radio network temporary identifier (English: Radio Network Temporary Identity, RNTI for short). For example, the base station sends the downlink control information whose format is the format 1A to the UE by using the first time-frequency resource, where the downlink control information whose format is the format 1A is scrambled by using the RNTI of the UE.

Step 403: The UE receives the transmission scheme indication information sent by the base station.

When the base station sends the transmission scheme indication information to the UE, the UE may receive the transmission scheme indication information sent by the base station. Because the transmission scheme indication information may be the format of the downlink control information, that the UE receives the transmission scheme indication information sent by the base station may be specifically: receiving, by the UE, the downlink control information sent by the base station, where the downlink control information may be DCI in LTE. For example, the UE receives the downlink control information whose format is the format 1A and that is sent by the base station. The UE may perform blind detection on the UE-specific search space in the PDCCH based on the RNTI of the UE, to receive the transmission scheme indication information. Specifically, the UE attempts to successively use a plurality of downlink control information formats to parse the UE-specific search space based on the RNTI of the UE and then perform a check; and if the check succeeds, the blind detection succeeds, and the UE may determine the format of the downlink control information. A specific implementation process of the blind detection by the UE to determine the downlink control information related to the UE and the format of the downlink control information has been clearly described in the related art. Therefore, for the specific implementation process thereof, refer to the related art. Details are not described in this embodiment of the present invention.

Step 404: The UE transmits data according to the transmission scheme indicated by the transmission scheme indication information.

After receiving the transmission scheme indication information sent by the base station, the UE may transmit the data according to the transmission scheme indicated by the transmission scheme indication information sent by the base station. In this embodiment of the present invention, the transmission scheme indication information may be the format of the downlink control information, and the UE receives the downlink control information through the blind detection. Therefore, after receiving the downlink control information, the UE may obtain the format of the downlink control information. Then the UE determines, from the at least two transmission schemes included in the current transmission mode, the transmission scheme corresponding to the format of the downlink control information, and determines, as the transmission scheme indicated by the transmission scheme indication information, the transmission scheme corresponding to the format of the downlink control information. Subsequently, the UE may transmit the data according to the transmission scheme indicated by the transmission scheme indication information.

For example, after obtaining, through the blind detection in the UE-specific search space, the downlink control information whose format is the format 1A, the UE may obtain the format of the downlink control information, where the format of the downlink control information is the format 1A. Then the UE determines, from the at least two transmission schemes included in the current transmission mode TM-2, a transmission scheme corresponding to the format 1A. Referring to Table 2, in the TM-2, the transmission scheme corresponding to the format 1A is the beamforming transmit diversity transmission scheme. Therefore, the UE determines the beamforming transmit diversity transmission scheme as the transmission scheme indicated by the transmission scheme indication information, and transmits the data according to the beamforming transmit diversity transmission scheme.

It should be noted that, in this embodiment of the present invention, when the beamforming transmit diversity transmission scheme and the open-loop transmit diversity transmission scheme are two sub-schemes in the UTD transmission scheme, the two sub-schemes are transparent to the UE. To be specific, when the beamforming transmit diversity transmission scheme and the open-loop transmit diversity transmission scheme are two sub-schemes in the UTD transmission scheme, the base station only needs to indicate the unified transmit diversity scheme to the UE, and does not need to indicate a sub-scheme in the unified transmit diversity scheme to the UE. For example, when the current transmission mode of the UE is the TM-8, the base station only needs to generate downlink control information whose format is the format 2C. After receiving the downlink control information, the UE may determine, from the TM-8, a transmission scheme corresponding to the format 2C. Referring to Table 2, the transmission scheme corresponding to the format 2C is the unified transmit diversity scheme. Therefore, the UE may transmit the data according to the unified transmit diversity scheme. Specifically, the UE may determine, based on the CSI, whether to transmit the data by using the beamforming transmit diversity transmission scheme in the unified transmit diversity scheme or by using the open-loop transmit diversity transmission scheme in the unified transmit diversity scheme. This is not limited in this embodiment of the present invention.

It should be additionally noted that a chronological order of steps of the data transmission method provided in this embodiment of the present invention may be properly adjusted, and the steps may be correspondingly added or deleted depending on a situation. Any variation readily figured out by persons skilled in the art within the technical scope disclosed in this application shall fall within the protection scope of this application, and details are not described herein.

In conclusion, according to the data transmission method provided in this embodiment of the present invention, the base station generates the transmission scheme indication information, and sends the transmission scheme indication information to the UE; and the UE transmits the data according to the transmission scheme indicated by the transmission scheme indication information, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme according to indication of the base station. This resolves a problem of relatively low flexibility in UE data transmission in the related art, and improves flexibility in UE data transmission.

According to the data transmission method provided in this embodiment of the present invention, when channel quality is relatively good, the base station may instruct the UE to transmit data according to the open-loop spatial multiplexing transmission scheme (or the closed-loop spatial multiplexing transmission scheme, or the multi-user multiple-input and multiple-output transmission scheme); when the channel quality deteriorates slightly, the base station may instruct the UE to transmit data according to the beamforming transmit diversity transmission scheme; and when the channel quality further deteriorates, the base station may instruct the UE to transmit data according to the open-loop transmit diversity transmission scheme. In other words, the base station may instruct, based on the channel quality, the UE to switch between the open-loop spatial multiplexing transmission scheme (or the closed-loop spatial multiplexing transmission scheme, or the multi-user multiple-input and multiple-output transmission scheme), the beamforming transmit diversity transmission scheme, and the open-loop transmit diversity transmission scheme. Therefore, indication by the base station to the UE is relatively flexible. This can resolve a problem in the related art that indication by a base station to UE is highly inaccurate.

In an existing LTE or LTE-A system, different TMs are designed for different UE channel quality. However, for the benefit of UE transmission reliability, a same transmit diversity scheme is designed for the different TMs in LTE or LTE-A. The transmit diversity scheme may be referred to as a fallback transmission scheme (English: fallback transmission scheme). The fallback transmission scheme may be an OLTD transmission scheme. When channel quality deteriorates, a base station can make the UE fall back to the fallback transmission scheme to transmit data, without switching a TM. In addition, each TM includes a default transmission scheme (English: transmission scheme). The default transmission scheme may be a non-transmit diversity MIMO transmission scheme. The non-transmit diversity MIMO transmission scheme may be, for example, a closed-loop spatial multiplexing transmission scheme or a multi-user MIMO transmission scheme. When the channel quality is relatively good, the base station can make the UE switch to the default transmission scheme to transmit data, without switching a TM. In the existing LTE or LTE-A system, TM2 is a transmit diversity scheme, and no additional fallback transmission scheme is required.

In the existing LTE or LTE-A system, when the UE switches from the default transmission scheme to the fallback transmission scheme, a beamforming manner needs to be completely changed. In addition, UE using the fallback transmission scheme transmission scheme can only exclusively occupy a time-frequency resource, and cannot perform spatial multiplexing of a time-frequency resource with other UEs. This has relatively great impact on spectral efficiency of the system. According to the data transmission method provided in this embodiment of the present invention, the at least two transmission schemes included in the current transmission mode include the beamforming transmit diversity transmission scheme; and when transmitting the data according to the beamforming transmit diversity transmission scheme, the UE can perform spatial multiplexing of a time-frequency resource with other UEs. Therefore, according to the data transmission method provided in this embodiment of the present invention, utilization of the time-frequency resource is relatively high, and spectral efficiency is relatively high.

Figure 6:
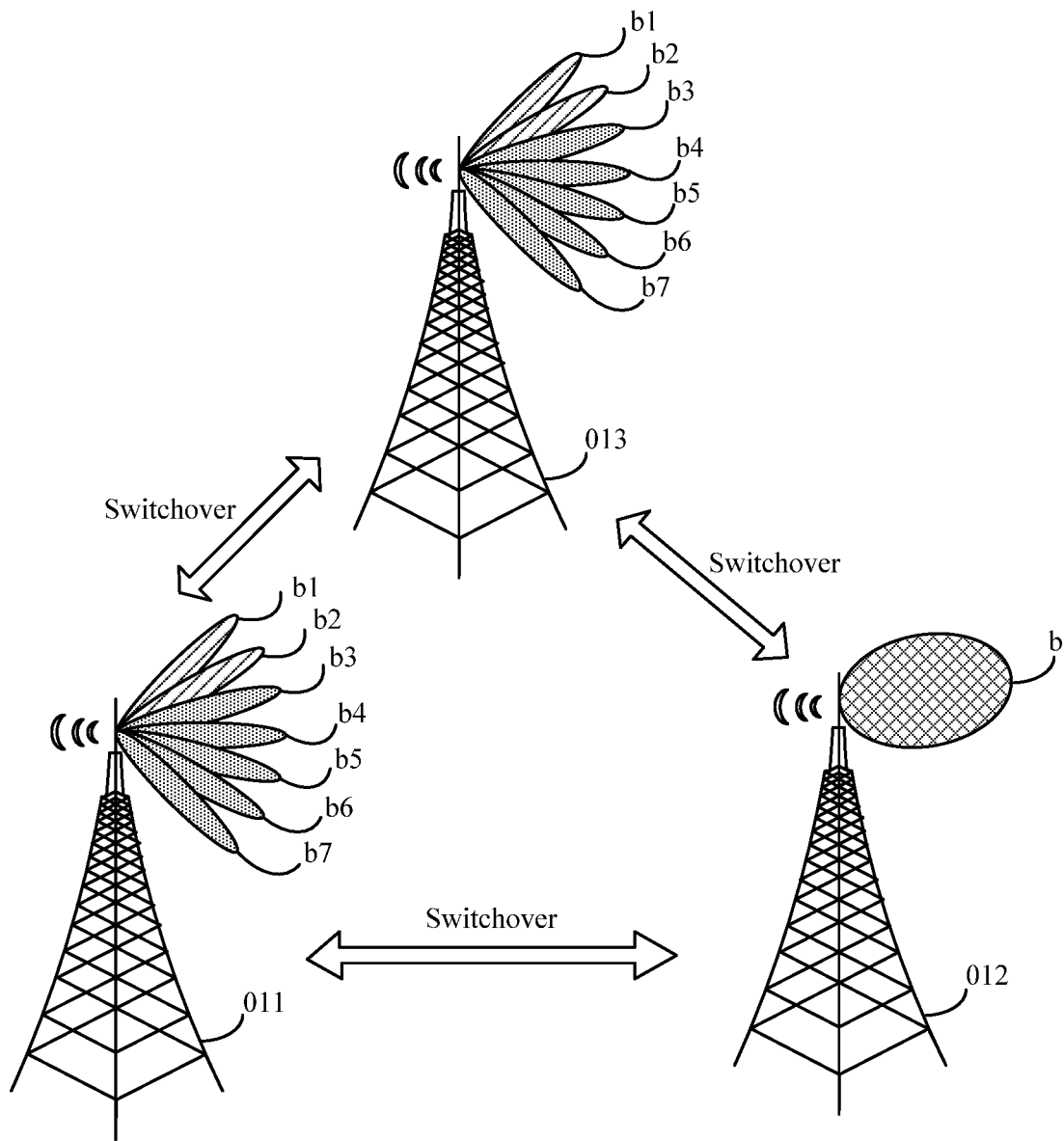
FIG. 6 is a schematic diagram of data transmission by UE according to at least two transmission schemes in a current transmission mode according to an embodiment of the present invention.
Figures 7, 8:
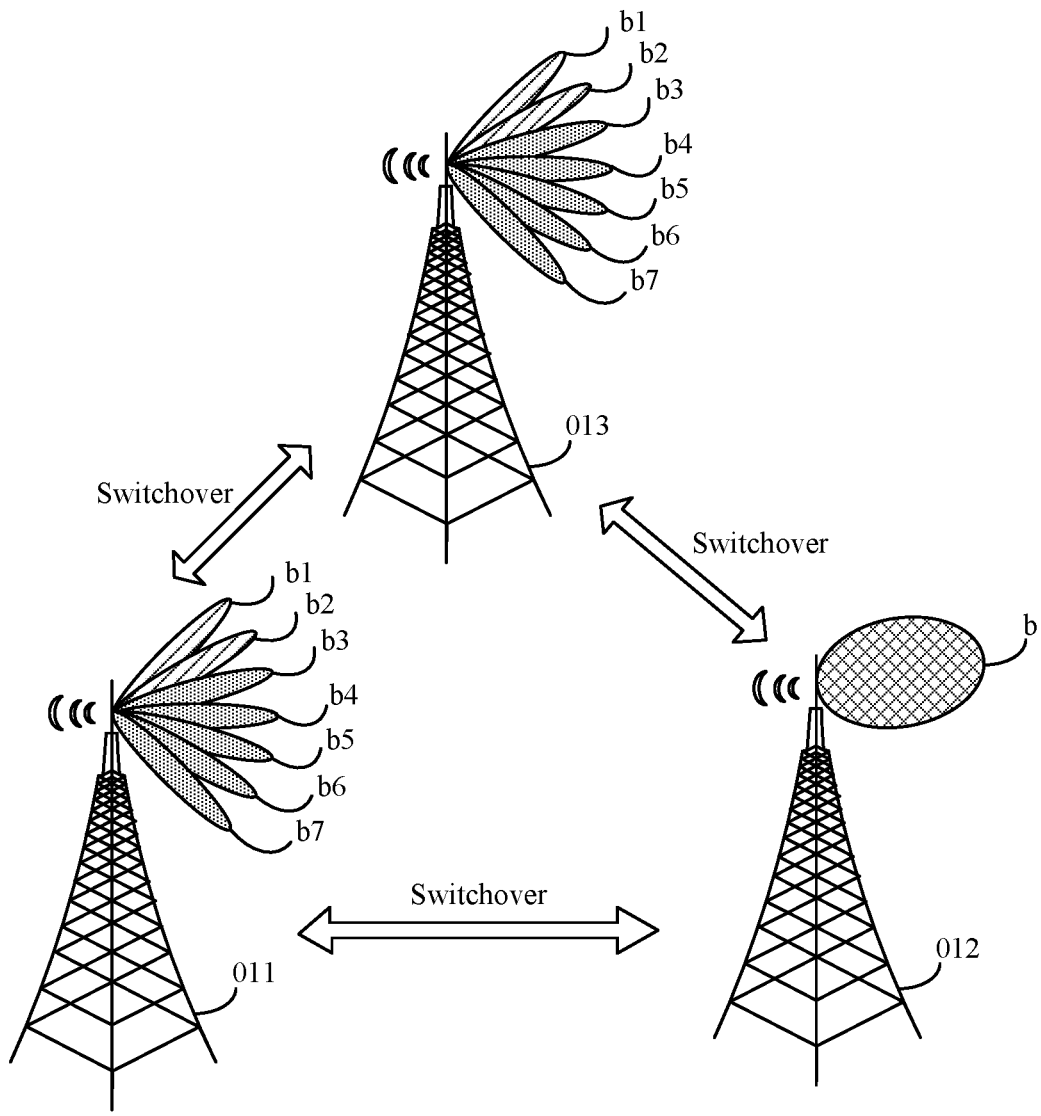
FIG. 7 is another schematic diagram of data transmission by UE according to at least two transmission schemes in a current transmission mode according to an embodiment of the present invention.
FIG. 8 is a method flowchart of a data sending method according to an embodiment of the present invention.

With reference to FIG. 5 to FIG. 7, the following briefly describes a difference between the data transmission method provided in the embodiments of the present invention and the data transmission method provided in the related art, in data transmission by UE according to a transmission scheme in a same transmission mode. FIG. 5 is a schematic diagram of data transmission by UE according to two transmission schemes in a same transmission mode in the related art. FIG. 6 and FIG. 7 are two schematic diagrams of data transmission by UE according to at least two transmission schemes in a current transmission mode according to embodiments of the present invention. It should be noted that, in FIG. 5 to FIG. 7, a base station 011, a base station 012, and a base station 013 are a same base station. For ease of description, in this embodiment of the present invention, different reference numerals are used to identify the base station in different transmission schemes. UE-02 is any one of UEs served by the base station.

Referring to FIG. 5, in the related art, when UE-02 (not shown in FIG. 5) in UEs served by the base station 011 transmits data by using a non-transmit diversity MIMO transmission scheme, a beam (English: beam) b1 and a beam b2 of the base station 011 are occupied. When UEs other than the UE-2 in the UEs served by the base station 011 transmit data, a beam b3, a beam b4, a beam b5, a beam b6, and a beam b7 of the base station 011 are occupied. When the UE-02 transmits the data by using the non-transmit diversity MIMO transmission scheme, different UEs served by the base station 011 can share a time-frequency resource. Therefore, when the UE-02 transmits the data by using the non-transmit diversity MIMO transmission scheme, the different UEs served by the base station 011 can perform spatial multiplexing of the time-frequency resource. Utilization of the time-frequency resource is relatively high, and spectral efficiency is relatively high.

When channel quality deteriorates, the base station may instruct the UE-02 to transmit data according to an NBTD transmission scheme in a current transmission mode. Referring to FIG. 5, in this case, the UE-02 exclusively occupies a beam b of the base station 012. As a result, UEs other than the UE-02 in UEs served by the base station 012 cannot use the beam b. Therefore, when the UE-02 transmits the data by using the NBTD transmission scheme, different UEs served by the base station 012 cannot perform spatial multiplexing of a time-frequency resource. Utilization of the time-frequency resource is relatively low, and spectral efficiency is relatively low.

In addition, a transmission mode in the related art includes only two transmission schemes. The base station 011 (or the base station 012) can instruct the UE-02 to transmit data by using only one of the two transmission schemes, resulting in relatively low flexibility in indication by the base station 011 (or the base station 012) to the UE.

FIG. 6 is described by using an example in which a beamforming transmit diversity transmission scheme and an open-loop transmit diversity transmission scheme are two independent transmission schemes. Referring to FIG. 6, in this embodiment of the present invention, when UE-02 (not shown in FIG. 6) in UEs served by the base station 011 transmits data by using any one of an open-loop spatial multiplexing transmission scheme, a closed-loop spatial multiplexing transmission scheme, and a multi-user multiple-input and multiple-output transmission scheme, the UE-02 occupies a beam b1 and a beam b2 of the base station 011. When UEs other than the UE-2 in the UEs served by the base station 011 transmit data, a beam b3, a beam b4, a beam b5, a beam b6, and a beam b7 of the base station 011 are occupied. When the UE-02 transmits the data by using any one of the open-loop spatial multiplexing transmission scheme, the closed-loop spatial multiplexing transmission scheme, and the multi-user multiple-input and multiple-output transmission scheme, different UEs served by the base station 011 can perform spatial multiplexing of a time-frequency resource. Utilization of the time-frequency resource is relatively high, and spectral efficiency is relatively high.

When channel quality deteriorates, the base station may instruct the UE-02 to transmit data according to a beamforming transmit diversity transmission scheme in a current transmission mode. In this case, the UE-02 occupies a beam b1 and a beam b2 of the base station 013. When UEs other than the UE-2 in UEs served by the base station 013 transmit data, a beam b3, a beam b4, a beam b5, a beam b6, and a beam b7 of the base station 013 are occupied. When the UE-02 transmits the data by using the beamforming transmit diversity transmission scheme, different UEs served by the base station 013 can share a time-frequency resource of the base station 013. Therefore, when the UE-02 transmits the data by using the beamforming transmit diversity transmission scheme, the different UEs served by the base station 013 can perform spatial multiplexing of the time-frequency resource. Utilization of the time-frequency resource is relatively high, and spectral efficiency is relatively high.

When the channel quality further deteriorates, the base station may instruct the UE-02 to transmit data according to an open-loop transmit diversity transmission scheme in the current transmission mode. In this case, the UE-02 exclusively occupies a beam b of the base station 012. As a result, UEs other than the UE-02 in UEs served by the base station 012 cannot use the beam b. Therefore, when the UE-02 transmits the data by using the open-loop transmit diversity transmission scheme, different UEs served by the base station 012 cannot perform spatial multiplexing of a time-frequency resource. Utilization of the time-frequency resource is relatively low, and spectral efficiency is relatively low.

FIG. 7 is described by using an example in which a beamforming transmit diversity transmission scheme and an open-loop transmit diversity transmission scheme are two sub transmission schemes of a unified transmit diversity scheme. Referring to FIG. 7, in this embodiment of the present invention, when UE-02 (not shown in FIG. 7) in UEs served by the base station 011 transmits data by using any one of an open-loop spatial multiplexing transmission scheme, a closed-loop spatial multiplexing transmission scheme, and a multi-user multiple-input and multiple-output transmission scheme, the UE-02 occupies a beam b1 and a beam b2 of the base station 011. When UEs other than the UE-2 in the UEs served by the base station 011 transmit data, a beam b3, a beam b4, a beam b5, a beam b6, and a beam b7 of the base station 011 are occupied. When the UE-02 transmits the data by using any one of the open-loop spatial multiplexing transmission scheme, the closed-loop spatial multiplexing transmission scheme, and the multi-user multiple-input and multiple-output transmission scheme, different UEs served by the base station 011 can perform spatial multiplexing of a time-frequency resource. Utilization of the time-frequency resource is relatively high, and spectral efficiency is relatively high.

When channel quality deteriorates, the base station may instruct the UE-02 to transmit data according to a unified transmit diversity scheme in a current transmission mode. In this case, a beamforming transmit diversity transmission scheme and an open-loop transmit diversity transmission scheme in the unified transmit diversity scheme are transparent to the UE-02. Therefore, the UE-02 may transmit data according to the beamforming transmit diversity transmission scheme in the unified transmit diversity scheme, or may transmit data according to the open-loop transmit diversity transmission scheme in the unified transmit diversity scheme. When the UE-02 transmits the data according to the beamforming transmit diversity transmission scheme in the unified transmit diversity scheme, the UE-02 occupies a beam b1 and a beam b2 of the base station 013. When UEs other than the UE-2 in UEs served by the base station 013 transmit data by using a transmit diversity transmission scheme, a beam b3, a beam b4, a beam b5, a beam b6, and a beam b7 of the base station 013 are occupied. When the UE-02 transmits the data by using the beamforming transmit diversity transmission scheme in the unified transmit diversity scheme, different UEs served by the base station 013 can share a time-frequency resource of the base station 013. Therefore, when the UE-02 transmits the data by using the beamforming transmit diversity transmission scheme in the unified transmit diversity scheme, the different UEs served by the base station 013 can perform spatial multiplexing of the time-frequency resource. Utilization of the time-frequency resource is relatively high, and spectral efficiency is relatively high.

When the channel quality further deteriorates, the UE-02 may transmit data according to the open-loop transmit diversity transmission scheme in the unified transmit diversity scheme. In this case, the UE-02 exclusively occupies a beam b of the base station 012. As a result, UEs other than the UE-02 in UEs served by the base station 012 cannot use the beam b. Therefore, when the UE-02 transmits the data according to the open-loop transmit diversity transmission scheme in the unified transmit diversity scheme, different UEs served by the base station 012 cannot perform spatial multiplexing of a time-frequency resource. Utilization of the time-frequency resource is relatively low, and spectral efficiency is relatively low.

In this embodiment of the present invention, when the UE-02 transmits the data according to the open-loop transmit diversity transmission scheme, the utilization of the time-frequency resource is relatively low, and the spectral efficiency is relatively low. However, the beamforming transmit diversity transmission scheme provided in this embodiment of the present invention may provide a transitional transmission scheme for a transmission scheme switchover process of UE. When the channel quality deteriorates slightly, the base station may instruct the UE to transmit the data according to the beamforming transmit diversity transmission scheme instead of the open-loop transmit diversity transmission scheme. When the UE transmits the data according to the beamforming transmit diversity transmission scheme, different UEs served by the base station can perform spatial multiplexing of a time-frequency resource. Therefore, flexibility in UE data transmission is relatively high.

The following describes in detail the beamforming transmit diversity transmission scheme in the embodiments of the present invention. The embodiments of the present invention describe in detail the beamforming transmit diversity transmission scheme by using a data sending method and a data receiving method as examples. Specifically, the embodiments of the present invention further provide a data sending method and a data receiving method. The data sending method and the data receiving method are also applicable to the implementation environment shown in FIG. 1.

FIG. 8 is a method flowchart of a data sending method according to an embodiment of the present invention. The data sending method may be performed by a transmit-end device. The transmit-end device may be the base station 01 in the implementation environment shown in FIG. 1. Referring to FIG. 8, the data sending method may include the following steps:

Step 501: Precode a plurality of initial spatial flows, to obtain a plurality of precoded data flows, where at least two of the plurality of initial spatial flows are obtained by performing transmit diversity processing on an original spatial flow.

Step 502: Transmit the plurality of precoded data flows.

In conclusion, according to the data sending method provided in this embodiment of the present invention, the transmit-end device precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the data sending method provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device. The at least one initial spatial flow may be obtained through transmit diversity processing, or may be obtained without transmit diversity processing.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal (Demodulation Reference Signal, DMRS) port, and the different precoding vectors correspond to different DMRS ports.

Optionally, the method further includes: precoding demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow; and sending the plurality of precoded demodulation reference signals.

All of the foregoing optional technical solutions may be combined in any manner to form an optional embodiment of this application. Details are not described herein.

In conclusion, according to the data sending method provided in this embodiment of the present invention, the transmit-end device precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the data sending method provided in this embodiment of the present invention, both transmit diversity and spatial multiplexing may be performed on a same time-frequency resource, thereby improving utilization of the time-frequency resource.

Figure 9:
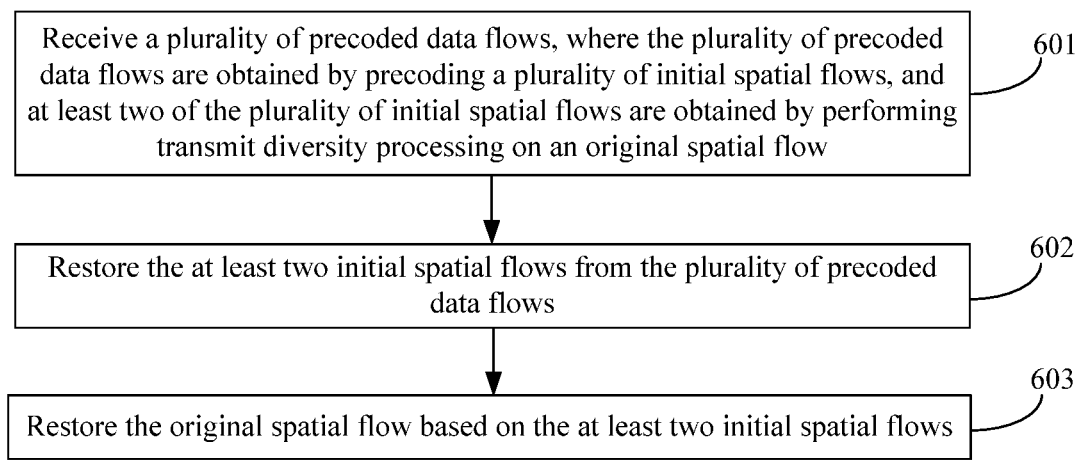
FIG. 9 is a method flowchart of a data receiving method according to an embodiment of the present invention.

FIG. 9 is a method flowchart of a data receiving method according to an embodiment of the present invention. The data receiving method may be performed by a receive-end device. The receive-end device may be any UE in the implementation environment shown in FIG. 1. Referring to FIG. 9, the data receiving method may include the following steps:

Step 601: Receive a plurality of precoded data flows, where the plurality of precoded data flows are obtained by precoding a plurality of initial spatial flows, and at least two of the plurality of initial spatial flows are obtained by performing transmit diversity processing on an original spatial flow.

Step 602: Restore the at least two initial spatial flows from the plurality of precoded data flows.

Step 603: Restore the original spatial flow based on the at least two initial spatial flows.

In conclusion, according to the data receiving method provided in this embodiment of the present invention, the receive-end device receives the plurality of precoded data flows, restores the at least two initial spatial flows from the plurality of precoded data flows, and restores the original spatial flow based on the at least two initial spatial flows, where the plurality of precoded data flows are obtained by precoding a plurality of initial spatial flows, and at least two of the plurality of initial spatial flows are obtained by performing transmit diversity processing on an original spatial flow. The at least two of the plurality of initial spatial flows are obtained by performing transmit diversity processing on the original spatial flow, and other initial spatial flows may be obtained without transmit diversity processing. Therefore, according to the data receiving method provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes: receiving a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow; and step 602 may include: restoring the at least two initial spatial flows from the plurality of precoded data flows based on precoded demodulation reference signals of the at least two initial spatial flows.

All of the foregoing optional technical solutions may be combined in any manner to form an optional embodiment of this application. Details are not described herein.

In conclusion, according to the data receiving method provided in this embodiment of the present invention, the receive-end device receives the plurality of precoded data flows, restores the at least two initial spatial flows from the plurality of precoded data flows, and restores the original spatial flow based on the at least two initial spatial flows, where the plurality of precoded data flows are obtained by precoding a plurality of initial spatial flows, and at least two of the plurality of initial spatial flows are obtained by performing transmit diversity processing on an original spatial flow. The at least two of the plurality of initial spatial flows are obtained by performing transmit diversity processing on the original spatial flow, and other initial spatial flows may be obtained without transmit diversity processing. Therefore, according to the data receiving method provided in this embodiment of the present invention, both transmit diversity and spatial multiplexing may be performed on a same time-frequency resource, thereby improving utilization of the time-frequency resource.

Figure 10:
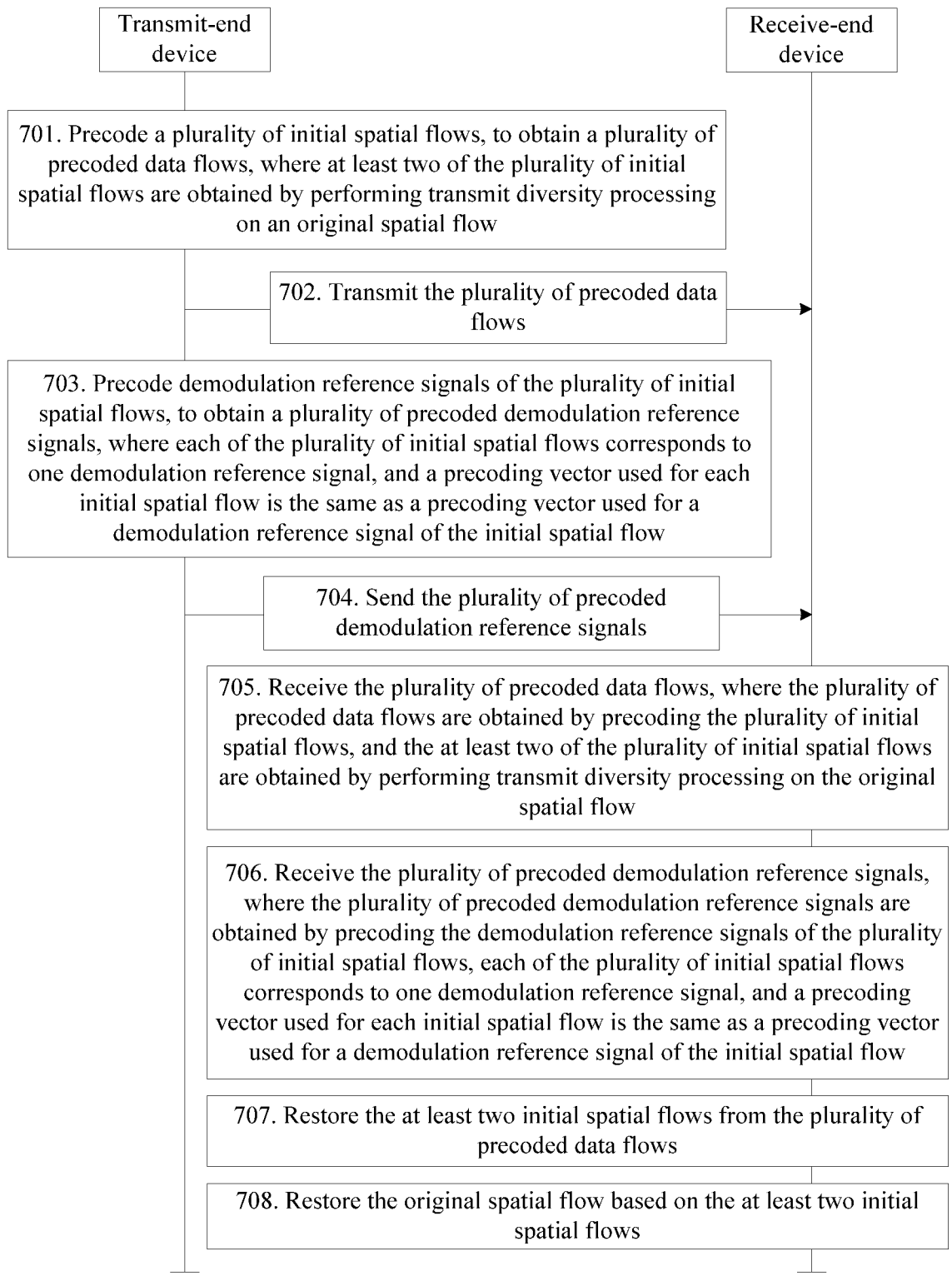
FIG. 10 is a method flowchart of another data transmission method according to an embodiment of the present invention.
Figure 11:
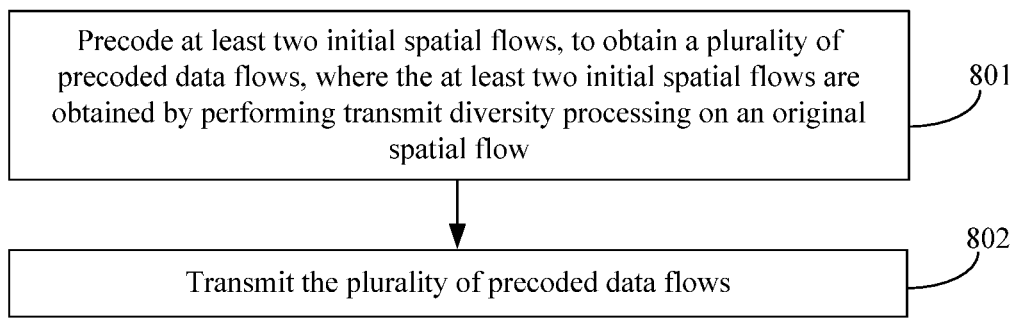
FIG. 11 is a method flowchart of another data sending method according to an embodiment of the present invention.
Figure 12:
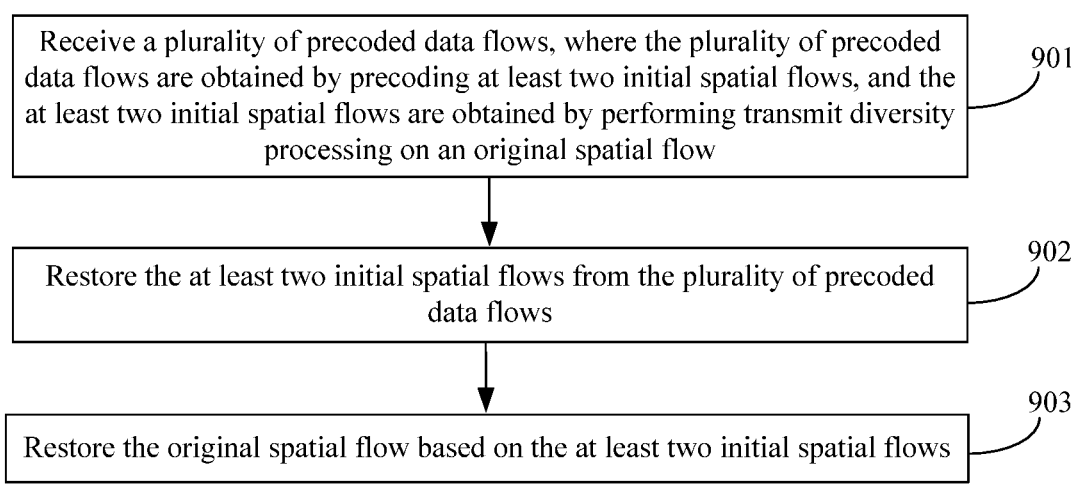
FIG. 12 is a method flowchart of another data receiving method according to an embodiment of the present invention.
Figure 13:
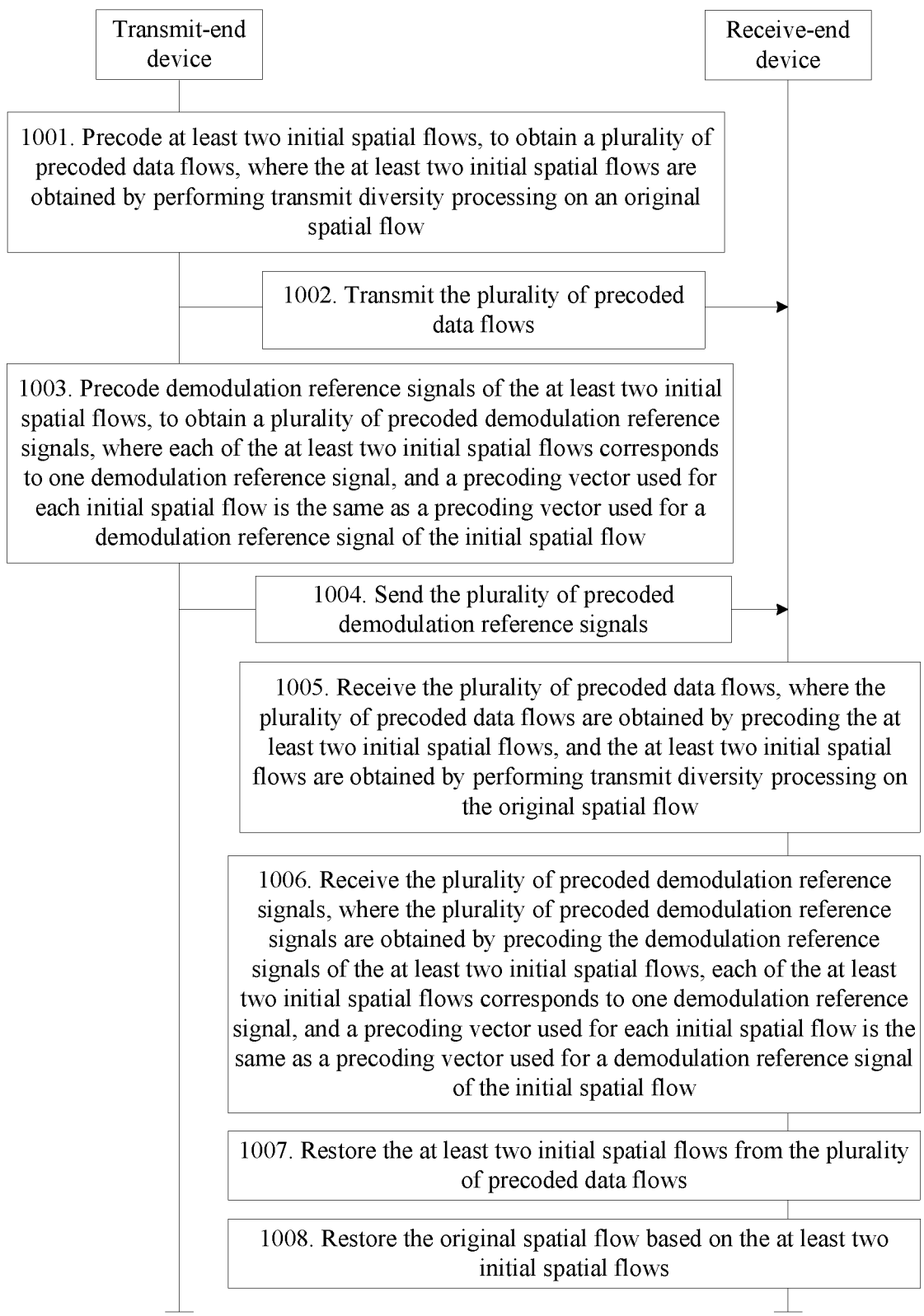
FIG. 13 is a method flowchart of still another data transmission method according to an embodiment of the present invention.

The data sending method described in FIG. 8, the data receiving method described in FIG. 9, a data transmission method described in FIG. 10, a data sending method described in FIG. 11, a data receiving method described in FIG. 12, and a data transmission method described in FIG. 13 may be all referred to as a beamforming transmit diversity transmission scheme, or a beamforming-based transmit diversity transmission scheme. The following describes the beamforming transmit diversity transmission scheme by using specific embodiments.

FIG. 10 is a method flowchart of another data transmission method according to an embodiment of the present invention. The data transmission method may be applied to a system that includes a transmit-end device and a receive-end device. The transmit-end device may be the base station in the implementation environment shown in FIG. 1. The receive-end device may be any UE in the implementation environment shown in FIG. 1. The system may be the MIMO system in the implementation environment shown in FIG. 1. Referring to FIG. 10, the data transmission method may include the following steps.

Step 701: The transmit-end device precodes a plurality of initial spatial flows, to obtain a plurality of precoded data flows, where at least two of the plurality of initial spatial flows are obtained by performing transmit diversity processing on an original spatial flow.

In this embodiment of the present invention, the transmit-end device may be the base station 01 in the implementation environment shown in FIG. 1, and the original spatial flow may correspond to a first receive-end device. When the transmit-end device is the base station 01 in the implementation environment shown in FIG. 1, the first receive-end device may be the UE-02 in the implementation environment shown in FIG. 1.

This embodiment of the present invention is described by using an LTE system as an example. In the LTE system, a processing procedure of a physical channel usually includes scrambling, modulation mapping, layer mapping, precoding, resource element mapping, and orthogonal frequency division multiplexing (English: Orthogonal Frequency Division Multiplexing, OFDM for short) signal generation. A processing object of the physical channel is usually a codeword. The codeword is usually a bitstream obtained through coding processing (including at least channel coding processing). A scrambled bitstream is obtained after the codeword is scrambled. A modulated symbol flow is obtained after the scrambled bitstream undergoes modulation mapping. After undergoing layer mapping, the modulated symbol flow is mapped to a plurality of symbol layers (a symbol layer is also referred to as a spatial flow or a spatial layer). A plurality of precoded symbol flows are obtained after the symbol layers are precoded. The precoded symbol flows are mapped to a plurality of resource elements through resource element (English: Resource Element, RE for short) mapping. These resource elements then undergo an OFDM signal generation phase to obtain an OFDM symbol flow. The OFDM symbol flow is then transmitted through an antenna port. In the OFDM signal generation phase, the OFDM symbol flow may be obtained through inverse fast Fourier transform (English: Inverse Fast Fourier Transform, IFFT for short). For a specific process, refer to the related art. Details are not described in this embodiment of the present invention.

In this embodiment of the present invention, the original spatial flow may be a spatial flow obtained after layer mapping. The spatial flow may also be referred to as a data flow, a symbol flow, or a symbol layer. In this embodiment of the present invention, a transmit diversity processing operation is added between the layer mapping and the precoding. When sending data to the receive-end device, the transmit-end device may perform transmit diversity processing on some original spatial flows obtained after the layer mapping, and may not perform transmit diversity processing on some original spatial flows obtained after the layer mapping. Therefore, the plurality of initial spatial flows may include an initial spatial flow obtained through transmit diversity processing, and may also include an initial spatial flow that does not undergo transmit diversity processing. The transmit diversity processing may include but is not limited to space-time transmit diversity processing, space-frequency transmit diversity processing, or space-time-frequency transmit diversity processing.

In MU-MIMO transmission, a precoding vector corresponding to a spatial flow may be designed to be orthogonal to a channel of another receiving device different from a target receive-end device of the spatial flow, to cancel interference. A precoded data flow obtained through precoding is also referred to as a precoded symbol flow. For the precoding mentioned in this application, refer to various precoding schemes used in an LTE standard in the related art, for example, a codebook-based precoding scheme and a non-codebook-based precoding scheme.

If performing transmit diversity processing on an original spatial flow is also considered as precoding, the method in this embodiment is equivalent to performing two-level precoding on an initial spatial flow obtained after layer mapping, and the two-level precoding may be expressed as Y=F1(F2(S)), where F2 represents precoding corresponding to transmit diversity (namely, transmit diversity processing), F1 represents beamforming precoding (namely, conventional precoding, for which reference may be made to precoding defined in the LTE standard), and S represents the original spatial flow. A quantity of ports finally used to send the precoded data flows varies depending on different transmit diversity processing manners. For example, when a transmit diversity processing manner is SFBC, the quantity of ports may be 2; or when a transmit diversity processing manner is FSTD, the quantity of ports may be 4.

In this embodiment of the present invention, some of the plurality of initial spatial flows may be initial spatial flows obtained through transmit diversity processing, and some initial spatial flows may be initial spatial flows that do not undergo transmit diversity processing. In other words, some initial spatial flows undergo transmit diversity processing and precoding processing, and some initial spatial flows undergo only precoding processing but no transmit diversity processing. In this embodiment of the present invention, a transmission scheme of performing both transmit diversity processing and precoding processing on an initial spatial flow may be referred to as a beamforming transmit diversity transmission scheme (English: Beamformed transmit diversity, BTD for short) transmission scheme. In this embodiment of the present invention, the original spatial flow may correspond to the first receive-end device, at least one of the plurality of initial spatial flows corresponds to a second receive-end device, at least two of the plurality of initial spatial flows are obtained by performing transmit diversity processing on another original spatial flow, and the another original spatial flow corresponds to a third receive-end device. Optionally, when the transmit-end device is the base station 01 in the implementation environment shown in FIG. 1, the original spatial flow may correspond to the first receive-end device. The first receive-end device may be the UE-02 in the implementation environment shown in FIG. 1. The UE-02 may transmit data by using the BTD transmission scheme. The at least one of the plurality of initial spatial flows corresponds to the second receive-end device. The second receive-end device may be the UE-03 in the implementation environment shown in FIG. 1. The UE-02 may transmit data by using a non-BTD transmission scheme. The non-BTD transmission scheme includes but is not limited to an open-loop spatial multiplexing transmission scheme, a closed-loop spatial multiplexing transmission scheme, a multi-user multiple-input and multiple-output transmission scheme, and the like. The at least two of the plurality of initial spatial flows are obtained by performing transmit diversity processing on the another original spatial flow, and the another original spatial flow corresponds to the third receive-end device. The third receive-end device may be the UE-04 in the implementation environment shown in FIG. 1.

For example, it is assumed that the original spatial flow is an original spatial flow 1, the another original spatial flow is an original spatial flow 2, an initial spatial flow 11 and an initial spatial flow 12 are obtained after the original spatial flow 1 undergoes transmit diversity processing, and the original spatial flow 1 further includes a spatial flow that does not undergo transmit diversity processing. After an original spatial flow undergoes transmit diversity processing, both a part of the original spatial flow that undergoes transmit diversity processing and a part of the original spatial flow that does not undergo transmit diversity processing may be referred to as initial spatial flows. Therefore, the original spatial flow 1 may further include an initial spatial flow 13 that does not undergo transmit diversity processing. An initial spatial flow 21 and an initial spatial flow 22 are obtained after the original spatial flow 2 undergoes transmit diversity processing. In this case, the original spatial flow 1 may correspond to the UE-02, the initial spatial flow 13 may correspond to the UE-03, and the original spatial flow 2 may correspond to the UE-04.

It should be noted that the data transmission method provided in this embodiment of the present invention may be applied to a single-user MIMO (English: Single-user MIMO, SU-MIMO for short) scenario, or may be applied to a multi-user MIMO (English: Multi-user MIMO, MU-MIMO for short) scenario. In the SU-MIMO scenario, some of a plurality of initial spatial flows may be obtained by performing transmit diversity on an original spatial flow, and the other spatial flows may not undergo transmit diversity processing. There may be more than one original spatial flow and more than one spatial flow that does not undergo transmit diversity processing. Certainly, in the SU-MIMO scenario, all the plurality of initial spatial flows may be obtained through transmit diversity processing, and these initial spatial flows may be obtained by performing transmit diversity processing on one or more original spatial flows. In step 701, the plurality of initial spatial flows that are to be precoded are obtained by performing transmit diversity on one or more original spatial flows, and the one or more original spatial flows may correspond to same UE. In the MU-MIMO scenario, the plurality of initial spatial flows correspond to a plurality of receive-end devices. In a possible implementation, at least two of the plurality of initial spatial flows are obtained by performing transmit diversity processing on an original spatial flow, and the original spatial flow corresponds to the first receive-end device. At least one of the plurality of spatial flows does not undergo transmit diversity processing, and the initial spatial flow that does not undergo transmit diversity processing corresponds to the second receive-end device. Therefore, both transmit diversity and spatial multiplexing are performed on a same time-frequency resource, thereby improving utilization of the time-frequency resource. It is assumed that the transmit-end device is the base station 01, the first receive-end device is the UE-02, the second receive-end device is the UE-03, and the base station 01 has ports x, x+1, . . . , and y in total. The UE-02 transmits data according to the BTD transmission scheme, and ports used by the UE-02 are ports x+1 and x+2. A transmit diversity processing manner used by the UE-02 is SFBC, remaining ports other than the ports x+1 and x+2 are allocated to the UE-03 for use, and the UE-03 transmits data by using the CLSM transmission scheme. Therefore, in the MU-MIMO scenario, for different UEs simultaneously scheduled by the base station, at least one UE transmits data by using the BTD transmission scheme. In addition, for the UE that transmits the data by using the BTD transmission scheme, an original spatial flow of the UE may include a spatial flow that does not undergo transmit diversity processing. Therefore, an original spatial flow corresponding to one or more of the plurality of UEs may include an initial spatial flow obtained through transmit diversity processing, an initial spatial flow obtained without transmit diversity processing, or any combination of the two types of initial spatial flows. In addition, there may be more than one initial spatial flow that does not undergo transmit diversity processing, and there may be one or more original spatial flows corresponding to initial spatial flows obtained through transmit diversity processing.

For example, at least two of the plurality of initial spatial flows are obtained by performing transmit diversity processing on an original spatial flow, and at least two of the plurality of initial spatial flows are obtained by performing transmit diversity processing on another original spatial flow. In other words, the plurality of initial spatial flows are obtained by performing transmit diversity processing on at least two different original spatial flows. The original spatial flow corresponds to the first receive-end device, and the another original spatial flow corresponds to the third receive-end device. Therefore, a same time-frequency resource is used for both transmit diversity and spatial multiplexing, thereby improving utilization of the time-frequency resource. It is assumed that the transmit-end device is the base station 01, the first receive-end device is the UE-02, the second receive-end device is the UE-03, the third receive-end device is the UE-04, and the base station 01 has ports x, x+1, and y in total. Both the UE-02 and the UE-04 transmit data by using the BTD transmission scheme, and the UE-03 transmits data by using the CLSM transmission scheme, where the UE-02 uses ports x+1 and x+2 for data transmission according to the BTD transmission scheme, the UE-03 uses ports x+3, . . . , and y-2 for data transmission according to the CLSM transmission scheme, and the UE-04 uses a port y-1 for data transmission according to the BTD transmission scheme. In addition, the UE-02 and/or the UE-04 may alternatively use some ports for data transmission according to the CLSM transmission scheme. In other words, in initial spatial flows corresponding to same UE, some initial spatial flows are initial spatial flows obtained through transmit diversity processing, and the other initial spatial flows are initial spatial flows that do not undergo transmit diversity processing (the initial spatial flow may also be referred to as an original spatial flow).

In this embodiment of the present invention, the plurality of initial spatial flows may be precoded by using a plurality of precoding vectors. Different initial spatial flows in the plurality of initial spatial flows correspond to different precoding vectors. Each initial spatial flow is associated with one demodulation reference signal (English: Demodulation reference signal, DMRS for short). The DMRS and the initial spatial flow may be precoded by using a same precoding vector. The receive-end device (for example, UE) may demodulate the initial spatial flow by using the DMRS, and the DMRS is identified by a DMRS port of the DMRS.

It should be noted that specific implementation processes of performing, by the transmit-end device, transmit diversity on the original spatial flow and precoding the plurality of initial spatial flows in step 701 have been clearly described in the related art. For the implementation processes thereof, refer to the related art. Details are not described in this embodiment of the present invention.

Step 702: The transmit-end device sends the plurality of precoded data flows to the receive-end device.

After obtaining the plurality of precoded data flows, the transmit-end device may send the plurality of precoded data flows to the receive-end device. The receive-end device may include the first receive-end device, the second receive-end device, and the third receive-end device. When the transmit-end device is the base station 01 in the implementation environment shown in FIG. 1, the first receive-end device may be the UE-02 in the implementation environment shown in FIG. 1, the second receive-end device may be the UE-03 in the implementation environment shown in FIG. 1, and the third receive-end device may be the UE-04 in the implementation environment shown in FIG. 1.

For example, the transmit-end device sends, to the first receive-end device, a plurality of precoded data flows that correspond to at least two initial spatial flows, that are obtained by performing transmit diversity processing and precoding on an original spatial flow, and that are in the plurality of precoded data flows; sends, to the second receive-end device, a plurality of precoded data flows that correspond to at least one of the plurality of initial spatial flows and that are in the plurality of precoded data flows; and sends, to the third receive-end device, a plurality of precoded data flows that correspond to at least two initial spatial flows, that are obtained by performing transmit diversity processing and precoding on another original spatial flow, and that are in the plurality of initial spatial flows.

For example, it is assumed that the original spatial flow is an original spatial flow 1, the another original spatial flow is an original spatial flow 2, an initial spatial flow 11 and an initial spatial flow 12 are obtained after the original spatial flow 1 undergoes transmit diversity processing, and the original spatial flow 1 further includes a spatial flow that does not undergo transmit diversity processing. After the original spatial flow undergoes transmit diversity processing, both a part of the original spatial flow that undergoes transmit diversity processing and a part of the original spatial flow that does not undergo transmit diversity processing may be referred to as initial spatial flows. Therefore, the original spatial flow 1 may further include an initial spatial flow 13 that does not undergo transmit diversity processing. An initial spatial flow 21 and an initial spatial flow 22 are obtained after the original spatial flow 2 undergoes transmit diversity processing. A precoded data flow 110 is obtained after the initial spatial flow 11 is precoded. A precoded data flow 120 is obtained after the initial spatial flow 12 is precoded. A precoded data flow 130 is obtained after the initial spatial flow 13 is precoded. A precoded data flow 210 is obtained after the initial spatial flow 21 is precoded. A precoded data flow 220 is obtained after the initial spatial flow 22 is precoded. Therefore, the transmit-end device sends the precoded data flow 110 and the precoded data flow 120 to the first receive-end device, sends the precoded data flow 130 to the second receive-end device, and sends the precoded data flow 210 and the precoded data flow 220 to the third receive-end device.

Step 703: The transmit-end device precodes demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow.

In this embodiment of the present invention, each of the plurality of initial spatial flows corresponds to one demodulation reference signal, and the transmit-end device may precode the demodulation reference signals of the plurality of initial spatial flows, to obtain the plurality of precoded demodulation reference signals. Optionally, the transmit-end device may precode a corresponding demodulation reference signal by using a precoding vector that is the same as that used for precoding an initial spatial flow.

The transmit-end device may precode the plurality of initial spatial flows by using a plurality of precoding vectors. Different initial spatial flows correspond to different precoding vectors. Each initial spatial flow is associated with one DMRS. The DMRS and the initial spatial flow are precoded by using a same precoding vector. The UE demodulates the initial spatial flow by using the DMRS, and the DMRS is identified by a DMRS port of the DMRS. It can be learned that each precoding vector corresponds to one DMRS port, and different precoding vectors correspond to different DMRS ports. A DMRS is used for channel demodulation. The transmit-end device precodes the DMRSs of the plurality of initial spatial flows, to obtain the plurality of precoded DMRSs, and sends the plurality of precoded DMRSs. Each initial spatial flow corresponds to one DMRS. A precoded data flow obtained by precoding each initial spatial flow may be demodulated by using a DMRS corresponding to the initial spatial flow. This is because a precoding vector used for each initial spatial flow is the same as a precoding vector used for a DMRS of the initial spatial flow. However, transmit diversity processing does not need to be performed on a DMRS of an initial spatial flow. In other words, after at least two initial spatial flows are obtained after an original spatial flow undergoes transmit diversity, these initial spatial flows are associated with respective DMRSs, and these DMRSs may be different from each other. The receive-end device demodulates the received precoded data flows based on DMRSs corresponding to DMRS ports, to obtain initial spatial flows. If the at least two initial spatial flows are obtained by performing transmit diversity on the original spatial flow, after the foregoing initial spatial flows are obtained through demodulation, the original spatial flow further needs to be restored from the at least two initial spatial flows based on a transmit diversity mode used when the transmit-end device generates the foregoing initial spatial flows.

Step 704: The transmit-end device sends the plurality of precoded demodulation reference signals to the receive-end device.

After obtaining the plurality of precoded demodulation reference signals, the transmit-end device may send the plurality of precoded demodulation reference signals to the receive-end device. Each initial spatial flow corresponds to one demodulation reference signal. Therefore, the transmit-end device may transmit a corresponding demodulation reference signal to a receive-end device corresponding to a corresponding initial spatial flow.

For example, the initial spatial flow 11 corresponds to a demodulation reference signal S11, the initial spatial flow S12 corresponds to a demodulation reference signal S12, the initial spatial flow 13 corresponds to a demodulation reference signal S13, the initial spatial flow 21 corresponds to a demodulation reference signal S21, the initial spatial flow 22 corresponds to a demodulation reference signal S22, a precoded demodulation reference signal S110 is obtained after the transmit-end device precodes the demodulation reference signal S11, a precoded demodulation reference signal S120 is obtained after the demodulation reference signal S12 is precoded, a precoded demodulation reference signal S130 is obtained after the demodulation reference signal S13 is precoded, a precoded demodulation reference signal S210 is obtained after the demodulation reference signal S21 is precoded, and a precoded demodulation reference signal S220 is obtained after the demodulation reference signal S22 is precoded. In this case, the transmit-end device sends the precoded demodulation reference signal S110 and the precoded demodulation reference signal S120 to the first receive-end device, sends the precoded demodulation reference signal S130 to the second receive-end device, and sends the precoded demodulation reference signal S210 and the precoded demodulation reference signal S220 to the third receive-end device.

It should be noted that, in this embodiment of the present invention, because the transmit-end device performs transmit diversity processing on the initial spatial flow, when demodulating data, the receive-end device not only needs to learn a DMRS port number, but also needs to learn a transmit diversity processing manner used when the transmit-end device performs transmit diversity processing on the original spatial flow. In this embodiment of the present invention, the transmit diversity processing manner used by the transmit-end device includes but is not limited to: space-time transmit diversity processing, space-frequency transmit diversity processing, or space-time-frequency transmit diversity processing. The following provides descriptions by using an example in which the transmit-end device is a base station, and the receive-end device is UE. When the transmit-end device is UE and the receive-end device is a base station, refer to the following descriptions. Specifically, the transmit-end device may send DMRS port information (for example, a port identifier) corresponding to each initial spatial flow and/or information about a transmit diversity processing manner used for the initial spatial flow, to the receive-end device by using downlink signaling. The receive-end device may demodulate data based on the DMRS port information corresponding to each initial spatial flow and/or the transmit diversity processing manner used for the initial spatial flow. The transmit-end device may send the DMRS port information corresponding to the initial spatial flow and/or the transmit diversity processing manner used for the initial spatial flow, to the receive-end device in the following manners.

Manner 1: The transmit-end device sends, by using the downlink signaling, the DMRS port identifier corresponding to each initial spatial flow and the information about the transmit diversity processing manner corresponding to each initial spatial flow. The information about the transmit diversity processing manner corresponding to each initial spatial flow is information about a transmit diversity processing manner used by the transmit-end device to perform transmit diversity processing on an original spatial flow to obtain a corresponding initial spatial flow.

For example, the base station uses downlink signaling to notify the UE-02 that identifiers of ports used by the base station to send DMRSs are x+1 and x+2, and notify the UE-02 that a transmit diversity processing manner used by the base station is the space-time transmit diversity processing. For another example, the base station uses downlink signaling to notify the UE-02 that identifiers of ports used by the base station to send DMRSs are x, x+1, x+2, and x+3, and notify the UE-02 that a transmit diversity processing manner used by the base station is the space-frequency transmit diversity processing. When the base station indicates the transmit diversity processing manner to the UE by using the downlink signaling, a fixed quantity of bits (bits) may be allocated to specify the transmit diversity processing manner. For example, 2 bits are used to indicate the transmit diversity processing manner. The 2 bits may indicate a total of four transmit diversity processing manners. For example, 00 indicates the space-time transmit diversity processing, and 01 indicates the space-frequency transmit diversity processing. Certainly, the transmit diversity processing manner may alternatively be indicated in another manner. When initial spatial flows of same UE include both an initial spatial flow obtained through transmit diversity processing and an initial spatial flow that does not undergo transmit diversity processing, the base station further needs to indicate which initial spatial flows undergo transmit diversity processing and transmit diversity processing manners thereof, and indicate which initial spatial flows do not undergo transmit diversity processing.

Manner 2: The transmit-end device sends, by using the downlink signaling, the DMRS port identifier corresponding to each initial spatial flow, where a DMRS port or DMRS port quantity corresponding to each initial spatial flow uniquely corresponds to a transmit diversity processing manner.

In Manner 2, a DMRS port identifier or DMRS port quantity corresponding to an initial spatial flow may indicate a transmit diversity processing manner There is a mapping relationship between the port identifier or the port quantity and the transmit diversity processing manner. The DMRS port or port quantity corresponding to each initial spatial flow uniquely corresponds to a transmit diversity processing manner. The receive-end device may determine the transmit diversity processing manner based on the mapping relationship and the DMRS port identifier or port quantity. For example, the mapping relationship is as follows: The space-time transmit diversity processing needs to be used for the ports x+1 and x+2, or the space-time transmit diversity processing needs to be used when two ports are used. In this case, when learning, by using downlink signaling, that DMRS port identifiers corresponding to an initial spatial flow are x+1 and x+2, the receive-end device determines, based on the mapping relationship, that a transmit diversity processing manner used by the transmit-end device is the space-time transmit diversity processing.

Manner 3: The transmit-end device sends, by using the downlink signaling, the information about the transmit diversity processing manner corresponding to each initial spatial flow, where the transmit diversity processing manner corresponding to each initial spatial flow uniquely corresponds to a group of DMRS ports.

The information about the transmit diversity processing manner may be an identifier of the transmit diversity processing manner, or the transmit-end device may indicate the transmit diversity processing manner by using one or more bits. In Manner 3, a transmit diversity processing manner corresponding to an initial spatial flow may indicate a DMRS port. There is a mapping relationship between the transmit diversity processing manner and a port identifier. The transmit diversity processing manner used for each initial spatial flow uniquely corresponds to a group of DMRS ports. The receive-end device may determine the DMRS ports based on the transmit diversity processing manner and the mapping relationship. For example, the base station uses downlink signaling to notify the UE-02 that a transmit diversity processing manner used by the base station is the space-time transmit diversity processing; and the mapping relationship is as follows: The ports x+1 and x+2 need to be used when the space-time transmit diversity processing is used to perform transmit diversity processing.

In this case, the UE-02 can learn, based on the transmit diversity processing manner indicated by the base station and the mapping relationship, that DMRS port numbers are x+1 and x+2.

Manner 4: The transmit-end device sends, by using the downlink signaling, a DMRS port quantity corresponding to each initial spatial flow, where the DMRS port quantity corresponding to each initial spatial flow uniquely corresponds to a transmit diversity processing manner and a group of DMRS ports.

In Manner 4, a DMRS port quantity corresponding to an initial spatial flow indicates a transmit diversity processing manner used for the initial spatial flow and a DMRS port. There is a mapping relationship between the transmit diversity processing manner, the DMRS port quantity, and the DMRS port. The DMRS port quantity corresponding to each initial spatial flow uniquely corresponds to a transmit diversity processing manner and a group of DMRS ports. The receive-end device may determine the transmit diversity processing manner and the DMRS ports based on the DMRS port quantity and the mapping relationship. For example, the base station uses downlink signaling to notify the UE-02 that a DMRS port quantity corresponding to an initial spatial flow is 2; and the mapping relationship is as follows: If a quantity of used ports is 2, the space-time transmit diversity processing needs to be used to perform transmit diversity processing, and DMRS port numbers x+1 and x+2 need to be used for a spatial flow. The UE-02 may determine, based on the mapping relationship and the DMRS port quantity corresponding to the initial spatial flow and indicated by the base station, that a transmit diversity processing manner used for the initial spatial flow is the space-time transmit diversity processing, and DMRS port numbers of the initial spatial flow are x+1 and x+2.

Manner 5: The transmit-end device sends, by using the downlink signaling, a DMRS port quantity corresponding to each initial spatial flow and the information about the transmit diversity processing manner corresponding to each initial spatial flow, where the DMRS port quantity corresponding to each initial spatial flow and the transmit diversity processing manner corresponding to each initial spatial flow uniquely correspond to a group of DMRS ports.

In Manner 5, a DMRS port quantity corresponding to an initial spatial flow and a transmit diversity processing manner corresponding to the initial spatial flow indicate a DMRS port corresponding to the initial spatial flow. There is a mapping relationship between the transmit diversity processing manner, the DMRS port quantity, and the DMRS port. The DMRS port quantity corresponding to each initial spatial flow and the transmit diversity processing manner corresponding to each initial spatial flow uniquely correspond to a group of DMRS ports. The receive-end device may determine the DMRS ports based on the mapping relationship, the DMRS port quantity, and the transmit diversity processing manner corresponding to the initial spatial flow, where the DMRS port quantity and the transmit diversity processing manner are indicated by the transmit-end device. For example, the base station uses downlink signaling to notify the UE-02 that a transmit diversity processing manner corresponding to an initial spatial flow is the space-time transmit diversity processing, and a DMRS port quantity is 2; and the mapping relationship is as follows: Ports whose DMRS port numbers are x+1 and x+2 need to be used for an initial spatial flow whose transmit diversity processing manner is the space-time transmit diversity processing and whose DMRS port quantity is 2.

It should be noted that, to describe the technical solution provided in this embodiment of the present invention more clearly, in the foregoing descriptions, a spatial flow obtained after layer mapping in an existing LTE standard is used to represent the original spatial flow or the spatial flow that does not undergo transmit diversity processing in this embodiment of the present invention. However, persons skilled in the art should understand that, a spatial flow in this embodiment of the present invention may be the spatial flow obtained after layer mapping in the existing LTE standard, or in a broad sense, may be any data flow (for example, a modulated symbol flow) that is obtained after processing such as coding and modulation and that needs to be transmitted after precoding. Details are not described herein.

Step 705: The receive-end device receives the plurality of precoded data flows, where the plurality of precoded data flows are obtained by precoding the plurality of initial spatial flows, and the at least two of the plurality of initial spatial flows are obtained by performing transmit diversity processing on the original spatial flow.

Step 705 may correspond to step 702. The receive-end device may receive the plurality of precoded data flows sent by the transmit-end device. The receive-end device may be the first receive-end device, the second receive-end device, or the third receive-end device. When the transmit-end device is the base station 01 in the implementation environment shown in FIG. 1, the first receive-end device may be the UE-02 in the implementation environment shown in FIG. 1, the second receive-end device may be the UE-03 in the implementation environment shown in FIG. 1, and the third receive-end device may be the UE-04 in the implementation environment shown in FIG. 1.

For example, when the receive-end device is the first receive-end device, the receive-end device receives the precoded data flows that correspond to the at least two initial spatial flows, that are obtained by performing transmit diversity processing and precoding on the original spatial flow, and that are in the plurality of precoded data flows transmitted by the transmit-end device; when the receive-end device is the second receive-end device, the receive-end device receives the precoded data flows that correspond to the at least one of the plurality of initial spatial flows and that are in the plurality of precoded data flows transmitted by the transmit-end device; or when the receive-end device is the third receive-end device, the receive-end device receives the precoded data flows that correspond to the at least two initial spatial flows, that are obtained by performing transmit diversity processing and precoding on the another original spatial flow, and that are in the plurality of initial spatial flows transmitted by the transmit-end device.

For example, also referring to step 702, when the receive-end device is the first receive-end device, the receive-end device receives the precoded data flow 110 and the precoded data flow 120 that are transmitted by the transmit-end device; when the receive-end device is the second receive-end device, the receive-end device receives the precoded data flow 130 transmitted by the transmit-end device; or when the receive-end device is the third receive-end device, the receive-end device receives the precoded data flow 210 and the precoded data flow 220 that are transmitted by the transmit-end device.

Step 706: Receive the plurality of precoded demodulation reference signals, where the plurality of precoded demodulation reference signals are obtained by precoding the demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow.

Step 706 may correspond to step 704. The receive-end device may receive the plurality of precoded demodulation reference signals sent by the transmit-end device. The plurality of precoded demodulation reference signals are obtained by precoding demodulation reference signals of the plurality of initial spatial flows. Each of the plurality of initial spatial flows corresponds to one demodulation reference signal. A precoding vector used for each initial spatial flow is the same as a precoding vector used for a demodulation reference signal of the initial spatial flow. The receive-end device may be the first receive-end device, the second receive-end device, or the third receive-end device. When the transmit-end device is the base station 01 in the implementation environment shown in FIG. 1, the first receive-end device may be the UE-02 in the implementation environment shown in FIG. 1, the second receive-end device may be the UE-03 in the implementation environment shown in FIG. 1, and the third receive-end device may be the UE-04 in the implementation environment shown in FIG. 1.

For example, also referring to step 704, when the receive-end device is the first receive-end device, the receive-end device receives the precoded demodulation reference signal S110 and the precoded demodulation reference signal S120 that are sent by the transmit-end device; when the receive-end device is the second receive-end device, the receive-end device receives the precoded demodulation reference signal S130 sent by the transmit-end device; or when the receive-end device is the third receive-end device, the receive-end device receives the precoded demodulation reference signal S210 and the precoded demodulation reference signal S220 that are sent by the transmit-end device.

Step 707: The receive-end device restores the at least two initial spatial flows from the plurality of precoded data flows.

After receiving the plurality of precoded data flows, the receive-end device may restore the at least two initial spatial flows from the plurality of precoded data flows. Optionally, the receive-end device may restore the at least two initial spatial flows from the plurality of precoded data flows based on precoded demodulation reference signals of the at least two initial spatial flows.

In this embodiment of the present invention, each precoding vector may correspond to one DMRS port, and different precoding vectors correspond to different DMRS ports. A DMRS is used for channel demodulation. The transmit-end device precodes the DMRSs of the plurality of initial spatial flows, to obtain the plurality of precoded DMRSs, and sends the plurality of precoded DMRSs. Each initial spatial flow corresponds to one DMRS. A precoded data flow obtained by precoding each initial spatial flow may be demodulated by using a DMRS corresponding to the initial spatial flow. This is because a precoding vector used for each initial spatial flow is the same as a precoding vector used for a DMRS of the initial spatial flow. However, transmit diversity processing does not need to be performed on a DMRS of an initial spatial flow. In other words, after at least two initial spatial flows are obtained after an original spatial flow undergoes transmit diversity, these initial spatial flows are associated with respective DMRSs, and these DMRSs may be different from each other. The receive-end device may demodulate the received precoded data flows based on DMRSs corresponding to DMRS ports, to obtain initial spatial flows.

It can be learned from the foregoing descriptions that, to restore the at least two initial spatial flows from the plurality of precoded data flows, the receive-end device needs to obtain the precoded DMRSs of the at least two initial spatial flows and DMRS ports corresponding to the at least two initial spatial flows. Therefore, the receive-end device further receives the plurality of precoded DMRSs. The plurality of precoded DMRSs are obtained by precoding the demodulation reference signals of the plurality of initial spatial flows. Each initial spatial flow corresponds to one DMRS. A precoding vector used for each initial spatial flow is the same as a precoding vector used for a DMRS of the initial spatial flow. Because a precoding vector used for each initial spatial flow is the same as a precoding vector used for a DMRS of the initial spatial flow, the at least two initial spatial flows may be obtained through demodulation based on the precoded DMRSs and the DMRS ports of the at least two initial spatial flows.

For example, when the receive-end device is the first receive-end device, the receive-end device restores the initial spatial flow 11 and the initial spatial flow 12 based on the precoded demodulation reference signal S110 and the precoded demodulation reference signal S120; when the receive-end device is the second receive-end device, the receive-end device restores the initial spatial flow 13 based on the precoded demodulation reference signal S130; or when the receive-end device is the third receive-end device, the receive-end device restores the initial spatial flow S220 based on the precoded demodulation reference signal S210 and the precoded demodulation reference signal S210. A process of restoring, by the receive-end device, an initial spatial flow from a precoded data flow based on a precoded demodulation reference signal of the initial spatial flow has been clearly described in the related art. For a specific implementation process thereof, refer to the related art. Details are not described in this embodiment of the present invention.

Step 708: The receive-end device restores the original spatial flow based on the at least two initial spatial flows.

After the receive-end device restores the at least two initial spatial flows, if the at least two initial spatial flows are obtained by performing transmit diversity on the original spatial flow, the receive-end device may restore the original spatial flow based on the at least two initial spatial flows. Specifically, the receive-end device may determine, based on related descriptions in step 704, a transmit diversity processing manner corresponding to the at least two initial spatial flows, and further restore the original spatial flow based on the at least two initial spatial flows and the corresponding transmit diversity processing manner.

For example, when the receive-end device is the first receive-end device, because the initial spatial flow 11 and the initial spatial flow 12 are obtained through transmit diversity processing, the receive-end device may determine a transmit diversity processing manner corresponding to the initial spatial flow 11 and the initial spatial flow 12. The transmit diversity processing manner corresponding to the initial spatial flow 11 and the initial spatial flow 12 may be the space-time transmit diversity processing. Then, the receive-end device restores the original spatial flow 1 based on the initial spatial flow 11, the initial spatial flow 12, and the space-time transmit diversity processing.

For example, when the receive-end device is the second receive-end device, because the initial spatial flow 13 does not undergo transmit diversity processing, the receive-end device does not need to perform step 708.

For example, when the receive-end device is the third receive-end device, because the initial spatial flow 21 and the initial spatial flow 22 are obtained through transmit diversity processing, the receive-end device may determine a transmit diversity processing manner corresponding to the initial spatial flow 21 and the initial spatial flow 22. The transmit diversity processing manner corresponding to the initial spatial flow 21 and the initial spatial flow 22 may be the space-frequency transmit diversity processing. Then, the receive-end device restores the original spatial flow 2 based on the initial spatial flow 21, the initial spatial flow 22, and the space-frequency transmit diversity processing.

It should be additionally noted that a chronological order of steps of the data transmission method provided in the embodiments of the present invention may be properly adjusted, and the steps may be correspondingly added or deleted depending on a situation. Any variation readily figured out by persons skilled in the art within the technical scope disclosed in this application shall fall within the protection scope of this application, and details are not described herein.

In conclusion, according to the data transmission method provided in this embodiment of the present invention, the transmit-end device precodes the plurality of initial spatial flows, to obtain the plurality of precoded data flows, and then sends the plurality of precoded data flows to the receive-end device, where the at least two of the plurality of initial spatial flows are obtained by performing transmit diversity processing on the original spatial flow; and the receive-end device restores the at least two initial spatial flows from the plurality of precoded data flows, and then restores the original spatial flow based on the at least two initial spatial flows. The at least two of the plurality of initial spatial flows are obtained by performing transmit diversity processing on the original spatial flow, and other initial spatial flows may be obtained without transmit diversity processing. Therefore, according to the data sending method provided in this embodiment of the present invention, both transmit diversity and spatial multiplexing may be performed on a same time-frequency resource, thereby improving utilization of the time-frequency resource.

FIG. 11 is a method flowchart of another data sending method according to an embodiment of the present invention. The data sending method may be performed by a transmit-end device. The transmit-end device may be any UE in the implementation environment shown in FIG. 1. Referring to FIG. 11, the data sending method may include the following steps:

Step 801: Precode at least two initial spatial flows, to obtain a plurality of precoded data flows, where the at least two initial spatial flows are obtained by performing transmit diversity processing on an original spatial flow.

Step 802: Transmit the plurality of precoded data flows.

In conclusion, according to the data sending method provided in this embodiment of the present invention, the transmit-end device precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the data sending method provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes: precoding demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow; and sending the plurality of precoded demodulation reference signals.

All of the foregoing optional technical solutions may be combined in any manner to form an optional embodiment of this application. Details are not described herein.

In conclusion, according to the data sending method provided in this embodiment of the present invention, the transmit-end device precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the data sending method provided in this embodiment of the present invention, both transmit diversity and spatial multiplexing may be performed on a same time-frequency resource, thereby improving utilization of the time-frequency resource.

FIG. 12 is a method flowchart of another data receiving method according to an embodiment of the present invention. The data receiving method may be performed by a receive-end device. The receive-end device may be the base station 01 in the implementation environment shown in FIG. 1. Referring to FIG. 12, the data receiving method may include the following steps:

Step 901: Receive a plurality of precoded data flows, where the plurality of precoded data flows are obtained by precoding at least two initial spatial flows, and the at least two initial spatial flows are obtained by performing transmit diversity processing on an original spatial flow.

Step 902: Restore the at least two initial spatial flows from the plurality of precoded data flows.

Step 903: Restore the original spatial flow based on the at least two initial spatial flows.

In conclusion, according to the data receiving method provided in this embodiment of the present invention, the receive-end device receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the data receiving method provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the method further includes: receiving a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow; and step 902 may include: restoring the at least two initial spatial flows from the plurality of precoded data flows based on precoded demodulation reference signals of the at least two initial spatial flows.

All of the foregoing optional technical solutions may be combined in any manner to form an optional embodiment of this application. Details are not described herein.

In conclusion, according to the data receiving method provided in this embodiment of the present invention, the receive-end device receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the data receiving method provided in this embodiment of the present invention, both transmit diversity and spatial multiplexing may be performed on a same time-frequency resource, thereby improving utilization of the time-frequency resource.

FIG. 13 is a method flowchart of still another data transmission method according to an embodiment of the present invention. The data transmission method may be applied to a system that includes a transmit-end device and a receive-end device. The transmit-end device may be any UE in the implementation environment shown in FIG. 1. The receive-end device may be the base station 01 in the implementation environment shown in FIG. 1. The system may be the MIMO system in the implementation environment shown in FIG. 1. Referring to FIG. 13, the data transmission method may include the following steps.

Step 1001: The transmit-end device precodes at least two initial spatial flows, to obtain a plurality of precoded data flows, where the at least two initial spatial flows are obtained by performing transmit diversity processing on an original spatial flow.

In this embodiment of the present invention, the transmit-end device may be UE, and the receive-end device may be a base station. For example, the transmit-end device is any UE, such as the UE-02, in the implementation environment shown in FIG. 1, and the receive-end device may be the base station 01 in the implementation environment shown in FIG. 1. The original spatial flow may correspond to a first transmit-end device, where the first transmit-end device is the UE-02. This embodiment of the present invention is described by using an LTE system as an example. In the LTE system, a processing procedure of a physical channel usually includes scrambling, modulation mapping, layer mapping, transform precoding, precoding, resource element mapping, and OFDM signal generation. A processing object of the physical channel is usually a codeword. The codeword is usually a bitstream obtained through coding processing (including at least channel coding processing). A scrambled bitstream is obtained after the codeword is scrambled. A modulated symbol flow is obtained after the scrambled bitstream undergoes modulation mapping. After undergoing layer mapping, the modulated symbol flow is mapped to a plurality of symbol layers (a symbol layer is also referred to as a spatial flow or a spatial layer). A plurality of precoded symbol flows are obtained after the symbol layers sequentially undergo transform precoding and precoding. The precoded symbol flows are mapped to a plurality of resource elements through resource element mapping. These resource elements then undergo an OFDM signal generation phase to obtain an OFDM symbol flow. The OFDM symbol flow is then transmitted through an antenna port.

In this embodiment of the present invention, the original spatial flow may be a spatial flow obtained after layer mapping. The spatial flow may also be referred to as a data flow, a symbol flow, or a symbol layer. In this embodiment of the present invention, a transmit diversity processing operation is added between the layer mapping and the transform precoding. When sending data to the receive-end device, the transmit-end device may perform transmit diversity processing on the original spatial flow obtained after the layer mapping, to obtain an initial spatial flow. The transmit diversity processing may include but is not limited to space-time transmit diversity processing, space-frequency transmit diversity processing, or space-time-frequency transmit diversity processing.

In this embodiment of the present invention, if performing transmit diversity processing on an original spatial flow is also considered as precoding, the method in this embodiment is equivalent to performing two-level precoding on an initial spatial flow obtained after layer mapping, and the two-level precoding may be expressed as Y=F1(F2(S)), where F2 represents precoding corresponding to transmit diversity (namely, transmit diversity processing), F1 represents beamforming precoding (namely, conventional precoding, for which reference may be made to precoding defined in the LTE standard), and S represents the original spatial flow. A quantity of ports finally used to send the precoded data flows varies depending on different transmit diversity processing manners. For example, when a transmit diversity processing manner is SFBC, the quantity of ports may be 2; or when a transmit diversity processing manner is FSTD, the quantity of ports may be 4.

In this embodiment of the present invention, the at least two initial spatial flows may be initial spatial flows obtained through transmit diversity processing. A transmission scheme of performing both transmit diversity processing and precoding processing on an initial spatial flow may be referred to as a BTD transmission scheme. In this embodiment of the present invention, the original spatial flow may correspond to the first transmit-end device. The first transmit-end device is the transmit-end device in this embodiment. Optionally, when the transmit-end device is the UE-02 in the implementation environment shown in FIG. 1, the original spatial flow may correspond to the UE-02. The UE-02 may transmit data by using the BTD transmission scheme. For example, assuming that the original spatial flow is an original spatial flow 1, an initial spatial flow may be obtained after the original spatial flow undergoes transmit diversity processing. Therefore, the original spatial flow 1 may correspond to the UE-02.

For example, the at least two initial spatial flows are obtained by performing transmit diversity processing on the original spatial flow, and the original spatial flow corresponds to the first transmit-end device. Assuming that the transmit-end device is the UE-02, the receive-end device is the base station 01, and the UE-02 has ports x, x+1, ..., and y in total, the UE-02 may use ports x+1 and x+2 for data transmission according to the BTD transmission scheme.

In this embodiment of the present invention, the at least two initial spatial flows may be precoded by using at least two precoding vectors. Different initial spatial flows in the at least two initial spatial flows correspond to different precoding vectors. Each initial spatial flow is associated with one DMRS. The DMRS and the initial spatial flow may be precoded by using a same precoding vector. The receive-end device (for example, a base station) may demodulate the initial spatial flow by using the DMRS, and the DMRS is identified by a DMRS port of the DMRS.

It should be noted that specific implementation processes of performing, by the transmit-end device, transmit diversity on the original spatial flow and precoding the at least two initial spatial flows in step 1001 have been clearly described in the related art. For the implementation processes thereof, refer to the related art. Details are not described in this embodiment of the present invention.

Step 1002: The transmit-end device sends the plurality of precoded data flows to the receive-end device.

After obtaining the plurality of precoded data flows, the transmit-end device may send the plurality of precoded data flows to the receive-end device. The transmit-end device may be the first transmit-end device, and may be specifically the UE-02 in the implementation environment shown in FIG. 1. The receive-end device may be the base station 01 in the implementation environment shown in FIG. 1. For example, the transmit-end device transmits, to the receive-end device, the plurality of precoded data flows that correspond to the at least two initial spatial flows and that are obtained by performing transmit diversity processing and precoding on the original spatial flow. It is assumed that the original spatial flow is an original spatial flow 1, an initial spatial flow 11 and an initial spatial flow 12 are obtained after the original spatial flow 1 undergoes transmit diversity processing, a precoded data flow 110 is obtained after the initial spatial flow 11 is precoded, and a precoded data flow 120 is obtained after the initial spatial flow 12 is precoded. Then the transmit-end device transmits the precoded data flow 110 and the precoded data flow 120 to the receive-end device.

Step 1003: The transmit-end device precodes demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow.

In this embodiment of the present invention, each of the at least two initial spatial flows corresponds to one demodulation reference signal, and the transmit-end device may precode the demodulation reference signals of the at least two initial spatial flows, to obtain the plurality of precoded demodulation reference signals. Optionally, the transmit-end device may precode a corresponding demodulation reference signal by using a precoding vector that is the same as that used for precoding an initial spatial flow.

The transmit-end device may precode the at least two initial spatial flows by using at least two precoding vectors. Different initial spatial flows correspond to different precoding vectors. Each initial spatial flow is associated with one DMRS. The DMRS and the initial spatial flow are precoded by using a same precoding vector. The base station may demodulate the initial spatial flow by using the DMRS, and the DMRS is identified by a DMRS port of the DMRS. It can be learned that each precoding vector corresponds to one DMRS port, and different precoding vectors correspond to different DMRS ports. A DMRS is used for channel demodulation. The transmit-end device precodes the DMRSs of the at least two initial spatial flows, to obtain the plurality of precoded DMRSs, and sends the plurality of precoded DMRSs. Each initial spatial flow corresponds to one DMRS. A precoded data flow obtained by precoding each initial spatial flow may be demodulated by using a DMRS corresponding to the initial spatial flow. This is because a precoding vector used for each initial spatial flow is the same as a precoding vector used for a DMRS of the initial spatial flow. However, transmit diversity processing does not need to be performed on a DMRS of an initial spatial flow. In other words, after at least two initial spatial flows are obtained after an original spatial flow undergoes transmit diversity, these initial spatial flows are associated with respective DMRSs, and these DMRSs may be different from each other. The receive-end device demodulates the received precoded data flows based on DMRSs corresponding to DMRS ports, to obtain initial spatial flows. If the at least two initial spatial flows are obtained by performing transmit diversity on the original spatial flow, after the foregoing initial spatial flows are obtained through demodulation, the original spatial flow further needs to be restored from the at least two initial spatial flows based on a transmit diversity mode used when the transmit-end device generates the foregoing initial spatial flows.

Step 1004: The transmit-end device sends the plurality of precoded demodulation reference signals to the receive-end device.

After obtaining the plurality of precoded demodulation reference signals, the transmit-end device may send the plurality of precoded demodulation reference signals to the receive-end device. For example, the initial spatial flow 11 corresponds to a demodulation reference signal S11, the initial spatial flow S12 corresponds to a demodulation reference signal S12, a precoded demodulation reference signal S110 is obtained after the transmit-end device precodes the demodulation reference signal S11, and a precoded demodulation reference signal S120 is obtained after the demodulation reference signal S12 is precoded. In this case, the transmit-end device sends the precoded demodulation reference signal S110 and the precoded demodulation reference signal S120 to the receive-end device.

It should be noted that, in this embodiment of the present invention, because the transmit-end device performs transmit diversity processing on the initial spatial flow, when demodulating data, the receive-end device not only needs to learn a DMRS port number, but also needs to learn a transmit diversity processing manner used when the transmit-end device performs transmit diversity processing on the original spatial flow. In this embodiment of the present invention, the transmit diversity processing manner used by the transmit-end device includes but is not limited to: space-time transmit diversity processing, space-frequency transmit diversity processing, or space-time-frequency transmit diversity processing. The following provides descriptions by using an example in which the transmit-end device is UE, and the receive-end device is a base station. Specifically, the transmit-end device may send DMRS port information (for example, a port identifier) corresponding to each initial spatial flow and/or information about a transmit diversity processing manner used for the initial spatial flow, to the receive-end device by using uplink signaling. The receive-end device may demodulate data based on the DMRS port information corresponding to each initial spatial flow and/or the transmit diversity processing manner used for the initial spatial flow. The transmit-end device may send the DMRS port information corresponding to the initial spatial flow and/or the transmit diversity processing manner used for the initial spatial flow, to the receive-end device in the following manners.

Manner 1: The transmit-end device sends, by using the uplink signaling, the DMRS port identifier corresponding to each initial spatial flow and the information about the transmit diversity processing manner corresponding to each initial spatial flow. The information about the transmit diversity processing manner corresponding to each initial spatial flow is information about a transmit diversity processing manner used by the transmit-end device to perform transmit diversity processing on an original spatial flow to obtain a corresponding initial spatial flow.

For example, the UE-02 uses uplink signaling to notify the base station that identifiers of ports used by the UE-02 to send DMRSs are x+1 and x+2, and notify the base station that a transmit diversity processing manner used by the UE-02 is the space-time transmit diversity processing. For another example, the UE-02 uses uplink signaling to notify the base station that identifiers of ports used by the UE-02 to send DMRSs are x, x+1, x+2, and x+3, and notify the base station that a transmit diversity processing manner used by the UE-02 is the space-frequency transmit diversity processing. When the UE indicates the transmit diversity processing manner to the base station by using the uplink signaling, a fixed quantity of bits may be allocated to specify the transmit diversity processing manner. For example, 2 bits are used to indicate the transmit diversity processing manner. The 2 bits may indicate a total of four transmit diversity processing manners. For example, 00 indicates the space-time transmit diversity processing, and 01 indicates the space-frequency transmit diversity processing. Certainly, the transmit diversity processing manner may alternatively be indicated in another manner.

Manner 2: The transmit-end device sends, by using the uplink signaling, the DMRS port identifier corresponding to each initial spatial flow, where a DMRS port or DMRS port quantity corresponding to each initial spatial flow uniquely corresponds to a transmit diversity processing manner.

In Manner 2, a DMRS port identifier or DMRS port quantity corresponding to an initial spatial flow may indicate a transmit diversity processing manner There is a mapping relationship between the port identifier or the port quantity and the transmit diversity processing manner. The DMRS port or port quantity corresponding to each initial spatial flow uniquely corresponds to a transmit diversity processing manner. The receive-end device may determine the transmit diversity processing manner based on the mapping relationship and the DMRS port identifier or port quantity. For example, the mapping relationship is as follows: The space-time transmit diversity processing needs to be used for the ports x+1 and x+2, or the space-time transmit diversity processing needs to be used when two ports are used. In this case, when learning, by using uplink signaling, that DMRS port identifiers corresponding to an initial spatial flow are x+1 and x+2, the receive-end device determines, based on the mapping relationship, that a transmit diversity processing manner used by the transmit-end device is the space-time transmit diversity processing.

Manner 3: The transmit-end device sends, by using the uplink signaling, the information about the transmit diversity processing manner corresponding to each initial spatial flow, where the transmit diversity processing manner corresponding to each initial spatial flow uniquely corresponds to a group of DMRS ports.

The information about the transmit diversity processing manner may be an identifier of the transmit diversity processing manner, or the transmit-end device may indicate the transmit diversity processing manner by using one or more bits. In Manner 3, a transmit diversity processing manner corresponding to an initial spatial flow may indicate a DMRS port. There is a mapping relationship between the transmit diversity processing manner and a port identifier. The transmit diversity processing manner used for each initial spatial flow uniquely corresponds to a group of DMRS ports. The receive-end device may determine the DMRS ports based on the transmit diversity processing manner and the mapping relationship. For example, the UE-02 uses uplink signaling to notify the base station that a transmit diversity processing manner used by the UE-02 is the space-time transmit diversity processing; and the mapping relationship is as follows: The ports x+1 and x+2 need to be used when the space-time transmit diversity processing is used to perform transmit diversity processing. In this case, the base station can learn, based on the transmit diversity processing manner indicated by the UE-02 and the mapping relationship, that DMRS port numbers are x+1 and x+2.

Manner 4: The transmit-end device sends, by using the uplink signaling, a DMRS port quantity corresponding to each initial spatial flow, where the DMRS port quantity corresponding to each initial spatial flow uniquely corresponds to a transmit diversity processing manner and a group of DMRS ports.

In Manner 4, a DMRS port quantity corresponding to an initial spatial flow indicates a transmit diversity processing manner used for the initial spatial flow and a DMRS port. There is a mapping relationship between the transmit diversity processing manner, the DMRS port quantity, and the DMRS port. The DMRS port quantity corresponding to each initial spatial flow uniquely corresponds to a transmit diversity processing manner and a group of DMRS ports. The receive-end device may determine the transmit diversity processing manner and the DMRS ports based on the DMRS port quantity and the mapping relationship. For example, the UE-02 uses uplink signaling to notify the base station that a DMRS port quantity corresponding to an initial spatial flow is 2; and the mapping relationship is as follows: If a quantity of used ports is 2, the space-time transmit diversity processing needs to be used to perform transmit diversity processing, and DMRS port numbers x+1 and x+2 need to be used for a spatial flow. The base station may determine, based on the mapping relationship and the DMRS port quantity corresponding to the initial spatial flow and indicated by the UE-02, that a transmit diversity processing manner used for the initial spatial flow is the space-time transmit diversity processing, and DMRS port numbers of the initial spatial flow are x+1 and x+2.

Manner 5: The transmit-end device sends, by using the uplink signaling, a DMRS port quantity corresponding to each initial spatial flow and the information about the transmit diversity processing manner corresponding to each initial spatial flow, where the DMRS port quantity corresponding to each initial spatial flow and the transmit diversity processing manner corresponding to each initial spatial flow uniquely correspond to a group of DMRS ports.

In Manner 5, a DMRS port quantity corresponding to an initial spatial flow and a transmit diversity processing manner corresponding to the initial spatial flow indicate a DMRS port corresponding to the initial spatial flow. There is a mapping relationship between the transmit diversity processing manner, the DMRS port quantity, and the DMRS port. The DMRS port quantity corresponding to each initial spatial flow and the transmit diversity processing manner corresponding to each initial spatial flow uniquely correspond to a group of DMRS ports. The receive-end device may determine the DMRS ports based on the mapping relationship, the DMRS port quantity, and the transmit diversity processing manner corresponding to the initial spatial flow, where the DMRS port quantity and the transmit diversity processing manner are indicated by the transmit-end device. For example, the UE-02 uses uplink signaling to notify the base station that a transmit diversity processing manner corresponding to an initial spatial flow is the space-time transmit diversity processing, and a DMRS port quantity is 2; and the mapping relationship is as follows: Ports whose DMRS port numbers are x+1 and x+2 need to be used for an initial spatial flow whose transmit diversity processing manner is the space-time transmit diversity processing and whose DMRS port quantity is 2.

It should be noted that, to describe the technical solution provided in this embodiment of the present invention more clearly, in the foregoing descriptions, a spatial flow obtained after layer mapping in an existing LTE standard is used to represent the original spatial flow in this embodiment of the present invention. However, persons skilled in the art should understand that, a spatial flow in this embodiment of the present invention may be the spatial flow obtained after layer mapping in the existing LTE standard, or in a broad sense, may be any data flow (for example, a modulated symbol flow) that is obtained after processing such as coding and modulation and that needs to be transmitted after precoding. Details are not described herein.

Step 1005: The receive-end device receives the plurality of precoded data flows, where the plurality of precoded data flows are obtained by precoding the at least two initial spatial flows, and the at least two initial spatial flows are obtained by performing transmit diversity processing on the original spatial flow.

Step 1005 may correspond to step 1002. The receive-end device may receive the plurality of precoded data flows sent by the transmit-end device. The transmit-end device may be the first transmit-end device. The first transmit-end device may be the UE-02 in the implementation environment shown in FIG. 1. The receive-end device is the base station 01 in the implementation environment shown in FIG. 1.

For example, the receive-end device receives the plurality of precoded data flows transmitted by the transmit-end device. The plurality of precoded data flows are precoded data flows that correspond to the at least two initial spatial flows and that are obtained by performing transmit diversity processing and precoding on the original spatial flow. Also referring to step 1002, the receive-end device receives the precoded data flow 110 and the precoded data flow 120 that are transmitted by the transmit-end device.

Step 1006: Receive the plurality of precoded demodulation reference signals, where the plurality of precoded demodulation reference signals are obtained by precoding the demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow.

Step 1006 may correspond to step 1004. The receive-end device may receive the plurality of precoded demodulation reference signals sent by the transmit-end device. The plurality of precoded demodulation reference signals are obtained by precoding the demodulation reference signals of the at least two initial spatial flows. Each of the at least two initial spatial flows corresponds to one demodulation reference signal. A precoding vector used for each initial spatial flow is the same as a precoding vector used for a demodulation reference signal of the initial spatial flow. The receive-end device may be the base station 01 in the implementation environment shown in FIG. 1. The transmit-end device (a first receive-end device) may be the UE-02 in the implementation environment shown in FIG. 1. For example, also referring to step 1004, the receive-end device receives the precoded demodulation reference signal S110 and the precoded demodulation reference signal S120 that are sent by the transmit-end device.

Step 1007: The receive-end device restores the at least two initial spatial flows from the plurality of precoded data flows.

After receiving the plurality of precoded data flows, the receive-end device may restore the at least two initial spatial flows from the plurality of precoded data flows. Optionally, the receive-end device may restore the at least two initial spatial flows from the plurality of precoded data flows based on precoded demodulation reference signals of the at least two initial spatial flows.

In this embodiment of the present invention, each precoding vector may correspond to one DMRS port, and different precoding vectors correspond to different DMRS ports. A DMRS is used for channel demodulation. The transmit-end device precodes the DMRSs of the plurality of initial spatial flows, to obtain the plurality of precoded DMRSs, and sends the plurality of precoded DMRSs. Each initial spatial flow corresponds to one DMRS. A precoded data flow obtained by precoding each initial spatial flow may be demodulated by using a DMRS corresponding to the initial spatial flow. This is because a precoding vector used for each initial spatial flow is the same as a precoding vector used for a DMRS of the initial spatial flow. However, transmit diversity processing does not need to be performed on a DMRS of an initial spatial flow. In other words, after at least two initial spatial flows are obtained after an original spatial flow undergoes transmit diversity, these initial spatial flows are associated with respective DMRSs, and these DMRSs may be different from each other. The receive-end device may demodulate the received precoded data flows based on DMRSs corresponding to DMRS ports, to obtain initial spatial flows.

It can be learned from the foregoing descriptions that, to restore the at least two initial spatial flows from the plurality of precoded data flows, the receive-end device needs to obtain the precoded DMRSs of the at least two initial spatial flows and DMRS ports corresponding to the at least two initial spatial flows. Therefore, the receive-end device further receives the plurality of precoded DMRSs. The plurality of precoded DMRSs are obtained by precoding the demodulation reference signals of the plurality of initial spatial flows. Each initial spatial flow corresponds to one DMRS. A precoding vector used for each initial spatial flow is the same as a precoding vector used for a DMRS of the initial spatial flow. Because a precoding vector used for each initial spatial flow is the same as a precoding vector used for a DMRS of the initial spatial flow, the at least two initial spatial flows may be obtained through demodulation based on the precoded DMRSs and the DMRS ports of the at least two initial spatial flows. For example, the receive-end device restores the initial spatial flow 11 and the initial spatial flow 12 based on the precoded demodulation reference signal S110 and the precoded demodulation reference signal S120. A process of restoring, by the receive-end device, an initial spatial flow from a precoded data flow based on a precoded demodulation reference signal of the initial spatial flow has been clearly described in the related art. For a specific implementation process thereof, refer to the related art. Details are not described in this embodiment of the present invention.

Step 1008: The receive-end device restores the original spatial flow based on the at least two initial spatial flows.

After the receive-end device restores the at least two initial spatial flows, if the at least two initial spatial flows are obtained by performing transmit diversity on the original spatial flow, the receive-end device may restore the original spatial flow based on the at least two initial spatial flows. Specifically, the receive-end device may determine, based on related descriptions in step 1004, a transmit diversity processing manner corresponding to the at least two initial spatial flows, and further restore the original spatial flow based on the at least two initial spatial flows and the corresponding transmit diversity processing manner.

For example, the receive-end device determines a transmit diversity processing manner corresponding to the initial spatial flow 11 and the initial spatial flow 12. The transmit diversity processing manner corresponding to the initial spatial flow 11 and the initial spatial flow 12 may be the space-time transmit diversity processing. Then, the receive-end device restores the original spatial flow 1 based on the initial spatial flow 11, the initial spatial flow 12, and the space-time transmit diversity processing.

It should be noted that, if the transmit-end device is UE, after obtaining an initial spatial flow by performing transmit diversity processing on an original spatial flow, the transmit-end device may directly transmit the initial spatial flow, without performing precoding.

It should further be noted that the receive-end device in this embodiment is a base station. When receiving a precoded data flow transmitted by the first transmit-end device, the base station may further receive, on a same time-frequency resource, a data flow transmitted by another transmit-end device, to implement spatial multiplexing of the time-frequency resource. The data flow transmitted by the another transmit-end device may be a precoded data flow obtained through transmit diversity processing and precoding; or may be a precoded data flow that undergoes precoding processing but does not undergo transmit diversity processing; or may be a data flow that undergoes transmit diversity processing but does not undergo precoding processing; or may be a data flow which partially undergoes transmit diversity processing and precoding processing, partially undergoes precoding processing but does not undergo transmit diversity processing, and partially undergoes transmit diversity processing but does not undergo precoding processing. For example, the receive-end device may further receive the precoded data flow 130 transmitted by a second transmit-end device. The precoded data flow 130 may be a precoded data flow obtained by precoding the initial spatial flow 13, and the initial spatial flow 13 does not undergo transmit diversity processing. In other words, the precoded data flow 130 is a data flow that undergoes precoding processing but does not undergo transmit diversity processing. For another example, the receive-end device may receive the precoded data flow 210 and the precoded data flow 220 that are transmitted by a third transmit-end device. The precoded data flow 210 may be a precoded data flow obtained by performing transmit diversity processing and precoding processing on the initial spatial flow 21. The precoded data flow 220 may be a precoded data flow obtained by performing transmit diversity processing and precoding processing on the initial spatial flow 22. In other words, the precoded data flow 210 and the precoded data flow 220 are data flows that undergo both transmit diversity processing and precoding processing.

It should be additionally noted that a chronological order of steps of the data transmission method provided in the embodiments of the present invention may be properly adjusted, and the steps may be correspondingly added or deleted depending on a situation. Any variation readily figured out by persons skilled in the art within the technical scope disclosed in this application shall fall within the protection scope of this application, and details are not described herein.

In conclusion, according to the data transmission method provided in this embodiment of the present invention, the transmit-end device precodes the plurality of initial spatial flows, to obtain the plurality of precoded data flows, and then sends the plurality of precoded data flows to the receive-end device, where the at least two of the plurality of initial spatial flows are obtained by performing transmit diversity processing on the original spatial flow; and the receive-end device restores the at least two initial spatial flows from the plurality of precoded data flows, and then restores the original spatial flow based on the at least two initial spatial flows. The at least two of the plurality of initial spatial flows are obtained by performing transmit diversity processing on the original spatial flow, and other initial spatial flows may be obtained without transmit diversity processing. Therefore, according to the data sending method provided in this embodiment of the present invention, both transmit diversity and spatial multiplexing may be performed on a same time-frequency resource, thereby improving utilization of the time-frequency resource.

The following are apparatus embodiments of this application. The apparatus embodiments may be used to execute the method embodiments of this application. For details not disclosed in the apparatus embodiments of this application, refer to the method embodiments of this application.

Figure 14:
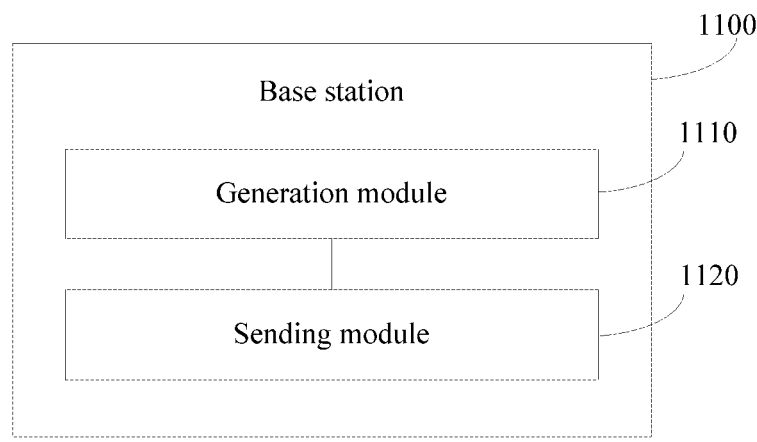
FIG. 14 is a block diagram of a base station according to an embodiment of the present invention.

FIG. 14 is a block diagram of a base station 1100 according to an embodiment of the present invention. The base station 1100 may be the base station 01 in the implementation environment shown in FIG. 1, and is configured to perform some of the methods provided in the embodiment shown in FIG. 4 and all of the methods provided in the embodiment shown in FIG. 2. Referring to FIG. 14, the base station 1100 may include:

a generation module 1110, configured to generate transmission scheme indication information, where the transmission scheme indication information is used to indicate one of at least two transmission schemes included in a current transmission mode, and the at least two transmission schemes include a beamforming transmit diversity transmission scheme; and a sending module 1120, configured to send the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the generation module 1110 is configured to generate downlink control information, where a format of the downlink control information corresponds to the transmission scheme that is indicated by the transmission scheme indication information and that is in the at least two transmission schemes included in the current transmission mode; and the sending module 1120 is configured to send the downlink control information.

In conclusion, the base station provided in this embodiment of the present invention generates the transmission scheme indication information, and sends the transmission scheme indication information to UE, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit data by using the beamforming transmit diversity transmission scheme according to indication of the base station. This resolves a problem of relatively low flexibility in UE data transmission in the related art, and improves flexibility in UE data transmission.

Figure 15:
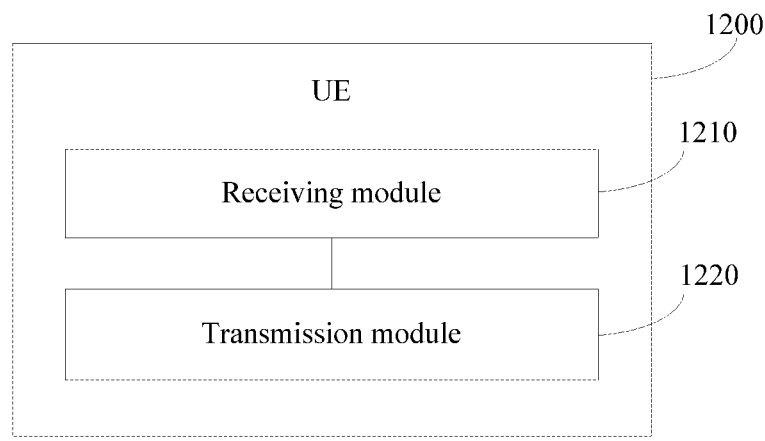
FIG. 15 is a block diagram of UE according to an embodiment of the present invention.

FIG. 15 is a block diagram of UE-1200 according to an embodiment of the present invention. The UE-1200 may be the UE-02 in the implementation environment shown in FIG. 1, and is configured to perform some of the methods provided in the embodiment shown in FIG. 4 and all of the methods provided in the embodiment shown in FIG. 3. Referring to FIG. 15, the UE-1200 may include:

a receiving module 1210, configured to receive transmission scheme indication information, where the transmission scheme indication information is used to indicate one of at least two transmission schemes included in a current transmission mode, and the at least two transmission schemes include a beamforming transmit diversity transmission scheme; and a transmission module 1220, configured to transmit data according to the transmission scheme indicated by the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the receiving module 1210 is configured to receive downlink control information, where a format of the downlink control information corresponds to the transmission scheme that is indicated by the transmission scheme indication information and that is in the at least two transmission schemes included in the current transmission mode.

Figure 16:
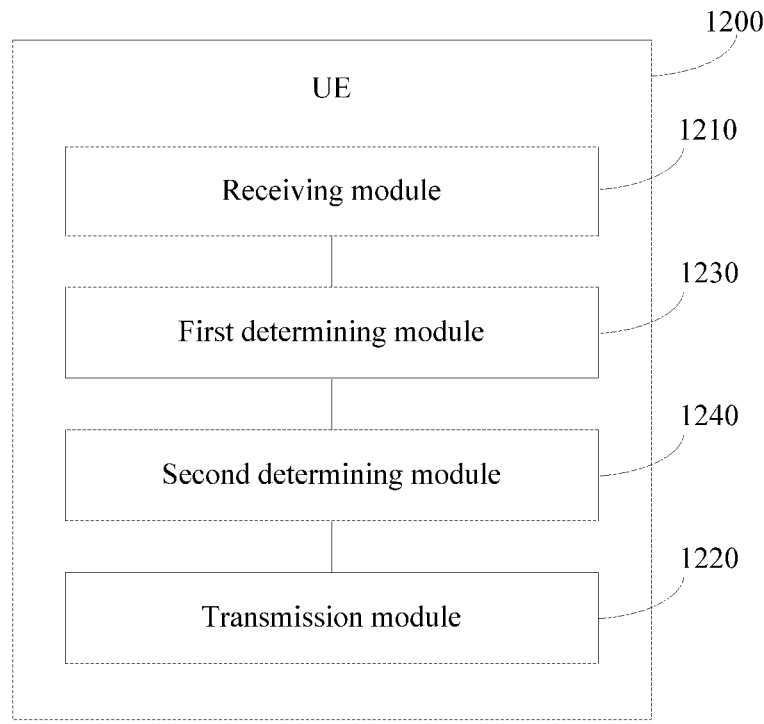
FIG. 16 is a block diagram of another UE according to an embodiment of the present invention.

FIG. 16 is a block diagram of another UE-1200 according to an embodiment of the present invention. Based on FIG. 15, the UE-1200 further includes:

a first determining module 1230, configured to determine, from the at least two transmission schemes included in the current transmission mode, the transmission scheme corresponding to the format of the downlink control information; and a second determining module 1240, configured to determine, as the transmission scheme indicated by the transmission scheme indication information, the transmission scheme corresponding to the format of the downlink control information.

In conclusion, the UE provided in this embodiment of the present invention receives the transmission scheme indication information, and transmits data according to the transmission scheme indicated by the transmission scheme indication information, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme. This resolves a problem of relatively low flexibility in UE data transmission in the related art, and improves flexibility in UE data transmission.

It should be noted that, when the base station and the UE that are provided in the foregoing embodiments transmit data, division of the foregoing functional modules is merely used as an example for description. In actual application, the foregoing functions may be allocated to different functional modules and implemented as required, that is, an inner structure of a device is divided into different functional modules to implement all or some of the functions described above. In addition, the base station, the UE, and the data transmission method that are provided in the foregoing embodiments belong to a same idea. For details about specific implementation processes thereof, refer to the method embodiments. Details are not described herein again.

Figure 17:
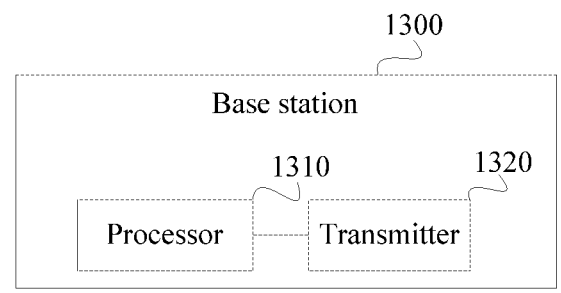
FIG. 17 is a block diagram of another base station according to an embodiment of the present invention.

FIG. 17 is a block diagram of a base station 1300 according to an embodiment of the present invention. The base station 1300 may be the base station 01 in the implementation environment shown in FIG. 1, and is configured to perform some of the methods provided in the embodiment shown in FIG. 4 and all of the methods provided in the embodiment shown in FIG. 2. Referring to FIG. 17, the base station 1300 may include a processor 1310 and a transmitter 1320. The processor 1310 is coupled to the transmitter 1320.

The processor 1310 is configured to generate transmission scheme indication information, where the transmission scheme indication information is used to indicate one of at least two transmission schemes included in a current transmission mode, and the at least two transmission schemes include a beamforming transmit diversity transmission scheme.

The transmitter 1320 is configured to send the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the processor 1310 is configured to generate downlink control information, where a format of the downlink control information corresponds to the transmission scheme that is indicated by the transmission scheme indication information and that is in the at least two transmission schemes included in the current transmission mode.

The transmitter 1320 is configured to send the downlink control information.

In conclusion, the base station provided in this embodiment of the present invention generates the transmission scheme indication information, and sends the transmission scheme indication information to UE, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit data by using the beamforming transmit diversity transmission scheme according to indication of the base station. This resolves a problem of relatively low flexibility in UE data transmission in the related art, and improves flexibility in UE data transmission.

Figure 18:
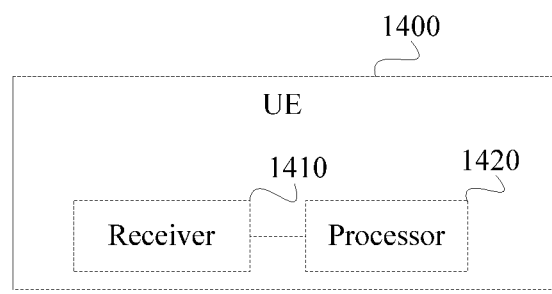
FIG. 18 is a block diagram of another UE according to an embodiment of the present invention.

FIG. 18 is a block diagram of UE-1400 according to an embodiment of the present invention. The UE-1400 may be the UE-02 in the implementation environment shown in FIG. 1, and is configured to perform some of the methods provided in the embodiment shown in FIG. 4 and all of the methods provided in the embodiment shown in FIG. 3. Referring to FIG. 18, the UE-1400 may include a receiver 1410 and a processor 1420. The receiver 1410 is coupled to the processor 1420.

The receiver 1410 is configured to receive transmission scheme indication information, where the transmission scheme indication information is used to indicate one of at least two transmission schemes included in a current transmission mode, and the at least two transmission schemes include a beamforming transmit diversity transmission scheme.

The processor 1420 is configured to transmit data according to the transmission scheme indicated by the transmission scheme indication information.

Optionally, the at least two transmission schemes further include an open-loop spatial multiplexing transmission scheme.

Optionally, the at least two transmission schemes further include a closed-loop spatial multiplexing transmission scheme.

Optionally, the at least two transmission schemes further include a multi-user multiple-input and multiple-output transmission scheme.

Optionally, the at least two transmission schemes further include an open-loop transmit diversity transmission scheme.

Optionally, the receiver 1410 is configured to receive downlink control information, where a format of the downlink control information corresponds to the transmission scheme that is indicated by the transmission scheme indication information and that is in the at least two transmission schemes included in the current transmission mode.

The processor 1420 is further configured to:

determine, from the at least two transmission schemes included in the current transmission mode, the transmission scheme corresponding to the format of the downlink control information; and determine, as the transmission scheme indicated by the transmission scheme indication information, the transmission scheme corresponding to the format of the downlink control information.

In conclusion, the UE provided in this embodiment of the present invention receives the transmission scheme indication information, and transmits data according to the transmission scheme indicated by the transmission scheme indication information, where the transmission scheme indication information is used to indicate one of the at least two transmission schemes included in the current transmission mode, and the at least two transmission schemes include the beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme. This resolves a problem of relatively low flexibility in UE data transmission in the related art, and improves flexibility in UE data transmission.

Figure 19:
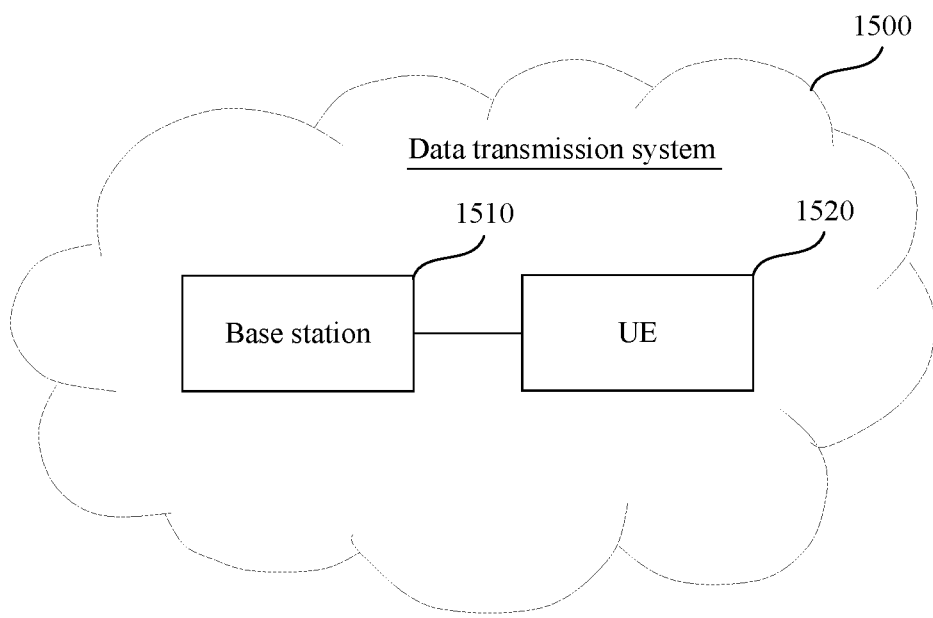
FIG. 19 is a schematic structural diagram of a data transmission system according to an embodiment of the present invention.

FIG. 19 is a schematic structural diagram of a data transmission system 1500 according to an embodiment of the present invention. Referring to FIG. 19, the data transmission system 1500 may include a base station 1510 and UE-1520.

In a possible implementation, the base station 1510 is the base station 1100 shown in FIG. 14, and the UE-1520 is the UE-1200 shown in FIG. 15 or FIG. 16.

In another possible implementation, the base station 1510 is the base station 1300 shown in FIG. 17, and the UE-1520 is the UE-1400 shown in FIG. 18.

In conclusion, according to the data transmission system provided in this embodiment of the present invention, the base station generates transmission scheme indication information, and sends the transmission scheme indication information to the UE; and the UE transmits data according to a transmission scheme indicated by the transmission scheme indication information, where the transmission scheme indication information is used to indicate one of at least two transmission schemes included in a current transmission mode, and the at least two transmission schemes include a beamforming transmit diversity transmission scheme. The current transmission mode includes the at least two transmission schemes, and the at least two transmission schemes include the beamforming transmit diversity transmission scheme. Therefore, the UE may transmit the data by using the beamforming transmit diversity transmission scheme according to indication of the base station. This resolves a problem of relatively low flexibility in UE data transmission in the related art, and improves flexibility in UE data transmission.

Figure 20:
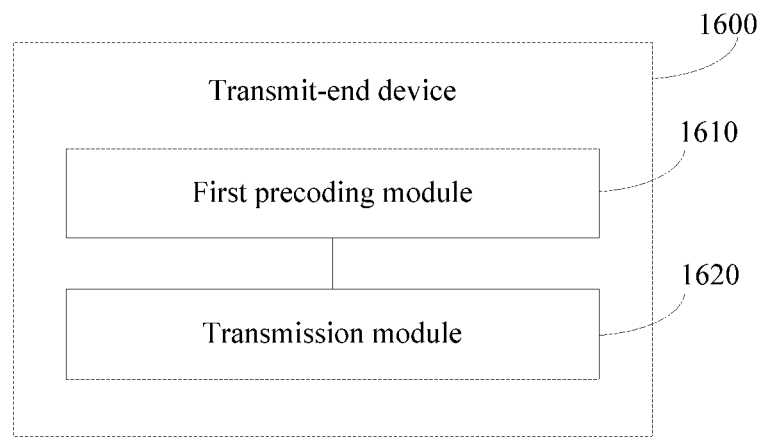
FIG. 20 is a block diagram of a transmit-end device according to an embodiment of the present invention.

FIG. 20 is a block diagram of a transmit-end device 1600 according to an embodiment of the present invention. The transmit-end device 1600 may be the base station 01 in the implementation environment shown in FIG. 1, and is configured to perform some of the methods provided in the embodiment shown in FIG. 10 and all of the methods provided in the embodiment shown in FIG. 8. Referring to FIG. 20, the transmit-end device 1600 may include:

a first precoding module 1610, configured to precode a plurality of initial spatial flows, to obtain a plurality of precoded data flows, where at least two of the plurality of initial spatial flows are obtained by performing transmit diversity processing on an original spatial flow; and a transmission module 1620, configured to transmit the plurality of precoded data flows.

In conclusion, the transmit-end device provided in this embodiment of the present invention precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the transmit-end device provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Figure 21:
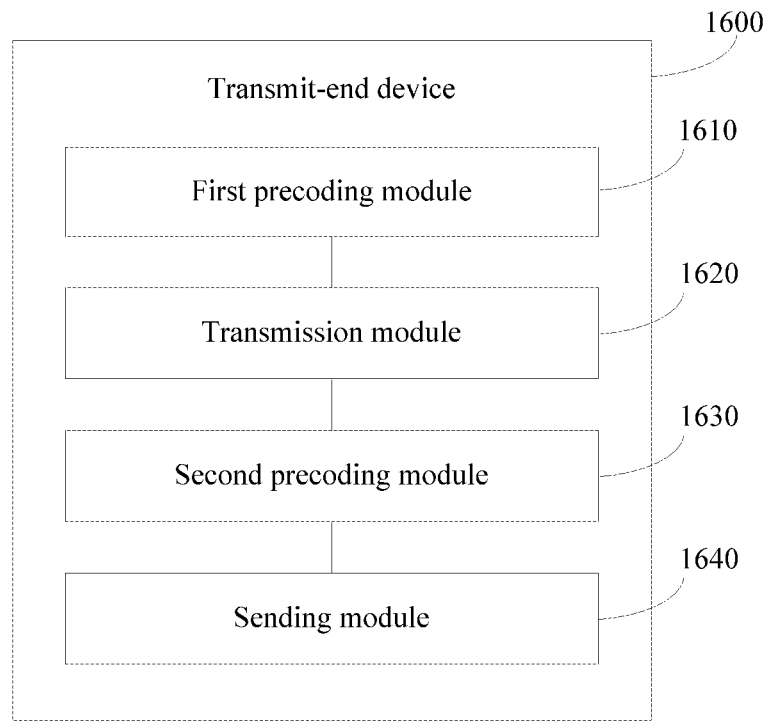
FIG. 21 is a block diagram of another transmit-end device according to an embodiment of the present invention.

Optionally, referring to FIG. 21, based on FIG. 20, the transmit-end device 1600 further includes:

a second precoding module 1630, configured to precode demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow; and a sending module 1640, configured to send the plurality of precoded demodulation reference signals.

In conclusion, the transmit-end device provided in this embodiment of the present invention precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the transmit-end device provided in this embodiment of the present invention, both transmit diversity and spatial multiplexing may be performed on a same time-frequency resource, thereby improving utilization of the time-frequency resource.

Figure 22:
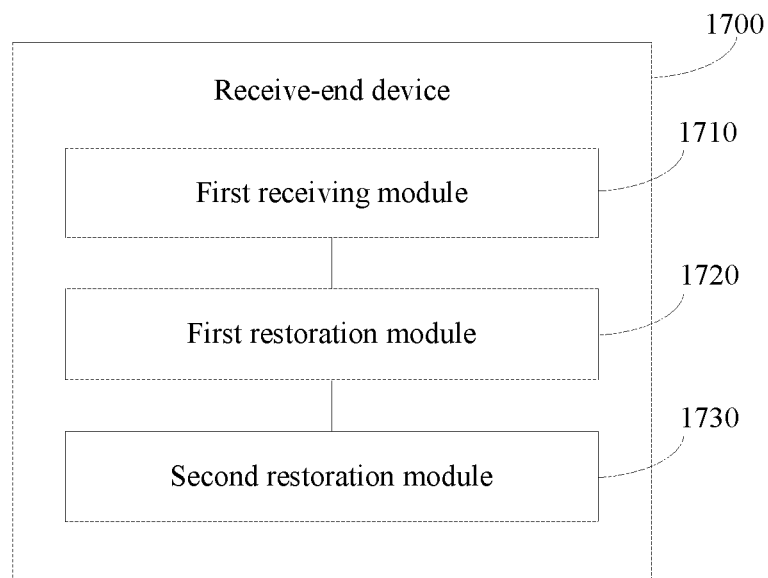
FIG. 22 is a block diagram of a receive-end device according to an embodiment of the present invention.

FIG. 22 is a block diagram of a receive-end device 1700 according to an embodiment of the present invention. The receive-end device 1700 may be any UE in the implementation environment shown in FIG. 1, and is configured to perform some of the methods provided in the embodiment shown in FIG. 10 and all of the methods provided in the embodiment shown in FIG. 9. Referring to FIG. 22, the receive-end device 1700 may include:

a first receiving module 1710, configured to receive a plurality of precoded data flows, where the plurality of precoded data flows are obtained by precoding a plurality of initial spatial flows, and at least two of the plurality of initial spatial flows are obtained by performing transmit diversity processing on an original spatial flow;

a first restoration module 1720, configured to restore the at least two initial spatial flows from the plurality of precoded data flows; and a second restoration module 1730, configured to restore the original spatial flow based on the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the plurality of initial spatial flows, and the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the receive-end device provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Figure 23:
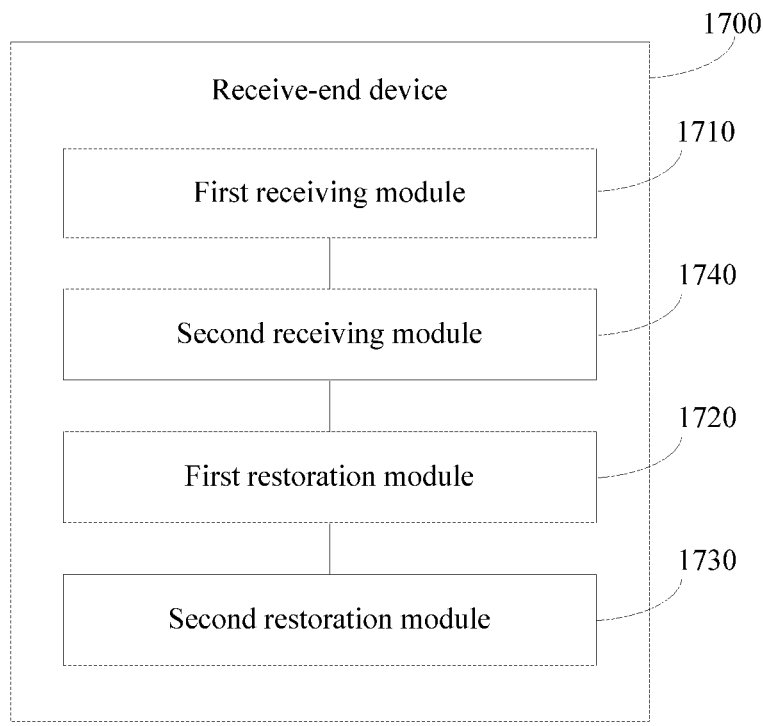
FIG. 23 is a block diagram of another receive-end device according to an embodiment of the present invention.

Optionally, referring to FIG. 23, based on FIG. 22, the receive-end device 1700 further includes:

a second receiving module 1740, configured to receive a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow.

The first restoration module 1720 is configured to restore the at least two initial spatial flows from the plurality of precoded data flows based on precoded demodulation reference signals of the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the plurality of initial spatial flows, and the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the receive-end device provided in this embodiment of the present invention, both transmit diversity and spatial multiplexing may be performed on a same time-frequency resource, thereby improving utilization of the time-frequency resource.

Figure 24:
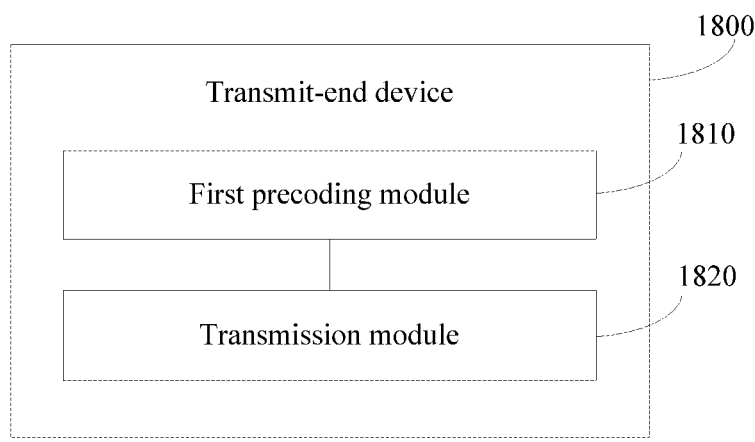
FIG. 24 is a block diagram of a transmit-end device according to an embodiment of the present invention.

FIG. 24 is a block diagram of a transmit-end device 1800 according to an embodiment of the present invention. The transmit-end device 1800 may be any UE in the implementation environment shown in FIG. 1, and is configured to perform some of the methods provided in the embodiment shown in FIG. 13 and all of the methods provided in the embodiment shown in FIG. 11. Referring to FIG. 24, the transmit-end device 1800 may include:

a first precoding module 1810, configured to precode at least two initial spatial flows, to obtain a plurality of precoded data flows, where the at least two initial spatial flows are obtained by performing transmit diversity processing on an original spatial flow; and a transmission module 1820, configured to transmit the plurality of precoded data flows.

In conclusion, the transmit-end device provided in this embodiment of the present invention precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the transmit-end device provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Figure 25:
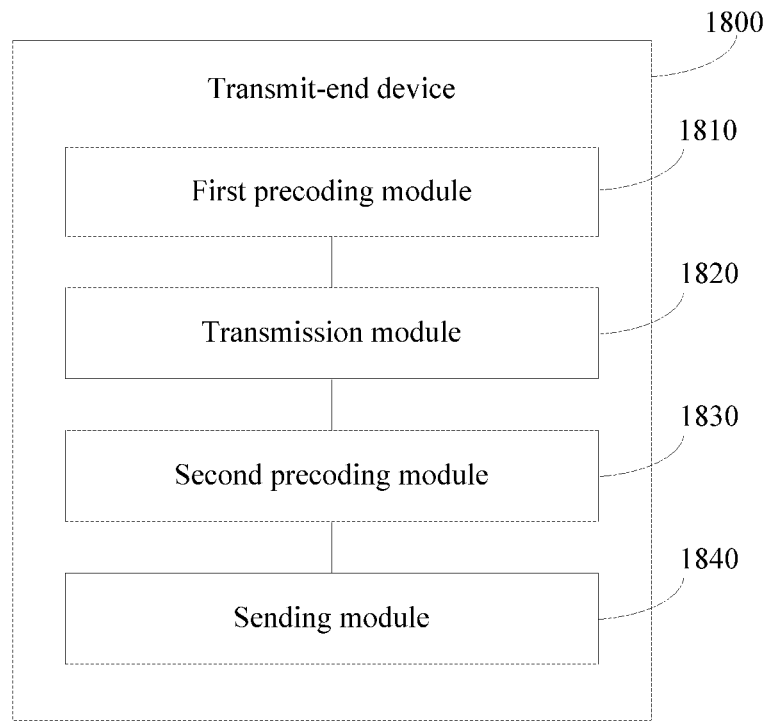
FIG. 25 is a block diagram of another transmit-end device according to an embodiment of the present invention.

Optionally, referring to FIG. 25, based on FIG. 24, the transmit-end device 1800 further includes:

a second precoding module 1830, configured to precode demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow; and a sending module 1840, configured to send the plurality of precoded demodulation reference signals.

In conclusion, the transmit-end device provided in this embodiment of the present invention precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the transmit-end device provided in this embodiment of the present invention, both transmit diversity and spatial multiplexing may be performed on a same time-frequency resource, thereby improving utilization of the time-frequency resource.

Figure 26:
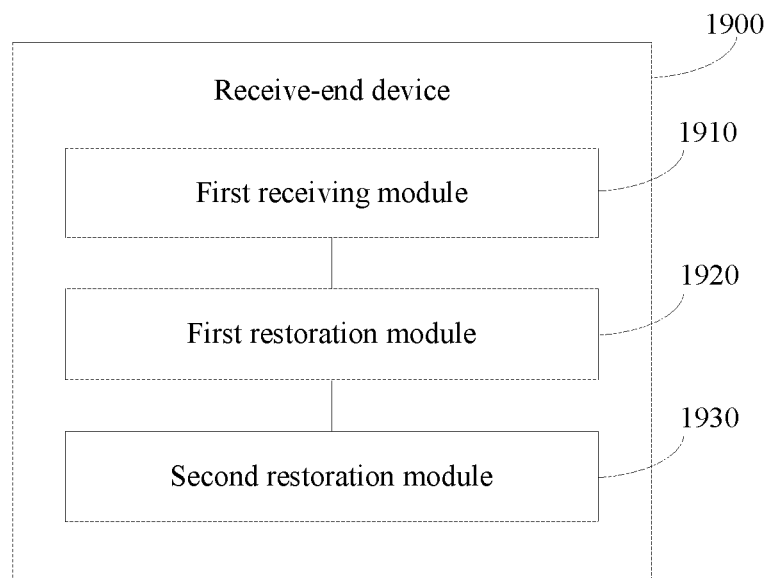
FIG. 26 is a block diagram of a receive-end device according to an embodiment of the present invention.

FIG. 26 is a block diagram of a receive-end device 1900 according to an embodiment of the present invention. The receive-end device 1900 may be the base station 01 in the implementation environment shown in FIG. 1, and is configured to perform some of the methods provided in the embodiment shown in FIG. 13 and all of the methods provided in the embodiment shown in FIG. 12. Referring to FIG. 26, the receive-end device 1900 may include:

a first receiving module 1910, configured to receive a plurality of precoded data flows, where the plurality of precoded data flows are obtained by precoding at least two initial spatial flows, and the at least two initial spatial flows are obtained by performing transmit diversity processing on an original spatial flow;

a first restoration module 1920, configured to restore the at least two initial spatial flows from the plurality of precoded data flows; and a second restoration module 1930, configured to restore the original spatial flow based on the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the receive-end device provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Figure 27:
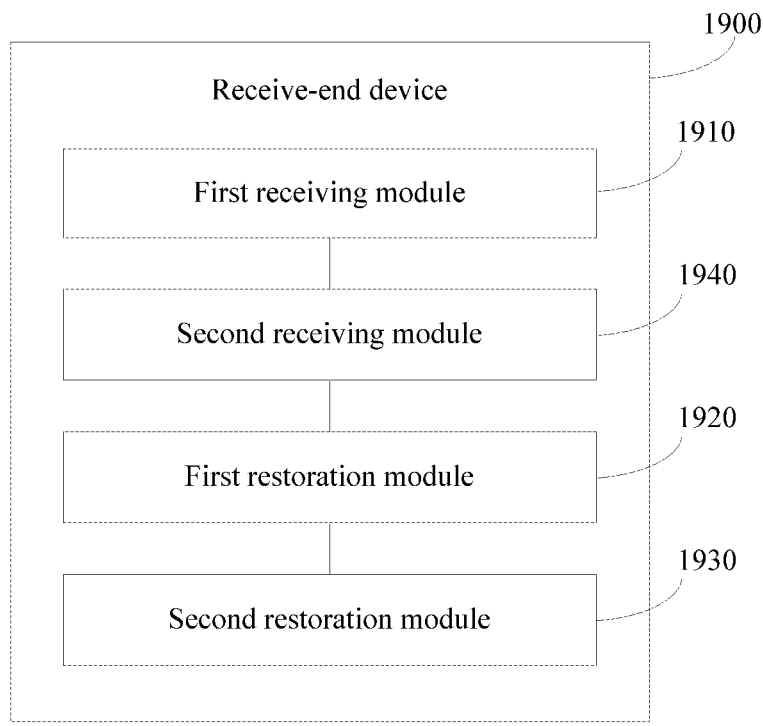
FIG. 27 is a block diagram of another receive-end device according to an embodiment of the present invention.

Optionally, referring to FIG. 27, based on FIG. 26, the receive-end device 1900 further includes:

a second receiving module 1940, configured to receive a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow.

The first restoration module 1920 is configured to restore the at least two initial spatial flows from the plurality of precoded data flows based on precoded demodulation reference signals of the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the receive-end device provided in this embodiment of the present invention, both transmit diversity and spatial multiplexing may be performed on a same time-frequency resource, thereby improving utilization of the time-frequency resource.

Figure 28:
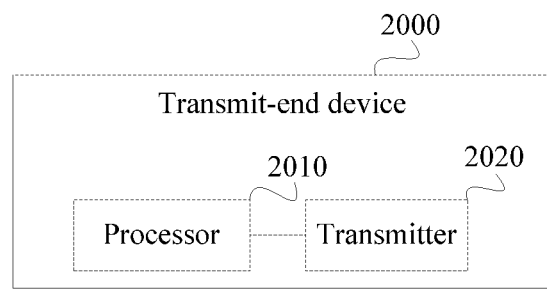
FIG. 28 is a block diagram of a transmit-end device according to an embodiment of the present invention.

FIG. 28 is a block diagram of a transmit-end device 2000 according to an embodiment of the present invention. The transmit-end device 2000 may be the base station 01 in the implementation environment shown in FIG. 1, and is configured to perform some of the methods provided in the embodiment shown in FIG. 10 and all of the methods provided in the embodiment shown in FIG. 8. Referring to FIG. 28, the transmit-end device 2000 may include a processor 2010 and a transmitter 2020. The processor 2010 is coupled to the transmitter 2020.

The processor 2010 is configured to precode a plurality of initial spatial flows, to obtain a plurality of precoded data flows, where at least two of the plurality of initial spatial flows are obtained by performing transmit diversity processing on an original spatial flow.

The transmitter 2020 is configured to transmit the plurality of precoded data flows.

In conclusion, the transmit-end device provided in this embodiment of the present invention precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the transmit-end device provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the processor 2010 is further configured to precode demodulation reference signals of the plurality of initial spatial flows, to obtain a plurality of precoded demodulation reference signals, where each of the plurality of initial spatial flows corresponds to one demodulation reference signal, and a precoding vector used for each initial spatial flow is the same as a precoding vector used for a demodulation reference signal of the initial spatial flow.

The transmitter 2020 is further configured to send the plurality of precoded demodulation reference signals.

In conclusion, the transmit-end device provided in this embodiment of the present invention precodes the plurality of initial spatial flows, to obtain the plurality of precoded data flows, and then transmits the plurality of precoded data flows, where the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the transmit-end device provided in this embodiment of the present invention, both transmit diversity and spatial multiplexing may be performed on a same time-frequency resource, thereby improving utilization of the time-frequency resource.

Figure 29:
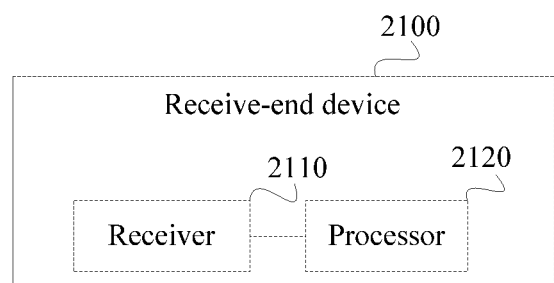
FIG. 29 is a block diagram of a receive-end device according to an embodiment of the present invention.

FIG. 29 is a block diagram of a receive-end device 2100 according to an embodiment of the present invention. The receive-end device 2100 may be any UE in the implementation environment shown in FIG. 1, and is configured to perform some of the methods provided in the embodiment shown in FIG. 10 and all of the methods provided in the embodiment shown in FIG. 9. Referring to FIG. 29, the receive-end device 2100 may include a receiver 2110 and a processor 2120. The receiver 2110 is coupled to the processor 2120.

The receiver 2110 is configured to receive a plurality of precoded data flows, where the plurality of precoded data flows are obtained by precoding a plurality of initial spatial flows, and at least two of the plurality of initial spatial flows are obtained by performing transmit diversity processing on an original spatial flow.

The processor 2120 is configured to restore the at least two initial spatial flows from the plurality of precoded data flows.

The processor 2120 is configured to restore the original spatial flow based on the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the plurality of initial spatial flows, and the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the receive-end device provided in this embodiment of the present invention, both transmit diversity and spatial multiplexing may be performed on a same time-frequency resource, thereby improving utilization of the time-frequency resource.

Optionally, the original spatial flow corresponds to a first receive-end device.

Optionally, at least one of the plurality of initial spatial flows corresponds to a second receive-end device.

Optionally, at least two of the plurality of initial spatial flows are obtained by performing transmit diversity processing on another original spatial flow, and the another original spatial flow corresponds to a third receive-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receiver 2110 is further configured to receive a plurality of precoded demodulation reference signals, where the plurality of precoded demodulation reference signals are obtained by precoding demodulation reference signals of the plurality of initial spatial flows, each of the plurality of initial spatial flows corresponds to one demodulation reference signal, and a precoding vector used for each initial spatial flow is the same as a precoding vector used for a demodulation reference signal of the initial spatial flow.

The processor 2120 is further configured to restore the at least two initial spatial flows from the plurality of precoded data flows based on precoded demodulation reference signals of the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the plurality of initial spatial flows, and the at least two of the plurality of initial spatial flows are obtained by performing transmit diversity processing on the original spatial flow. The at least two of the plurality of initial spatial flows are obtained by performing transmit diversity processing on the original spatial flow, and other initial spatial flows may be obtained without transmit diversity processing. Therefore, according to the receive-end device provided in this embodiment of the present invention, both transmit diversity and spatial multiplexing may be performed on a same time-frequency resource, thereby improving utilization of the time-frequency resource.

Figure 30:
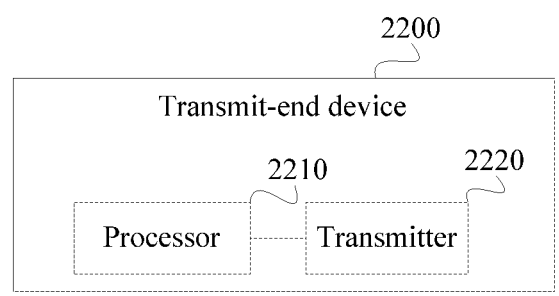
FIG. 30 is a block diagram of a transmit-end device according to an embodiment of the present invention.

FIG. 30 is a block diagram of a transmit-end device 2200 according to an embodiment of the present invention. The transmit-end device 2200 may be any UE in the implementation environment shown in FIG. 1, and is configured to perform some of the methods provided in the embodiment shown in FIG. 13 and all of the methods provided in the embodiment shown in FIG. 11. Referring to FIG. 30, the transmit-end device 2200 may include a processor 2210 and a transmitter 2220. The processor 2210 is coupled to the transmitter 2220.

The processor 2210 is configured to precode at least two initial spatial flows, to obtain a plurality of precoded data flows, where the at least two initial spatial flows are obtained by performing transmit diversity processing on an original spatial flow.

The transmitter 2220 is configured to transmit the plurality of precoded data flows.

In conclusion, the transmit-end device provided in this embodiment of the present invention precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the transmit-end device provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the processor 2210 is configured to precode demodulation reference signals of the at least two initial spatial flows, to obtain a plurality of precoded demodulation reference signals, where each of the at least two initial spatial flows corresponds to one demodulation reference signal, and a precoding vector used for each initial spatial flow is the same as a precoding vector used for a demodulation reference signal of the initial spatial flow.

The transmitter 2220 is configured to send the plurality of precoded demodulation reference signals.

In conclusion, the transmit-end device provided in this embodiment of the present invention precodes the at least two initial spatial flows, to obtain the plurality of precoded data flows, and then transmits the plurality of precoded data flows, where the at least two initial spatial flows are obtained by performing transmit diversity processing on the original spatial flow. The at least two initial spatial flows are obtained by performing transmit diversity processing on the original spatial flow. Therefore, according to the transmit-end device provided in this embodiment of the present invention, both transmit diversity and spatial multiplexing may be performed on a same time-frequency resource, thereby improving utilization of the time-frequency resource.

Figure 31:
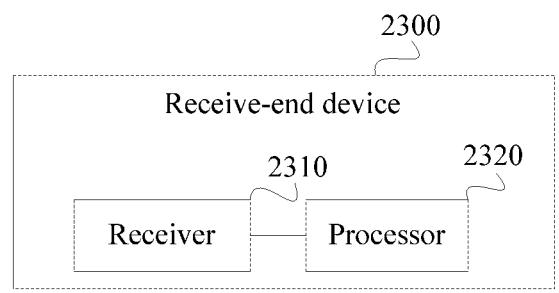
FIG. 31 is a block diagram of a receive-end device according to an embodiment of the present invention.

FIG. 31 is a block diagram of a receive-end device 2300 according to an embodiment of the present invention. The receive-end device 2300 may be the base station 01 in the implementation environment shown in FIG. 1, and is configured to perform some of the methods provided in the embodiment shown in FIG. 13 and all of the methods provided in the embodiment shown in FIG. 12. Referring to FIG. 31, the receive-end device 23 may include a receiver 2310 and a processor 2320. The receiver 2310 is coupled to the processor 2320.

The receiver 2310 is configured to receive a plurality of precoded data flows, where the plurality of precoded data flows are obtained by precoding at least two initial spatial flows, and the at least two initial spatial flows are obtained by performing transmit diversity processing on an original spatial flow.

The processor 2320 is configured to restore the at least two initial spatial flows from the plurality of precoded data flows.

The processor 2320 is configured to restore the original spatial flow based on the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the receive-end device provided in this embodiment of the present invention, both transmit diversity and spatial multiplexing may be performed on a same time-frequency resource, thereby improving utilization of the time-frequency resource.

Optionally, the original spatial flow corresponds to a first transmit-end device.

Optionally, the transmit diversity processing is space-time transmit diversity processing, space-frequency transmit diversity processing, or space-time-frequency transmit diversity processing.

Optionally, different initial spatial flows in the at least two initial spatial flows correspond to different precoding vectors, each precoding vector corresponds to one demodulation reference signal DMRS port, and the different precoding vectors correspond to different DMRS ports.

Optionally, the receiver 2310 is further configured to receive a plurality of precoded demodulation reference signals, where the plurality of precoded demodulation reference signals are obtained by precoding demodulation reference signals of the at least two initial spatial flows, each of the at least two initial spatial flows corresponds to one demodulation reference signal, and a precoding vector used for each initial spatial flow is the same as a precoding vector used for a demodulation reference signal of the initial spatial flow.

The processor 2320 is further configured to restore the at least two initial spatial flows from the plurality of precoded data flows based on precoded demodulation reference signals of the at least two initial spatial flows.

In conclusion, the receive-end device provided in this embodiment of the present invention receives the plurality of precoded data flows, restores the at least two initial spatial flows from the plurality of precoded data flows, and restores the original spatial flow based on the at least two initial spatial flows, where the plurality of precoded data flows are obtained by precoding the at least two initial spatial flows, and the at least two initial spatial flows are obtained by performing transmit diversity processing on the original spatial flow. At least two of a plurality of initial spatial flows are obtained by performing transmit diversity processing on the original spatial flow. Therefore, according to the receive-end device provided in this embodiment of the present invention, both transmit diversity and spatial multiplexing may be performed on a same time-frequency resource, thereby improving utilization of the time-frequency resource.

The term "and/or" in the embodiments of the present invention describes only an association relationship for describing associated objects and represents that three relationships may exist. For example, A and/or B may represent the following three cases: Only A exists, both A and B exist, and only B exists. In addition, the character "I" in this specification usually indicates an "or" relationship between the associated objects.

Persons of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the spirit and principle of this application shall fall within the protection scope of this application.

What is claimed is:

1. A method, comprising:
    determining, based on channel quality information, a selected transmission scheme from at least two transmission schemes of a current transmission mode, the at least two transmission schemes comprising a beamforming transmit diversity transmission scheme and a unified transmit diversity scheme indicating two sub-schemes, the two sub-schemes comprising the beamforming transmit diversity transmission scheme and an open-loop transmit diversity transmission scheme;
    generating transmission scheme indication information indicating the selected transmission scheme; and
    sending the transmission scheme indication information.

2. The method according to claim 1, wherein the at least two transmission schemes further comprise an open-loop spatial multiplexing transmission scheme.

3. The method according to claim 1, wherein the at least two transmission schemes further comprise a closed-loop spatial multiplexing transmission scheme.

4. The method according to claim 1, wherein the at least two transmission schemes further comprise a multi-user multiple-input and multiple-output transmission scheme.

5. The method according to claim 1, wherein:
    generating the transmission scheme indication information comprises generating downlink control information, wherein a format of the downlink control information corresponds to the selected transmission scheme; and sending the transmission scheme indication information comprises sending the downlink control information.

6. The method according to claim 1, wherein determining the selected transmission scheme comprises:

determining, as the selected transmission scheme, a first transmission scheme of the at least two transmission schemes when a channel quality information meets a first threshold;

determining, as the selected transmission scheme, a second transmission scheme of the at least two transmission schemes when the channel quality information fails the first threshold and meets second threshold; or determining, as the selected transmission scheme, a third transmission scheme of the at least two transmission schemes when the channel quality information fails the second threshold.

7. A method, comprising:

receiving transmission scheme indication information indicating a first transmission scheme of at least two transmission schemes of a current transmission mode, the at least two transmission schemes comprising a beamforming transmit diversity transmission scheme and a unified transmit diversity scheme indicating two sub-schemes, the two sub-schemes comprising the beamforming transmit diversity transmission scheme and an open-loop transmit diversity transmission scheme, and the first transmission scheme having been determined based on channel quality information; and transmitting data according to the first transmission scheme.

8. The method according to claim 7, wherein the at least two transmission schemes further comprise an open-loop spatial multiplexing transmission scheme.

9. The method according to claim 7, wherein the at least two transmission schemes further comprise a closed-loop spatial multiplexing transmission scheme.

10. The method according to claim 7, wherein the at least two transmission schemes further comprise a multi-user multiple-input and multiple-output transmission scheme.

11. The method according to claim 7, wherein:

receiving the transmission scheme indication information comprises:

receiving downlink control information, wherein a format of the downlink control information corresponds to the first transmission scheme;

determining, from the at least two transmission schemes of the current transmission mode, a corresponding transmission scheme corresponding to the format of the downlink control information; and determining the corresponding transmission scheme as the first transmission scheme.

12. A base station, comprising:

a non-transitory memory storage comprising instructions; and a processor in communication with the non-transitory memory storage, wherein the processor executes the instructions to configure the base station to:

determine, based on channel quality information, a selected transmission scheme from at least two transmission schemes of a current transmission mode, the at least two transmission schemes comprising a beamforming transmit diversity transmission scheme and a unified transmit diversity scheme indicating two sub-schemes, the two sub-schemes comprising the beamforming transmit diversity transmission scheme and an open-loop transmit diversity transmission scheme;

generate transmission scheme indication information indicating the selected transmission scheme; and send the transmission scheme indication information.

13. The base station according to claim 12, wherein the at least two transmission schemes further comprise an open-loop spatial multiplexing transmission scheme.

14. The base station according to claim 12, wherein the at least two transmission schemes further comprise a closed-loop spatial multiplexing transmission scheme.

15. The base station according to claim 12, wherein the at least two transmission schemes further comprise a multi-user multiple-input and multiple-output transmission scheme.

16. The base station according to claim 12, wherein the processor executes further instructions to further configure the base station to:

generate downlink control information, wherein a format of the downlink control information corresponds to the selected transmission scheme; and send the downlink control information.

* * * * *